US007865418B2

(12) United States Patent
Uenohara et al.

(10) Patent No.: US 7,865,418 B2
(45) Date of Patent: Jan. 4, 2011

(54) PRICE AND RISK EVALUATION SYSTEM FOR FINANCIAL PRODUCT OR ITS DERIVATIVES, DEALING SYSTEM, RECORDING MEDIUM STORING A PRICE AND RISK EVALUATION PROGRAM, AND RECORDING MEDIUM STORING A DEALING PROGRAM

(75) Inventors: Yuji Uenohara, Yokohama-shi (JP); Ritsuo Yoshioka, Yokohama-shi (JP); Motohiko Onishi, Mitaka-shi (JP); Takahiro Tatsumi, Kawaguchi-shi (JP); Tadahiro Ohashi, Kokubunji-shi (JP); Masatoshi Kawashima, Yokohama-shi (JP); Hiroaki Okuda, Kawasaki-shi (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 872 days.

(21) Appl. No.: 11/733,057

(22) Filed: Apr. 9, 2007

(65) Prior Publication Data
US 2007/0198387 A1 Aug. 23, 2007

Related U.S. Application Data

(62) Division of application No. 09/807,963, filed as application No. PCT/JP00/05755 on Aug. 25, 2000, now Pat. No. 7,552,076.

(30) Foreign Application Priority Data

Aug. 27, 1999 (JP) ............................... P11-242152
Jul. 19, 2000 (JP) ........................... P2000-219655

(51) Int. Cl.
*G06Q 40/00* (2006.01)
(52) U.S. Cl. ................................................. 705/36 R
(58) Field of Classification Search .......... 705/36 R–44
See application file for complete search history.

(56) References Cited

U.S. PATENT DOCUMENTS 5,563,783 A * 10/1996 Stolfo et al. ................... 705/8
(Continued)

FOREIGN PATENT DOCUMENTS

JP 5-89160 4/1993
(Continued)

OTHER PUBLICATIONS

Anile et al, "Simulation of n+-n-n+ devices by a hydrodynamic model: Subsonic and supersonic flow", Mar. 1995.*
(Continued)

*Primary Examiner*—Olabode Akintola
(74) *Attorney, Agent, or Firm*—Oblon, Spivak, McClelland, Maier & Neustadt, L.L.P.

(57) ABSTRACT

A system for correctly evaluating a price distribution and a risk distribution for a financial product or its derivatives introduces a probability density function generated with a Boltzmann model at a higher accuracy than the Gaussian distribution for a probability density. The system has an initial value setup unit and an evaluation condition setup unit. Initial values include at least one of price, price change rate, and the price change direction of a financial product. The evaluation conditions include at least time steps and the number of trials. The Boltzmann model analysis unit receives the initial values and the evaluation conditions, and repeats simulations of price fluctuation, based on the Boltzmann model using a Monte Carlo method. A velocity/direction distribution setup unit supplies the probability distributions of the price, price change rate, and the price change direction for the financial product to the Boltzmann model analysis unit. A random number generator for a Monte Carlo method employed in the analysis by the Boltzmann model, and an output unit displays the analysis result. A dealing system applies the financial Boltzmann model to option pricing, and reproduces the characteristics of Leptokurcity and Fat-tail by linear Boltzmann equation in order to define risk-neutral and unique probability measures. Consequently, option prices can be evaluated in a risk-neutral and unique manner, taking into account Leptokurcity and Fat-tail of a price change distribution.

7 Claims, 64 Drawing Sheets

U.S. PATENT DOCUMENTS

| | | |
|---|---|---|
| 5,692,233 A | 11/1997 | Garman |
| 6,061,662 A | 5/2000 | Makivic |
| 6,456,982 B1 * | 9/2002 | Pilipovic .................. 705/36 R |

FOREIGN PATENT DOCUMENTS

| | | |
|---|---|---|
| JP | 05-143571 | 6/1993 |
| JP | 06-28384 | 2/1994 |
| JP | 06-236383 | 8/1994 |
| JP | 07-36976 | 2/1995 |
| JP | 07-140289 | 6/1995 |
| JP | 08-139151 | 5/1996 |
| JP | 08-335213 | 12/1996 |
| JP | 09-245018 | 9/1997 |
| JP | 9-305656 | 11/1997 |
| JP | 10-222488 | 8/1998 |
| JP | 11-259452 | 9/1999 |
| JP | 2001-67409 | 3/2001 |
| JP | 2003-331128 | 11/2003 |

PUBLICATIONS

Woller J., The Basics of Monte Carlo Simulations, spring 1996, University of Nebraska-Lincol.*

M. Nakashima, et al., Toshiba Review, vol. 46, No. 1, pp. 14-17, "Dealing Support Systems", Jan. 1, 1991.

J.C. Hull, Kinzai Institute For Financial Affairs, Inc., pp. 685-724, (Chapter 19), $3^{rd}$ Edition, "Financial Engineering (Options, Futures, and Other Derivative Securities", Jun. 24, 1998.

Y. Uehohara, et al., The $5^{th}$ JAFEE Int. Nat. Conf., pp. 18-37, "Boltzmann Model in Financial Technology", Aug. 28-29, 1999 (Submitted English pp. 1-20 only).

S. Murota, Kabushiki Kaisha Kindai Sales, pp. 28-50, "Kinyu Monte Calro", May 14, 1996.

Yacine Aït-Sahalia, et al., "Nonparametric Estimation of State-Price Densities Implicit in Financial Asset Prices", The Journal of Finance, No. 2, Apr. 1995, pp. 499-547.

Hiroshi Kobayashi, et al., "The Extension of Simulated Annealing Method and its Application to Investment Problem with Predicted Values of Time Series", vol. 96, No. 4, Jan. 1996, pp. 37-42 (with Cover page).

* cited by examiner

23 THEORETICAL VALUE WITH DRIFT

24 THEORETICAL VALUE WITHOUT DRIFT

25 SIMULATION RESULT WITH DRIFT

26 SIMULATION RESULT WITHOUT DRIFT

27 TOTAL SPECTRUM
28 SPECTRUM OF NEGATIVE DIRECTION (PRICE-DOWN)
29 SPECTRUM OF POSITIVE DIRECTION (PRICE-UP)
30 STEEP SLOPE COMPONENT
31 GENTLE SLOPE COMPONENT
32 GAUSSIAN DISTRIBUTION

STOCK INDEX IN CONTINUOUS SESSION

| | | 16000 | 16500 | 17000 | 17500 | 18000 | 20000 EXERCISE PRICE |
|---|---|---|---|---|---|---|---|
| | | K1 | K2 | K3 | K4 | ... | Kn |
| 1st DELIVERY MONTH | CALL | | | | | | |
| | PUT | | | | | | |
| | IV(CALL) | | | | | | |
| | IV(PUT) | | | | | | |
| | | | | | | | |
| m$^{th}$ DELIVERY MONTH | CALL | | | | | | |
| | PUT | | | | | | |
| | IV(CALL) | | | | | | |
| | IV(PUT) | | | | | | |

IMPLIED VOLATILITY, MARKET PRICE

FIG.39
(a)
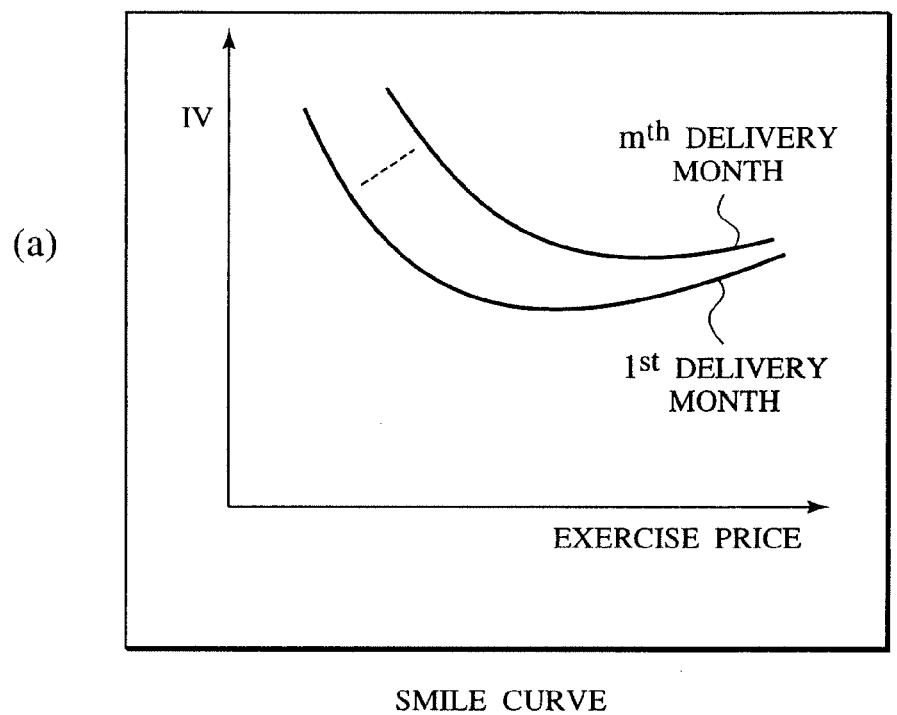
SMILE CURVE
(b)
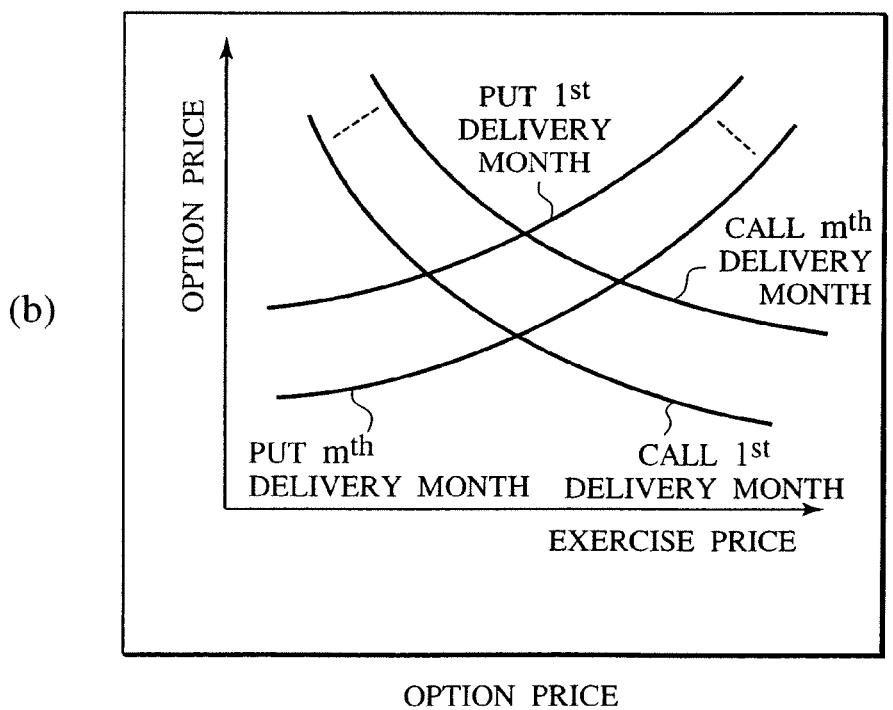
OPTION PRICE

FIG.41
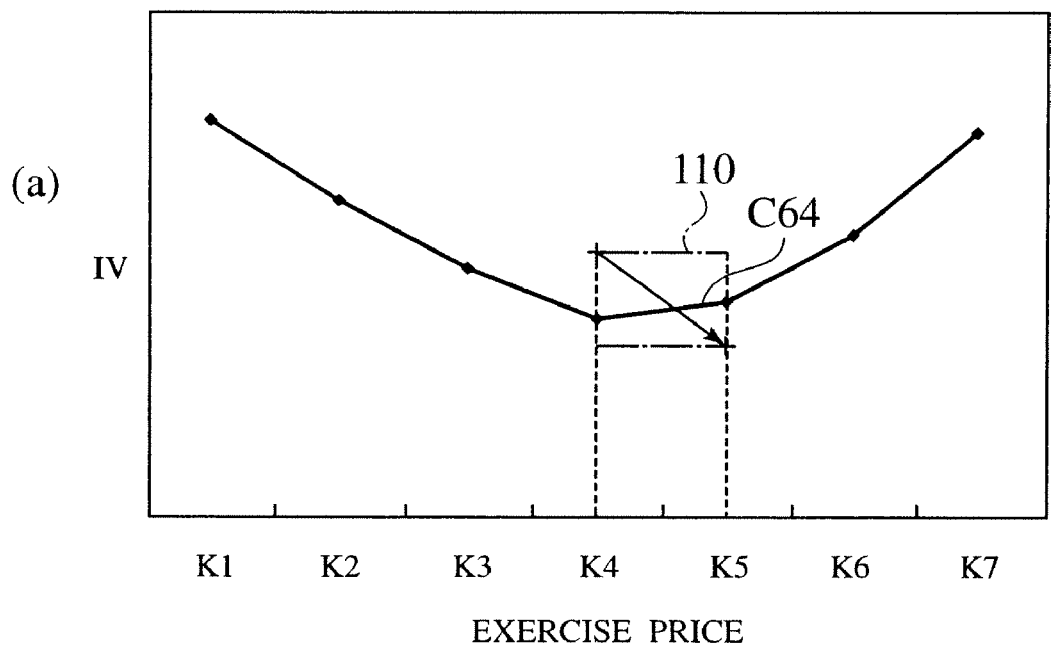
(a)
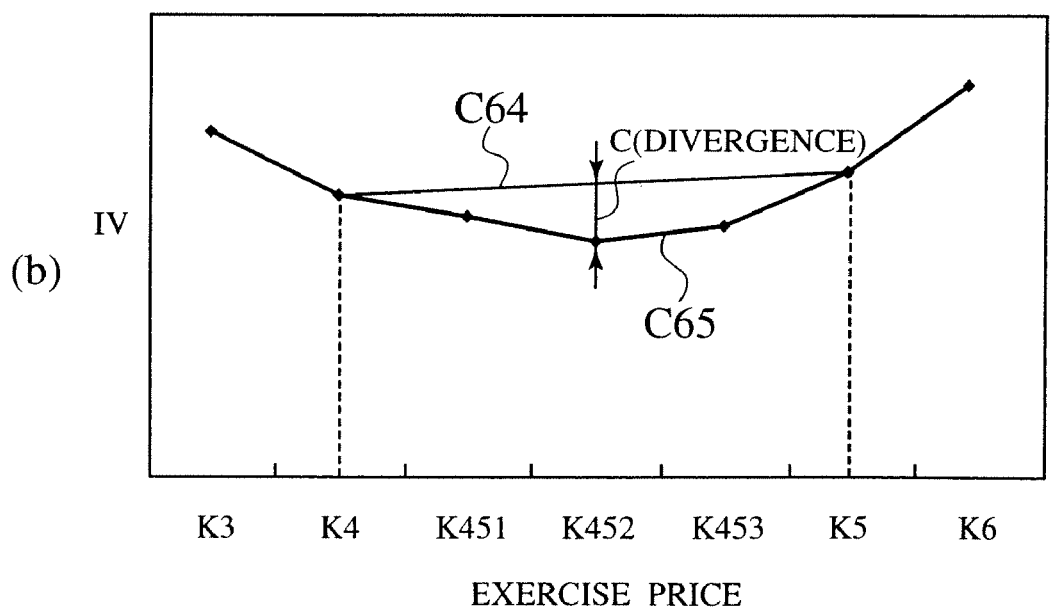
(b)

(a) WITH MARKET TRANSACTION (b) WITHOUT TRANSACTION

FIG.56

NIKKEI 225 OPTION ORDER SCREEN

| EXERCISE PRICE | ▼ | DELIVERY MONTH | ▼ |
|---|---|---|---|
| | K1 | | 1st DELIVERY MONTH |
| | ⋮ | | ⋮ |
| | Kn | | mth DELIVERY MONTH |

| | | |
|---|---|---|
| CALL/PUT | ○ CALL | ⦿ PUT |
| LIMIT PRICE | ○ [      ] YEN | |
| MARKET ORDER | ⦿ | |
| UNIT | [      ] | |
| BUY/SELL | ○ SELL | ⦿ BUY |
| TRADING TYPE | ○ NEW | ⦿ SETTLE |
| [ ORDER ] | ○ SELL | [ CANCEL ] |

PRICE AND RISK EVALUATION SYSTEM FOR FINANCIAL PRODUCT OR ITS DERIVATIVES, DEALING SYSTEM, RECORDING MEDIUM STORING A PRICE AND RISK EVALUATION PROGRAM, AND RECORDING MEDIUM STORING A DEALING PROGRAM

CROSS-REFERENCE TO RELATED APPLICATIONS

This application is a Division of and claims priority under 35 USC §120 from application Ser. No. 09/807,963 filed Jun. 1, 2001, and is a National Stage of PCT Application No. PCT/JP00/05755, filed Aug. 25, 2000, and claims the benefit of priority under 35 USC §119 from Japanese Patent Application Nos. P11-242152, filed Aug. 27, 1999 and P2000-219655, filed Jul. 19, 2000, the entire contents of each are incorporated herein by reference.

FIELD OF THE INVENTION

The present invention relates to a system for assessing a price distribution or a risk distribution for a financial product or its derivatives, which can rigorously evaluate a price distribution or a risk distribution, including a probability of occurrence of a big price change, based on a Boltzmann model. This system is also capable of analyzing price fluctuation events for the financial product or its derivatives that could not be reproduced by the conventional technique.

The present invention also relates to a dealing system used in the financial field.

The present invention further relates to a computer-readable recording medium storing a price and risk assessing program for a financial product or its derivatives, and to a computer-readable recording medium storing a dealing program.

TECHNOLOGICAL BACKGROUND

A technique for analyzing past records of price change in a financial product or its derivatives and for stochastically obtaining a price distribution or a risk distribution is generally called a financial engineering technology.

In general, the Wiener process is used to model a change of stock price in the conventional financial engineering technology. The Wiener process is a type of the Markov process, which is a stochastic process on condition that a future state is independent of a past process. The Wiener process is often used to describe the Brownian motions of gas-molecules.

With variables of t (time) and z depending on the Wiener process, the Wiener process is characterized in the following relationship between $\Delta t$ and $\Delta z$ that is an infinitesimal change in z during the infinitesimal time $\Delta t$.

$$\Delta Z = \epsilon \sqrt{\Delta t} \quad (1)$$

here $\epsilon$ is the random sample from the standard Gaussian distribution.

Thus, the Wiener process evaluates fluctuations with the variables based on the standard Gaussian distribution.

The conventional risk evaluation method for a financial product or its derivatives generally establishes upon applying the Ito's process, which is developed from the Wiener process. The Ito's process adds a drift term to the Wiener process on the assumption that a change of stock price follows the Wiener process, and further introduces a parameter function of time and other variables.

The price change in stock priced expressed by the Ito's process is $$dS = rSdt + S\sigma\sqrt{dt}W \quad (2)$$

here S is the stock price, r is the non-risky interest rate, $\sigma$ is the volatility (i.e., the predicted change rate), and W is the normal distribution with the expectation value of zero (0) and the standard deviation of one (1).

The simplest example of the Ito's process is the geometric Brownian motion model of stock prices. With the geometric Brownian motion, equation (2) becomes $$dx = \left(r - \frac{\sigma^2}{2}\right)dt + \sigma\sqrt{dt}\,W \quad (3)$$

here x is the natural logarithm of the stock price S.

The probability density function P(x; t) of x based on equation (3) is $$\frac{\partial P}{\partial t} = -\left(r - \frac{\sigma^2}{2}\right)\frac{\partial P}{\partial x} + \frac{1}{2}\sigma^2\frac{\partial^2 P}{\partial x^2} \quad (4)$$

Equation 4 is the Fokker-Plank equation, and is a typical diffusion problem. The solution of equation (4) is $$P(x;t) = \frac{1}{\sqrt{2\pi\sigma^2 t}}\exp\left[-\frac{\left(x - \left(r - \frac{\sigma^2}{2}\right)t^2\right)}{2\sigma^2 t}\right] \quad (5)$$

and the probability density function P(x; t) of x becomes the Gaussian distribution.

Equation (5) is characterized by not only its simple form, but also effectiveness in evaluating price changes for financial products, because it is known that the price change of derivatives derived from the underlying assets has the same shape as that of the underlying assets (Ito's theorem). For this reason, various financial derivatives have been reproduced.

However, the conventional technique for evaluating risks for the financial products or the derivatives is not capable of providing sufficiently reliable results, as is known in this field.

This is because that conventional method evaluates risks of financial products based on the Gaussian distribution, and therefore, the probability of occurrence of a big price change is underestimated.

Although the likelihood of occurrence of a big price change is low, such a big price change has a significant influence to investing risks, as compared with situations under the normal price changes. Accordingly, any risk evaluation methods or systems for financial products can not be reliable in the practical aspect unless the probability for the big price changes is accurately treated.

Another problem is that the conventional risk evaluation technique requires some corrections to a heterogeneous problem, in which the probability density function changes depending on prices, or to a non-linear problem, in which the probability density function used for the evaluation is a non-linear function. Along with the conventional approaches, such corrections have to be added empirically or based on know-how. In other words, the conventional technique requires dealer's experiences or uncertain judgements in the actual market trading.

Furthermore, the conventional risk evaluation technique has very limited capabilities for description, definition, and selection of the variables to produce price fluctuations observed in the markets. In other words, with the conventional technique, the probability density function can not be sufficiently evaluated with variables for describing risks for financial products, if the actual price change distribution of an financial product is located out of the standard Gaussian-type distribution. This insufficiency can also be true in the cases where the price change rate is influenced by the past price change rate, and correlations exist between the probability for price-up and the probability for price-down, or between the price change rate and the price change direction. The conventional technique is not capable of describing the probability density function for the price change direction as well, and therefore, the probability distribution of the price change direction for the financial products are disregarded.

Further problems in actual application of the conventional risk evaluation method for financial products relate to insufficient numerical techniques, such as random number sampling and variance reduction areas for making Monte Carlo calculations. Consequently, undesirable variance inevitably remains in the conventional technique.

Meanwhile, dealers or traders use dealing systems in banks or security companies for purposes of supporting the transactions. The conventional dealing systems calculate theoretical prices of financial products or its derivatives (hereinafter, referred to as "options"), and simulate risk evaluation or position change based on accepted theories, such as the Black-Sholes model or its expanded models. The Black-Sholes model assumes that the probability distribution of, for example, a stock price at a feature point of time is the Gaussian (or normal) distribution (Black, F. & M. Sholes, "The Pricing of Options and Corporate Liabilities", Journal of Political Economy, 81 (May-June 1973), pp. 637-59).

However, the conventional dealing systems have many problems listed below in item (1) through (8).

(1) A so-called Fat-Tail problem is a serious problem in the financial field (Alan Greenspan, "Financial derivatives", Mar. 19, 1999; http://www.federalreserve.gov/boarddocs/speeches/1999/19990319.htm).

In order to calculate theoretical prices for financial products or options or to simulate risk evaluation and position change, the usage of the Gaussian distribution in the conventional financial engineering models has facilitated evolution of theoretical financial engineering and implementation to a computer system easy-applicable in business areas. In other words, non-normality of probability distributions have been often observed financial markets, in which big price changes actually occur, or in which transactions are not so active. Once if this fact would be introduced from the early state, evolution theoretical financial engineering deployment and implementation to a computer system would have become much more difficult in actual application. For this reason, dealers have to transact relying upon their own experiences or intuitions. To carry out such transactions, it is critically important for the dealers to accurately grasp the behaviors for volatility of the market.

(2) There is volatility defined as a historical volatility that is calculated by the observed fluctuation of price under asset transactions. A general method for obtaining a historical volatility is to calculate the standard deviation of returns for the asset, based on the observed fluctuation of the closing price. Other known methods for calculating a historical volatility include so-called "Extreme Value Theory" for estimating a volatility from daily high prices and low prices, and a modified Parkinson method for estimating a volatility while taking discontinuity of time in the actual transaction into account.

However, these methods have drawbacks in actual application for some reasons. For example, if transaction is not active enough, there is no continuity in the movement for the price of the underlying assets. In case that the closing prices are used for determining the historical volatility, the corresponding exercise time would be altered from the actual one.

Even in the case that the transaction is active, the conventional methods are not suitable to estimate the volatility under the fat-tailed regime because these methods assume normality in the risk probability distribution for the market behaviors. To this end, the volatility calculated by the conventional methods is used only as a rough guideline within the limited applicability.

(3) Implied volatility (abbreviated as "IV") is known in the option market, other than the historical volatility mentioned above. Implied volatility is volatility calculated back from the option prices observed in the market along with the Black-Sholes equation. Implied volatility is often used as a factor for calculating the theoretical price of an option.

However, in a non-active market (for instance, the option transaction market for underlying assets in the current Japanese security market), as the number of observed transactions for options is small, the implied volatility for the corresponding options cannot be well-defined from the actual market data. For this reason, dealers have to repeatedly manipulate factors for regular adjusting the volatility parameters through their own experiences and expert-judgements in order to reflect the current market behaviors in their dealing activities.

(4) Implied volatility of an individual stock option can provide some kind of important information to know what is the market reaction to the volatility of a particular stock for dealers, while the market reaction varies as transactions go on reflecting market circumstances.

(5) In the option market, different sets of the implied volatility are obtained for multiple options originated from the same original underlying asset. This phenomenon is referred to as a "smile effect". In this case, approximated smile curves are drawn in the two-dimensional phase space with the combinations between a vertical axis showing the magnitude of implied volatility and a horizontal axis showing the exercise prices for the options. Those smile curves are often used to calculate theoretical prices of the option.

A volatility matrix, which is a data table having a time dimension along maturity of the option, in addition to the two-dimensional phase space mentioned above, provide information to obtain the theoretical exercise price and to interpolate the volatility value for the regions unobserved in the market behaviors up to maturity, in conjunction with the above-mentioned item (4).

(6) In fact, in order to obtain reliable smile curves or a volatility matrix, sufficient numbers of option prices must be observed in the market. On the other hand, in some cases that under the transactions in moderately active market, the option prices observed in the market are scattered in a wide range, it becomes difficult to grasp a comprehensive trend.

(7) In general, the amount of information observed in the market trades off the rationality needed in the basic assumption of the required model for estimating theoretical price for the options relating to the underlying asset price. If numbers of the past records for the option prices observed in the market are insufficient, a stronger assumption is required in a model used to obtain dynamics of an expected probability distribution for the underlying asset price. As one of the advanced models having strong assumptions, the stochastic volatility model (SVM) (Hull, John C. & Allan White, "The Pricing of Options on Assets with Stochastic Volatilities", Journal of Finance, 42, June, 1987, pp. 281-300), and the GARCH model (T. Bollerslev, "Generalized Autoregressive Conditional Heteroskedasticity", Journal of Econometrics, Vol. 31, 1986, pp. 307-327) are well-known. However, because these models assume normality in the probability distributions, they can not deal with the Fat-Tail problem sufficiently.

There is a technique expanded from a lattice method and having no assumption of normality (Rubinstein, Mark, "Implied Binomial Trees", Journal of Finance, 49, July 1994, pp. 771-818). This technique is capable of forming a flexible probability distribution taking the smile effect into account. However, this technique requires sufficient numbers of option prices observed in the market in order to determine the distribution form. Therefore, this technique is not suitably used in a non-active option market.

There is also a famous model named a jump model, which independently generates a stochastic process entirely different from the normal distribution for a Fat-Tail problem (e.g., R. C. Merton, "Option Pricing When Underlying Stock Returns Are Discontinuous", Journal of Financial Economics, Vol. 3, March 1976, pp. 125-144). However, the jump model has an assumption of discontinuous price fluctuation, and therefore, the stochastic volatility model (SVM) naturally becomes a nonlinear problem. For this reason, the risk-neutral measure can not be achieved invariably, which prevent the option price from being defined uniquely.

(8) In conclusion, no conventional techniques can provide minute and accurate information in real time for solving the Fat-Tail problem and being applicable to a non-active market, although it has been desired for dealers and traders to receive significant smile curves or a volatility matrix on their displays in real time in response to the actual market that changes every moment. The conventional technique is incapable of automatically acquiring necessary data required for computation in response to requests from the dealers in an interactive manner, and of automatically selecting the optimum model to analyze the market deeply and flexibly.

Therefore, an object of the present invention is to introduce a probability density function with a higher accuracy in comparison with the normal distribution, and to develop a system capable of correctly evaluating the price distribution and the risk distribution for a financial product or its derivatives.

Another object of the present invention is to provide a price and risk evaluation system for a financial product or its derivatives, which system is capable of theoretically solving the above-mentioned heterogeneous or nonlinear problems.

It is still another object of the present invention to provide a price and risk evaluation system for a financial product or its derivatives, which system introduces a new function of probability density for estimating a price distribution and a risk distribution. This probability density function model can adequately define and describe variables that can not be dealt sufficiently by the conventional technique, and can establish a reliable method.

It is still another object of the present invention to provide a price and risk evaluation system for a financial product or its derivatives, which system introduces a new function of probability density for estimating a price distribution and a risk distribution of a financial product. This function is capable of establishing a sampling method for improving the efficiency of computation, and allows risk prices to be computed at a high efficiency.

It is yet another object of the present invention to provide a price and risk evaluation system for a financial product or its derivatives, which system is applicable to a parallel computing with high efficiency.

It is yet another object of the present invention to provide a computer-readable recording medium storing a dealing program, which includes a Boltzmann model computation developed by the nuclear reactor theories and applied to the financial field, in place of the general theories used in the conventional techniques. This program is capable of dealing with big price changes in the underlying assets (a fat-tail problem mentioned above), and is applicable to an option market in which transactions are not so active. This program allows a computer system to display significant theoretical prices and risk parameters on display terminals of dealers and traders by means of the interactive screen interfaces.

SUMMARY OF THE INVENTION

The first object of the present invention is to provide a price and risk evaluation system for evaluating a price distribution or a risk distribution for a financial product or its derivatives with applications of a new calculation method, the details of which will be described below. A risk calculation method is also provided, which is capable of treating the fat-tail problems in the financial engineering field associated with underlying assets and their derivatives, and of substantially eliminating defects or drawbacks having existed in the prior art.

This system has an initial value setter and an evaluation condition setter. The initial value setter receives at least one of the initial values of a price, a price change rate, and a price change direction for a financial product or its derivatives that be evaluated. The evaluation condition setter allows a user to input evaluation conditions including at least one set of time steps and the number of trials for calculations. As a significant feature, the system has a Boltzmann model analyzer, which receives at least one of the initial values and the evaluation conditions, and repeats simulations of price fluctuation based on a Boltzmann model using a Monte Carlo method within the ranges of the given calculation conditions. The Boltzmann model analyzer can obtain a price distribution or a risk distribution for the financial product or its derivatives in an accurate manner. The risk evaluation system also has a velocity/direction distribution setter that supplies probability distributions of the price, the price change rate, and the price-change direction for the financial product or its derivatives to the Boltzmann model analyzer. This system has a random number generator in the Boltzmann model analyzer, and an output unit that outputs series of analysis results from the Boltzmann model analyzer.

The initial value setter acquires the initial values of the price, the price change rate, and the price-change direction for the financial product or its derivatives from a market database that stores information about detailed transaction histories, such as exercises and ask-bit data. The initial value setter then supplies the acquired initial values to the Boltzmann model analyzer. The velocity/direction distribution setter receives the past records of a selected financial product or its derivatives from the market database, and generates a probability density function with variables of the price, the price change rate, the price change direction, and time. The velocity/direction distribution setter then supplies the probability density function to the Boltzmann model analyzer.

The price and risk evaluation system further has a total cross-section/stochastic process setter, which supplies information for setting a sampling time width of the simulation of price fluctuation to the Boltzmann model analyzer. In this case, the total cross-section/stochastic process setter acquires a price fluctuation frequency and a price change rate of the financial product or its derivatives from the market database storing information about financial products or derivative products. The total cross-section/stochastic process setter then inputs a ratio of the price fluctuation frequency to the price change rate into the total cross-section/term of the Boltzmann's equation.

The velocity/direction distribution setter acquires the past records of a selected financial product or its derivatives from the market database storing information. The velocity/direction distribution setter than infers a distribution of the price change rate for the financial product or its derivatives using a Sigmoid function and its approximation forms, and supplies the inferred distribution of the price change rate to the Boltzmann model analyzer.

Alternatively, the velocity/direction distribution setter acquires the past records of a selected financial product or its derivatives from the market database, and determines a set of the Sigmoid function parameters to estimate the probability distribution of the price change rate using the price change rate data stored in the past records. The velocity/direction distribution setter then supplies the distribution to the Boltzmann model analyzer.

In still another alternative, the velocity/direction distribution setter acquires the past records of a financial product or its derivatives from the market database, and estimates a probability distribution of the price change direction for the financial product or its derivatives using the past records. The velocity/direction distribution setter then supplies the probability distribution of the price change direction to the Boltzmann model analyzer.

This velocity/direction distribution setter infers the probability distribution of the price change direction, taking into account a correlation between the probability for price-up and the probability for price-down.

In still another alternative, the velocity/direction distribution setter acquires the past records of a financial product or its derivatives from the market database, and generates a probability distribution of the price change direction, taking into account a correlation between the distribution of the price change rate and the distribution of the price change direction for the financial product or its derivatives. The velocity/direction distribution setter then supplies the probability distributions to the Boltzmann model analyzer.

In still another alternative, the velocity/direction distribution setter generates homogeneous probability distributions that are independent of the prices, or heterogeneous probability distributions that depend on the prices, with regard to the probability of a price change rate and a price change direction distributions. The velocity/direction distribution setter then supplies these homogeneous or heterogeneous probability distributions to the Boltzmann model analyzer.

In this system, the Boltzmann model analyzer obtains the price distribution or the risk distribution for the financial product or its derivatives using either a linear Boltzmann model or a non-linear Boltzmann model. In the linear Boltzmann model, the cross-section used in the Boltzmann's equation is independent of a probability density or flux for the financial product or its derivatives. In the non-linear Boltzmann model, the cross-section for the Boltzmann's equation is dependent on the probability density or the flux for the financial product or its derivatives.

Alternatively, the Boltzmann model analyzer obtains the price distribution or the risk distribution for the financial product or its derivatives using a product of a probability density function and a price change rate per unit time for the financial product or its derivatives, as flux of the Boltzmann's equation.

The Boltzmann model analyzer evaluates a probability density at an arbitrary time based on the track-length calculated using flux for the financial product or its derivatives in order to reduce a variance.

The Boltzmann model analyzer evaluates a price probability in an infinitesimal price-band or a risk probability in an infinitesimal time interval using all of or a part of the price fluctuation data for the financial product or the derivatives. Thus, the Boltzmann model analyzer reduces a variance of the price or the risk by applying the point detector technique often employed in a neutron transport Monte Carlo simulation.

The Boltzmann model analyzer calculates an adjoint probability density or an adjoint flux deduced from an adjoint Boltzmann equation for a price fluctuation of the financial product or the derivatives, and reduces variance by weight-sampling technique using values in proportion to the adjoint probability density or the adjoint flux.

In the price and risk evaluation system for a financial product and its derivatives, the velocity/direction distribution setter generates a velocity distribution or a direction distribution for a financial product or its derivatives, taking into account the inter-correlation among other multiple financial products or their derivatives. The generated probability distribution functions are supplied to the Boltzmann analyzer.

The Boltzmann analyzer evaluates a price distribution or a risk distribution for a financial product, and then, applies the Ito's theorem to calculate the equivalent price distribution or the equivalent risk distribution for the derivative of that financial product.

Preferably, the Boltzmann analyzer consists of multi-methods for carrying out simulation of price fluctuations and constructs the edited probability density function through gathering the simulated price fluctuations.

According to the present invention, a price or a risk evaluation system of the first embodiment described above can correctly evaluate the probability of occurrence of big price changes for a financial product, compared with the conventional technique applying the normal distribution as for the probability density. Consequently, the price distribution or the risk distribution for the financial product or its derivatives can be evaluated more accurately.

The present system can treat probability densities in heterogeneous problems in which the probability density function used for evaluation varies depending on the price, or in nonlinear problems in which the probability density function itself is nonlinear, without heavily relying on experiences or know-how.

The present system also can evaluate probability distributions in more flexible manners than the conventional methods, especially in the following situations:

non-Gaussian probability distributions, which were not properly taken into account in the conventional methodology, are treated;

price probability distributions are influenced by the past price itself;

price probability distributions are characterized by the inter-correlation between the probabilities of price-up and price-down; and probability distributions are correlated with the price change rates and the price change direction.

The present system requires no time grid for simulation of price fluctuation, whereas the conventional techniques need time grids for the calculations. The system can evaluate a probability distribution at an arbitrary point of time within the observed area by introducing the flux concept, whereas the conventional technique can treat a probability distribution only at a selected time.

The present system also introduces an idea similar to the point detector used in the neutron transport calculation by Monte Carlo simulations. The idea of point detector allows the system to automatically detect a route of causing an event in a target region in an infinitesimal observation area, in which no price change occurs or no flux passes, based on all of or a part of the price-changing events. Accordingly, the system can evaluate an even in an arbitrary infinitesimal observation region, while reducing the variance.

The present system also reduces the variance generated in the Monte Carlo calculation for a probability density by introducing the idea of adjoint probability density or adjoint flux into the financial technology and selecting weights in proportion to the magnitudes of adjoint flux in the phase space.

In the situations where inter-correlations are found among the probability distributions of multiple financial products, the present system can evaluate a price distribution or a risk distribution taking such correlations into account. The system includes application of the Ito's theorem to evaluate the probability distribution of the price change rate for derivatives based on the probability distribution for the underlying asset.

The present system is realized with parallel computation systems. Consequently, a price distribution or a risk distribution for a financial product or its derivatives can be obtained in a highly efficient manner based on the parallel computation.

The present system introduces the Boltzmann model, instead of diffusion models having an assumption of the standard normal distribution used in the conventional systems. Accordingly, the present system can be replaceable or substitutable for the existing financial-relating systems for evaluating risks or analyzing portfolio. This means that the hardware resources and the various types of information required in the existing system and installed by the conventional methodology can be utilized as they are. As a result, an efficient system for evaluating a price and a risk probability distribution for a financial product or its derivatives can be realized.

As the second embodiment of the present invention, a computer-readable recording medium storing a program of price and risk evaluation is provided. By installing this program into a computer and causing the computer to execute the following operations, a price/risk evaluation system can be built up. Namely, an initial value setter of the computer system inputs at least one of the initial values of a price, a price change rate, and a price change direction for a financial product or its derivatives. An evaluation condition setter of the computer inputs evaluation conditions including at least time steps and the number of trials. A Boltzmann model analyzer of the computer repeats simulations of price fluctuation using a Monte Carlo method based on the Boltzmann model within the ranges of the evaluation conditions in order to obtain a price distribution or a risk distribution for the financial product or its derivatives. A velocity/direction distribution setter supplies the probability distributions of the price, the price change rate, and the price change direction for the financial product or its derivatives to the Boltzmann model analyzer. A random number generator yields a series of random numbers used for a Monte Carlo analysis in the Boltzmann model analyzer, and an output unit provides various types of outputs from the analysis result obtained by the Boltzmann analyzer.

The third embodiment of the present invention covers a computer dealing system applying the Boltzmann method and its related calculation tools. The dealing system comprises an implied volatility computation engine, a Boltzmann model computation engine, a conversion filter, and a dealing terminal. The implied volatility computation engine provides an implied volatility based on market data. The Boltzmann model computation engine evaluates an option price for a selected option product based on the Boltzmann model using the market data. The conversion filter of the dealing system converts the option price obtained by the Boltzmann model computation engine into a volatility of the Black-Sholes equation. The dealing terminal provides displaying the volatility of the Black-Sholes equation in comparison with the implied volatility calculated from the market data, or displaying the option price calculated by the Boltzmann model computation engine in comparison with an option price in market.

The present dealing system defines a unique and risk-neutral probability measure by applying the Boltzmann model used in the financial engineering field to option price evaluation, because the system can treat Leptokurcity and Fat-tail problems for a price or a risk probability distribution appropriately in a linear equation form. Consequently, the system can evaluate option prices with the risk-neutral and unique manner taking into account the Leptokurcity and Fat-tail of the price-change distribution. Applying the Boltzmann model to the option price evaluation of a selected option product allows the system to grasp the comprehensive tendency of a volatility matrix from the past transaction records varying in a wide range.

The present dealing system covers dealing of a stock price index option or an individual stock option as the option product. Consequently, the comprehensive tendency of the volatility matrix of the individual stock option can be obtained.

As described above, the present dealing system provides whole trends for volatility matrices for the individual stock option whose dealings are less active, by checking the consistency of the daily earning rates with the corresponding underlying assets. This can be achieved because the Boltzmann model is capable of pricing the options through determining a set of Boltzmann parameters as to reproducing the daily earning probability reflecting the market data for the underlying assets.

The Boltzmann model computation engine of the present dealing system has a calculation unit that calculates an option price consistent with historical information. Accordingly, a well-adjusted option price can be provided to the user via the dealing terminal.

In the present system, the Boltzmann model computation engine also has a converter that converts option prices, which were sets of exercise prices for the discrete months of the delivery, into sets of equivalent volatility from the Black-Sholes equation. The equivalent option prices and the risk parameters are obtained through interpolation of the Black-Sholes equation, and are displayed on the dealing terminal of the user.

The Boltzmann model computation engine in the present system has a table generator that generates a table of a probability density function evaluated by the Boltzmann model, and calculates an option price from the sum of inner product of vectors (i.e., Riemann sum). This arrangement increases the operation speed, and realizes a highly responsive dealing system.

As the fourth embodiment of the present invention, a dealing system comprising a dealing terminal, a theoretical option price and parameter computation engine, an interpolation unit, and an interface that receives market data. The dealing terminal functions as a graphics user interface. The theoretical option price/parameter computation engine is configured to switch between a rough computation and a detailed computation of a theoretical option price and parameters. The rough computation provides the theoretical option price and the parameters for each exercise price and for each delivery month set in the normal market-state. The detailed computation provides more detailed information including the theoretical option prices and the parameters for those exercise prices and the specified delivery months by users that are not set in the market, but designated by a user. The price interpolation unit covers pricing with the Boltzmann model up to arbitrary maturities specified by users. This dealing system provides the rough computation results to the dealing terminal as a market activity at a high speed in the ordinary state. The dealing system displays the detailed computation results on the dealing terminal for a specific price band specified by the user.

In the present dealing system, quick market display is made for the rough computation results in the normal state, rather than displaying the detailed computation results. On the other hand, the detailed computation results are displayed to timely inform the user of any changes in the market activity, by calculating the detailed theoretical price and parameters based on the Boltzmann model within the associated price range in response to the user's instruction.

As an alternative, the dealing system comprises a dealing terminal, a rough computation engine, a multi-term Boltzmann engine, an interpolation unit, and an interface. The dealing terminal functions as a graphics user interface. The rough computation engine computes a theoretical option price and parameters for an exercise value of each delivery month set in the market. The multi-term Boltzmann engine computes theoretical option prices and parameters at arbitrary terms based on the Boltzmann model. The dealing system normally causes the dealing terminal to display the market activity based on the rough computation result, and causes the display terminal to show the multi-term volatility in response to the user's instruction. The rough computation results are made faster than the detailed computation results. Because the present system can evaluate the term structure of volatility that does not come up in the market data until the end of time concerned, the developing efficiency of a structured bond or an exotic option can be improved.

As the fifth embodiment, a dealing system, which comprises a dealing terminal having a graphics user interface, a rough computation engine, a detailed computation engine, an interpolation unit, a position setter, an automatic transaction order unit, and an interface for receiving market data, is provided. The rough computation engine computes a theoretical price and an index for each exercise price and for each delivery month set in the market. The detailed computation engine computes detailed information including theoretical prices and parameters for exercise prices and delivery months that are not set in the market. This dealing system outputs an automatic order signal when a stock index option price or an individual stock option price reaches a predetermined automatic ordering price band. This system allows the user to visually confirm the appropriate standard with an advanced model, to set a position, and to timely order in an automatic manner.

The present dealing system with the graphical user interface (i.e., the dealing terminal) facilitates a fading processor as an alternative. In this case, the dealing system causes the dealing terminal to display an animated behavior with a fading style for a term structure of a volatility that has been converted from an option price at the money (ATM) obtained from the Boltzmann model. This arrangement can prevent mispricing due to overreactions to the market behaviors.

The present dealing system installs a risk limit setter. In this case, the dealing system alerts the user when the price in the market enters the warning area specified by the user. In other words, the system allows the user to set a risk limit, and enables the dealers concerned to conduct risk management appropriately.

The present dealing system installs an alternative-position selector, in addition to the risk limit setter unit. In this case, the dealing system alerts the user, and simultaneously causes the dealing terminal to display an alternative position. Since the alternative position is automatically selected, the system can prevent the user from suffering a loss due to overreactions to the fluctuations in the market price.

As the sixth embodiment of the present invention, a computer-readable recording medium storing a dealing program is provided. By installing this program in a computer and causing the computer to execute the following operations, a dealing system can be built up. Such a dealing system computes an implied volatility and an option price of a selected asset based on the Boltzmann model using the market data. The system then converts the option price obtained from the Boltzmann model into an equivalent volatility from the Black-Sholes equation. Finally, the system displays the equivalent volatility from the Black-Sholes equation in comparison with the implied volatility calculated from the market data, or to display the option price based on the Boltzmann model in comparison with an option price in market.

BRIEF DESCRIPTION OF THE DRAWINGS

FIG. 39 illustrates sub-screens of the dealing system, which displays, in graphs, information contained in the table, such as the implied volatility, the market prices of stock index options for each exercise price and each delivery month, using the stock indices displayed on the terminal as an underlying asset price;

FIG. 41 illustrates switching of graphs displayed on a terminal of the dealing system during the process of detailed price evaluation shown in FIG. 40;

FIG. 56 illustrates a input screen displayed on a terminal of the dealing system with the operation for position setting;

BEST MODE FOR CARRYING OUT THE INVENTION

Figure 1:
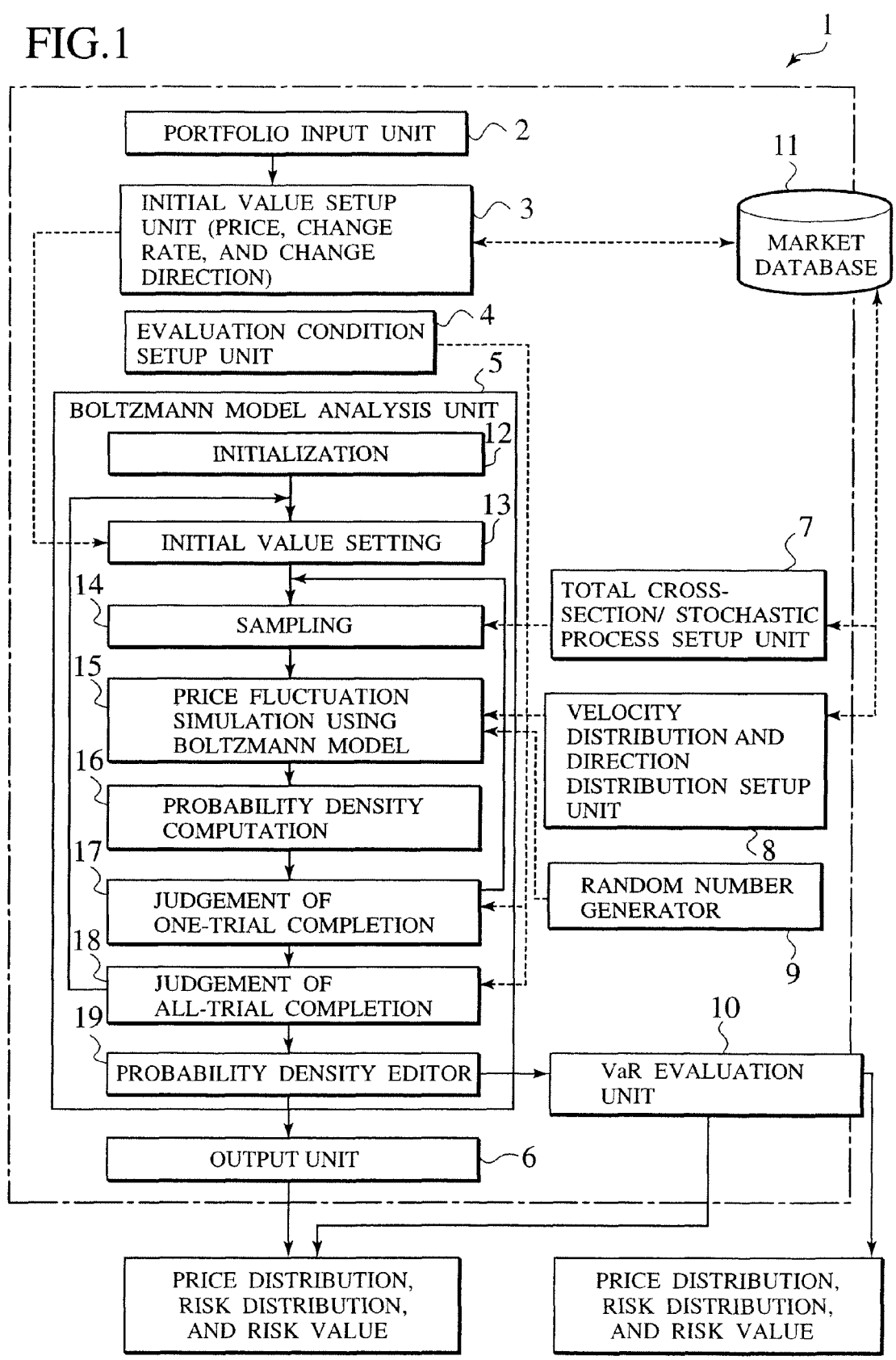
FIG. 1 represents a block diagram showing the structure and the operation flow of a price and risk evaluation system for financial products according to the present invention.

The preferred embodiment of a price and risk evaluation system for a financial product or its derivatives will now be explained with reference to the drawings. FIG. 1 illustrates both the structure and the operation flow of the price and risk evaluation system for financial products.

The price and risk evaluation system 1 includes a portfolio setup unit 2, an initial value setup unit 3 for inputting a price, a price change rate, and a price change direction, and an evaluation condition setup unit 4, a Boltzmann model analysis unit 5, an output unit 6, an total cross-section/stochastic process input unit 7, a velocity distribution/direction distribution setup unit 8, a random number generator 9, a VaR-evaluation unit 10, and a market database 11.

The Boltzmann model analysis unit 5 includes an initialization unit 12, an initial value setting unit 13, a sampling unit 14, a price fluctuation simulation unit 15 for simulating price fluctuation based on the Boltzmann model, a probability density calculating unit 16, a one-trial-completion detector 17, an all-trial-completion detector 18, and a probability density editor 19.

The rectangle defined by the long dashed line indicates the evaluation system 1 of the embodiment. The market database 11 and the VaR-evaluation unit 10 are positioned across the long dashed, which means that these elements can be connected as external units to the evaluation system 1 via data communication.

The long dashed line does not intend to define a physical boarder of computer. For example, the elements included in the evaluation system 1 can be appropriately divided if the system is designed to carry out dispersed operations, such as a client-server system.

The portfolio input unit 2 receives portfolio, and outputs a financial product or its derivatives for evaluation.

In an ordinary money management, the assets to be invested are allocated to multiple financial products or their derivatives in order to reduce a risk, and to carry out the most advantageous money management as a whole. A set of such multiple financial products or the derivatives, or the combination of these, is named portfolio. The portfolio input unit 2 extracts the financial product or its derivatives that is to be evaluated among from the portfolio, and outputs the extracted product.

Preferably, the portfolio input unit 2 has a portfolio table or database inside it, and allows a user to input the ID code of a desired portfolio. The portfolio setup unit 3 then exhibits the configuration of the portfolio, and allows the user to select a financial product or its derivatives concerned.

The portfolio input unit 2 is not an essential element of the present invention, and therefore, it may be omitted if the data required for evaluating the selected financial product or its derivative is known.

The initial value setup unit 3 supplies at least one of the initial values of the price, the price change rate, and the price change direction for the financial product or its derivatives to be evaluated, to the Boltzmann model analysis unit 5.

The initial values of the price, the price change rate, and the price change direction for the financial product or its derivatives are obtained from the past record. Preferably, the initial value setup unit 3 receives the financial product or the derivatives from the portfolio setup unit 2, and retrieves information as to the financial product or its derivatives from the market database 11. The initial value setup unit 3 then acquires the initial values of the price, the price change rate, and the price change direction for this financial product or its derivatives from the past records contained in the retrieved information. The acquired initial values are supplied to the Boltzmann model analysis unit 5. The initial-value input unit 3 is an essential element of the price/risk evaluation system 1.

The evaluation condition setup unit 4 supplies the evaluation conditions to the Boltzmann model analysis unit 5. The evaluation conditions include, for example, the number of trials, the time zone, and the price band for evaluation, which are required for analysis by the Boltzmann model analysis unit 5. The evaluation condition setup unit 4 is an essential element of the evaluation system 1, and supplies any evaluation conditions required by the Boltzmann model analysis unit 5.

The Boltzmann model analysis unit 5 is the center of the price and risk evaluation system 1. The Boltzmann model analysis unit 5 receives the initial values and the evaluation conditions from the initial value setup unit 3 and the evaluation condition setup unit 4, respectively, and repeats price fluctuation simulations for the selected financial product or its derivatives. The price fluctuation simulation is carried out based on the Boltzmann model within the range of evaluation condition, using the Monte Carlo method. The Monte Carlo method is a numerical analysis method for obtaining a rigorous solution of a Boltzmann equation.

The initialization unit 12 of the Boltzmann model analysis unit 5 initializes the values of the price, the price change rate, and the price change direction for the financial product and its derivatives to starting evaluation.

The initial value setting unit 13 of the Boltzmann model analysis unit 5 sets up the initial values of the price, the price change rate, and the price change direction of the financial product based on the inputs from the initial value setup unit 3.

The sampling unit 14 of the Boltzmann model analysis unit 5 determines a sampling width of the price fluctuation simulation. As the feature of the present invention, the sampling unit 14 can set a probability of price change per unit time based on the input from the total cross-section/stochastic process setup unit 7. This arrangement allows setting of a time grid for simulation to be omitted. Setting of a time grid was required for simulation in the conventional system, but is a difficult technique. This will be described in more detail below.

The price fluctuation simulation unit 15 of the Boltzmann model analysis unit 5 simulates the price distribution from the last price based on the probability distributions of the price change rate and the price change direction, using the Monte Carlo method.

The price fluctuation simulation unit 15 receives the price change rate and the price change direction for the financial product from the price change rate distribution and the price change direction distribution setup unit 8, in order to simulate a price distribution based on a Boltzmann model. The price change rate and the price change direction correspond to the velocity/direction distributions in the Boltzmann equation.

The price fluctuation simulation unit 15 also receives a series of random numbers generated by the random number generator 9, and computes the solution of the Boltzmann equation by the Monte Carlo method.

The probability density calculating unit 16 of the Boltzmann model analysis unit 5 integrates the price distribution simulated by the price fluctuation simulation unit 15 to obtain the probability density.

The one-trial completion detector 17 of the Boltzmann model analysis unit 5 determines whether a trial has been completed. In this context, "one trial" means a series of simulation for price fluctuations in the time period from the beginning to the end of the simulation process. The one-trial completion detector 17 can detect the completion of one trial by comparing the current point of time in the process simulation. The condition for completion of one trial is supplied from the evaluation condition setup unit 4.

If one trial has not been completed yet for a series of simulation, the process returns to the sampling unit 14 to calculate the price and the probability density for the subsequent time regime using the previous price, and distributions of the price change rate and the price change direction.

The all-trial completion detector 18 of the Boltzmann model analysis unit 5 determines whether or not the current number of trials has reached the selected number of trials given by the evaluation condition setup unit 4. The maximum trial number is supplied to the all-trial completion detector 18 from the evaluation condition setup unit 4.

The probability density editor 19 of the Boltzmann model analysis unit 5 collects the probability densities obtained from the entire trials and edits the probability density of the price fluctuation for the financial product or its derivatives. If the Boltzmann model analysis unit 5 has multiple simulators for obtaining price fluctuations in different ways in addition to the Boltzmann models, as will be explained below, the probability density editor 19 collects the probability densities from each simulator.

The foregoing is the explanation for the outline of the major components of the Boltzmann analysis unit 5. The detailed operation flow of the Boltzmann model analysis unit 5 will be explained later again.

The output unit 6 presents the calculation results obtained from the system, such as the price distribution, the risk distribution, and the integrated risk index for the selected financial products. The output unit 6 is any known output unit as long as it can output the operation results with some forms. For example, the output unit 6 can be a printer as a hard copy, a display monitor as an image, or any communication means as an external data file. The output unit 6 can also output intermediate results from the Boltzmann model analysis unit 5, such as the price fluctuation simulation results or the probability density distribution at the given trial. The output unit 6 may physically includes multiple output means.

The total cross-section/stochastic process setup unit 7 supplies a set of sampling time intervals through setting fluctuation probabilities (or frequencies) per unit time at the sampling unit 14, as has been explained in conjunction with the sampling unit 14 of the Boltzmann analysis unit 5.

The total cross-section/stochastic process setup unit 7 acquires the frequencies of price change and the price change rates for the selected financial product or its derivatives from the market database 11, and supplies total cross sections, which are defined as the ratios of the frequency of price change to the price change rate, to the Boltzmann equation.

The total cross-section of the Boltzmann equation corresponds to the frequency of price change for the financial product or its derivatives, which will be described in more detail below. If a sampling time grid is used instead of the frequency of price change, as in the conventional system, then the total cross-section/stochastic process setup unit 7 can be omitted.

The velocity distribution/direction distribution setup unit 8 supplies the distributions of the price change rate and the price change direction to the simulator 15, as has been explained.

The velocity distribution/direction distribution setup unit 8 acquires the past records for the financial product from the market database 11, and obtains the distributions of the price change rate and the price change direction from the past data. The distributions are then supplied to the simulator 15.

Preferably, the velocity distribution/direction distribution setup unit 8 has a numerical analysis function. With this function, the distribution setup unit 8 is capable of estimating the distribution of price change rate from the past data using a sigmoid function and its approximate function. Alternatively, the distribution setup unit 8 can determine a set of parameters for the sigmoid function for the distribution of the price change rate using the price change rate of the previous day. The distribution setup unit 8 also estimates the distribution of the price change direction taking the correlation between the probability of price-up and the probability of price-down into account, or alternatively, taking the correlation between the price change rate and the price change direction into account. The distribution input unit 8 is also capable of generating a probability distribution corresponding to the price, if the distributions of the price change rate and of the price change direction are dependent on the price.

The random number generator 9 produces a random number used in the Boltzmann model analysis unit 5 to simulate a price fluctuation using the Monte Carlo method. The generated random number is supplied to the price fluctuation simulation unit 15, as has been described above. Application of this random number will be explained below.

The velocity distribution/direction distribution setup unit 8 and the random number generator 9 are essential elements for the Boltzmann model.

The VaR-evaluation unit 10 calculates a risk or a risk distribution from the price distribution for a selected financial product or its derivatives.

Several devices for calculating a risk or a risk distribution for a financial product or its derivatives from the price distribution for the financial product have been conventionally realized as VaR-evaluation device. That is, the provability density computed by the Boltzmann model according to the present invention can be transferred to any conventional VaR-evaluation unit 10, which then provides a price distribution, a risk distribution, and a risk value integrated as an index for the outputs.

The VaR-evaluation unit 10 is not essential to the present invention because any conventional devices may be used as the VaR-evaluation unit 10.

The market database 11 stores information about financial products and their derivatives. In the specification, the term "database" includes data itself systematically stored in the database, data search engines, and hardware capable of storing the data.

Although the market database 11 is essential to the present invention, any existing external database may be used. To this end, a system using an existing database together with the other essential elements of the present invention falls into the scope of the present invention.

The foregoing is the configuration of the price and risk evaluation system 1 of an embodiment of the present invention. Preferably, the elements conducting data processing may be included in the CPU of a computer that activates installed programs and controls the respective tasks. In this case, different processing means may be included in the same hardware with parallel ways. The input units among the above-described elements may be an ordinary keyboard or pointing device. If data is acquired from other data files via data communication, the data communication means itself becomes the input unit.

Hereafter, the theoretical backgrounds are described to clarify the reason why the Boltzmann model introduced into the present invention to conduct risk analysis for financial products can correctly estimate the price change probability distributions for the financial products with higher freedom than the conventional financial models.

Basically, the present invention needs to input several parameters, for the Boltzmann equation, which include an initial price, a distribution of price change rate, a distribution of price change direction, and time domain concerned for each financial product. With these parameters, the Boltzmann equation is solved using the Monte Carlo method, and the price and risk distributions obtained at a specific time domain as solutions of the equation.

First, the time-dependent behaviors of price for a selected financial product or its derivatives are described by a Boltzmann equation. The present invention applies a neutron transport Boltzmann equation, which is generally used to design a nuclear reactor as the established methodology in the nuclear industry.

Neutron transport Boltzmann equation is an equation for describing a macroscopic behavior of neutrons. A model for explaining a phenomenon based on a Boltzmann equation is called the Boltzmann model.

In a neutron-relating Boltzmann model, the position of a neutron is defined by the seven-dimensional vectors r, v$\Omega$, and t. Here, r=(x, y, z) denotes a vector in the position space of the Cartesian coordinates, v$\Omega$=(v$\Omega_x$, v$\Omega_y$, v$\Omega_z$) is vector in the velocity space, and t denotes time. A set consisting of the seven-dimensional vectors is called a phase space.

A general formula of the neutron transport Boltzmann equation is as follows.

$$-\frac{\partial \phi(r, v, \Omega; t)}{v \partial t} = \Omega \cdot \nabla \phi(r, v, \Omega; t) + \Sigma_t(r, v) \phi(r, v, \Omega; t) - \int dv' d\Omega' \Sigma_s(r, v', \Omega' \to v, \Omega) \phi(r, v', \Omega'; t) - S(r, v, \Omega; t) \quad (6)$$

In the equation (6), the important quantities are $\Sigma_t$(r, v) and $\Sigma_s$(r, v', $\Omega' \to$ v, $\Omega$), which are a microscopic total cross-section and a double differential cross-section, respectively. These quantities indicate probabilities of neutron collisions and scattering per unit length.

Microscopic cross-section is a product of an atomic number density (unit is $cm^{-3}$) and a microscopic cross-section in the reactor physics. The microscopic cross-section is determined by the nuclide (for example, uranium, oxygen, hydrogen, and so on) existing in a nuclear reactor. On the other hand, the microscopic cross-section is an effective cross-section of a nucleus (unit is $cm^2$) giving the collision probability between one nucleus and one neutron. The name "cross-section" is derived from the unit that expresses an area of nucleus.

Since a concept similar to the atomic number density has not been found in the financial engineering field, the microscopic cross-section and the microscopic cross-section can not be distinguished. Thereupon, if the neutron transport Boltzmann equation is applied to finance, the microscopic cross-section and the microscopic cross-section are consolidated in a single concept for cross-section. In physics, the double differential cross-section corresponds to the velocity and the angle distributions of a neutron emitted from the nuclear reactions.

It is impossible to solve an arbitrary Boltzmann equation analytically with a deterministic way, because the cross-section changes complicatedly in the phase space. On the contrary, it is known that the Monte Carlo method is capable of solving the Boltzmann equation without any approximation.

To explain the means for solving the problem, equation (6) is simplified, and a one-dimensional and homogeneous problem with no internal neutron source will be discussed. In the neutron transport theory under a one-dimensional problem, a homogeneous distribution is assumed the y and z directions. Accordingly, the vector $\Omega$ is a three-dimensional vector in the one-dimension problem. In order to discuss the one-dimensional and homogeneous problem applied to the financial field, the Brownian motion of a price for a single stock will be described hereafter. The direction is denoted by $\mu$ indicating "rise" and "fall" only, and the other directions are not defined.

Equation 6 is written as equation (7).

$$-\frac{\partial \phi(x, v, \mu; t)}{v \partial t} = \mu \frac{\partial \phi(x, v, \mu; t)}{\partial x} + \Sigma_t(v) \phi(x, v, \mu; t) - \int dv' d\mu' \Sigma_s(v', \mu' \to v, \mu) \phi(x, v', \mu'; t) \quad (7)$$

If the velocity v of equation (7) can be integrated into the representative velocity u, and if the angle distribution is isotropic, then equation (7) can be deduced to equation (8).

$$\frac{\partial \phi(x; t)}{v \partial t} = D \frac{\partial^2 \phi(x; t)}{\partial x^2}. \quad (8)$$

The Diffusion Coefficient Becomes $$D = \frac{1}{f \Sigma_t(u)} \quad (9)$$

here, f is the degree of freedom of the system. In this one-dimensional and homogeneous problem without an internal neutron source, f takes a value of "1" ideally, because the other directions are undefined.

The flux expression is very convenient for a neutron transport problem. The flux expression gives many advantages to the Monte Carlo simulation. Neutron transport Monte Carlo simulation is characterized by many effective variance-reduction techniques. These techniques can be introduced using flux expression. However, describing a financial Monte Carlo with the flux expression is likely to cause confusion, and therefore, the conventional density expression will be used temporarily.

A neutron density function p (x, v, μ; t) is given by the solution of Boltzmann equation (10).

$$-\frac{\partial p(x, v, \mu; t)}{\partial t} = v\mu \frac{\partial p(x, v, \mu; t)}{\partial x} + \Sigma_t(v) v p(x, v, \mu; t) - \int dv' d\mu' \Sigma_s(v', \mu' \to v, \mu) v' p(x, v', \mu'; t) \quad (10)$$

Equation 8, which is a neutron diffusion equation, is also rewritten as $$\frac{\partial P(x; t)}{\partial t} = D' \frac{\partial^2 P(x; t)}{\partial x^2}. \quad (11)$$

The density function P (x; t) is an integration of p (x, v, μ; t) at velocity v and angle μ. The diffusion constant in the density expression becomes $$D = \frac{u^2}{f \lambda_t} \quad (12)$$

here, $\lambda_t$ is a frequency of collision between a neutron and a medium, and is expressed as $$\lambda_t = u \Sigma_t(u). \quad (13)$$

If the concept of the diffusion constant D' and the concept of the volatility are the same, then equation 12 stands, and the volatility σ becomes $$\sigma = \sqrt{\frac{2u^2}{\lambda_t}}. \quad (14)$$

Equations 13 and 14 show that the neutron velocity and the total cross-section are connected to volatility. A typical volatility σ takes a value of square root of 0.1 per year [year$^{-1}$]. If the price changes once a day, the collision frequency $\lambda_t$ becomes 365/year. Here, u is evaluated as being 0.0117/day, which is substantially equal to the average of the stock-price change rate per day.

A numerical example of the total cross section is indicated by equation (15).

$$\Sigma_t(u) = \frac{2u}{\sigma^2} \quad (15)$$
$$= \frac{2 \times 0.0117 [1/day] \times 365 [days/year]}{0.1 [1/year]}$$
$$= 85.4$$

The total cross-section ($\Sigma_t$) is in inverse proportion to square of volatility, as shown in equation (15). This relationship guarantees the equivalence between the volatility in the financial technology and the total cross section in the Boltzmann model.

Based on this relationship, the Boltzmann equation can provide a basis for determining a price or a risk for a financial product or its derivatives by relating the variables in the neutron transport Boltzmann equation, such as position x, volocity v, angle μ, and time t, with the price x, the price change rate v per unit time, the price change direction μ, and the transient time t for a financial product or its derivatives, respectively.

No concept relating to the concept of neutron double differential cross section has been defined yet in the financial technology. However, in order to apply the Boltzmann model to the financial technology, the double differential cross section should be defined. In this embodiment, an evaluation technique for a neutron cross section is applied directly to determine the double differential cross section of a stock price.

The cross section can be evaluated from the experimental data and theoretical computation due to nuclear physics for the neutron transport problem. At present, there is no established theory for evaluating the cross section for a stock price, and accordingly, the double differential cross section is determined from the market data, that is, for example, stock prices announced on newspapers, internets, and so on.

In the evaluation, the distribution of the price change rate v per unit time is estimated from the past records for stock prices using a sigmoid function and the approximation form.

In the Boltzmann model, the velocity distribution term of the double differential cross section must be determined by defining a sigmoid function of the price change rate v using the price change rate v' corresponding to the daily return for the previous day.

Furthermore, in solving the Boltzmann equation, the direction distribution term of the double differential cross section in Boltzmann equation can be determined as the direction change probability for a financial product or its derivatives, from the past data for the financial product.

If there is a correlation between the price-up (or upspring) probability and the price-down (or downfall) probability along the price change direction for the financial product, this correlation can be taken into account for determining the direction distribution term of the double differential cross section in the Boltzmann equation. Taking the correlation into account allows a probability drift to be evaluated in detail.

There are two types of price distributions, namely, a symmetrical distribution with respect to the expected value, and an asymmetric distribution with respect to the expected value. A symmetrical distribution can be obtained by separating variables into the velocity distribution term and the direction distribution term of the double differential cross section. An asymmetrical distribution can be obtained by taking the correlation between the distribution of the price change rate and the probability of the direction change into consideration.

Under the Boltzmann model, there are two types of problems, namely, a homogeneous problem, in which the cross section is independent of a price, and a heterogeneous problem, in which the cross-section is dependent on the price. The homogeneous problem treats the distributions of the price change rate and the price change as constant concerning the price x for the financial product. On the contrary, the heterogeneous problem treats the distributions of the price change rate and the price change direction as variable in response to the price x for the financial product.

In this manner, the Boltzmann model is capable of comprehensively describing both cases in which the volatility is dependent and independent of the price, by applying the Boltzmann equation to a homogeneous problem and a heterogeneous problem. In contrast, it was difficult for the conventional technique to treat such a realistic situation with the volatility dependent on the price.

The Boltzmann model is also capable of treating both a linear problem, in which the cross section is independent on the probability density or the flux for the financial product, and a nonlinear problem, in which the cross section is dependent on the price with a consistent manner.

Again, the Boltzmann model can comprehensively describe both cases, in which the volatility is dependent on the price as non-linear problem and independent of the price as linear problem in a consistent manner Another advantage of the Boltzmann model is a fact that a product (or a flux) of the probability density function and the price change rate per unit time for the financial product is introduced for applying a variance reduction method in order to improve the computation efficiency.

Introducing the concept of flux makes it possible to simulate a price fluctuation for a financial product at arbitrary time. To be more precise, the probability of the price for the financial product is evaluated from the estimated track-length of the flux for the financial product, which is just like the track-length estimator in the neutron diffusion equation. This arrangement is capable of reducing the variance in the Boltzmann analysis using a Monte Carlo method.

The Boltzmann model also introduces the concept of point detector used in the neutron transport calculation, in addition to the concept of the flux, into evaluation of price fluctuation for the financial product or the derivatives. This arrangement can also reduce the variance of the Boltzmann model analysis using a Monte Carlo method.

For example, using all of or a part of the events of price fluctuation for the financial product to evaluate the probability at an infinitesimal time band and an infinitesimal price band, the variance can be reduced. No events of price change are likely to occur or no fluxes can pass through in such an infinitesimal band during the random sampling, or no fluxes can pass.

Another method for reducing the variance is to calculate an adjoint probability density and an adjoint flux of the price change for the financial product or the derivatives, and weight the sampling in proportion to the adjoint probability density and the adjoint flux. This method is also based on the introduction of the concept of the flux.

The Boltzmann model is applicable to multiple financial products or the derivatives that requires consideration of the correlation among these products.

When evaluating a portfolio that is financial derivative product consisting of a combination for multiple financial products, the correlation among the financial products or their derivatives are taken into account, the Boltzmann model can be adopted to the conventional evaluation system.

In the field of financial engineering, the Ito's theorem is well-known. According to the Ito's theorem, if a financial product obeys the Ito's process, then the derivative product also obeys the Ito's theorem. The Ito's theorem is applicable to the Boltzmann model as well. Accordingly, when evaluating a price or a risk for a financial derivative product in the Boltzmann model, the price distribution of the derivative product can be propagated by the original underlying assets, based on the Ito's theorem. Thus, technique of the present invention can be applied to conventional price and risk evaluation systems. As a result, the Boltzmann model can be employed in the conventional systems.

Finally, the Boltzmann model of the present invention carries out simulations for price fluctuation, and accumulates the probability distribution of individual simulation to obtain the price distribution and the risk distribution. Accordingly, simulations of price fluctuation can be executed in the parallel manner by the price fluctuation simulator 15 and the probability density computation unit 16 to improve the operation speed.

The foregoing is the theoretical background of introducing the Boltzmann model for risk analysis of the financial product. Subsequently, the price distribution and the risk distribution for the financial product by the Boltzmann model will be explained in detail using actual examples of analysis results.

Figure 2:
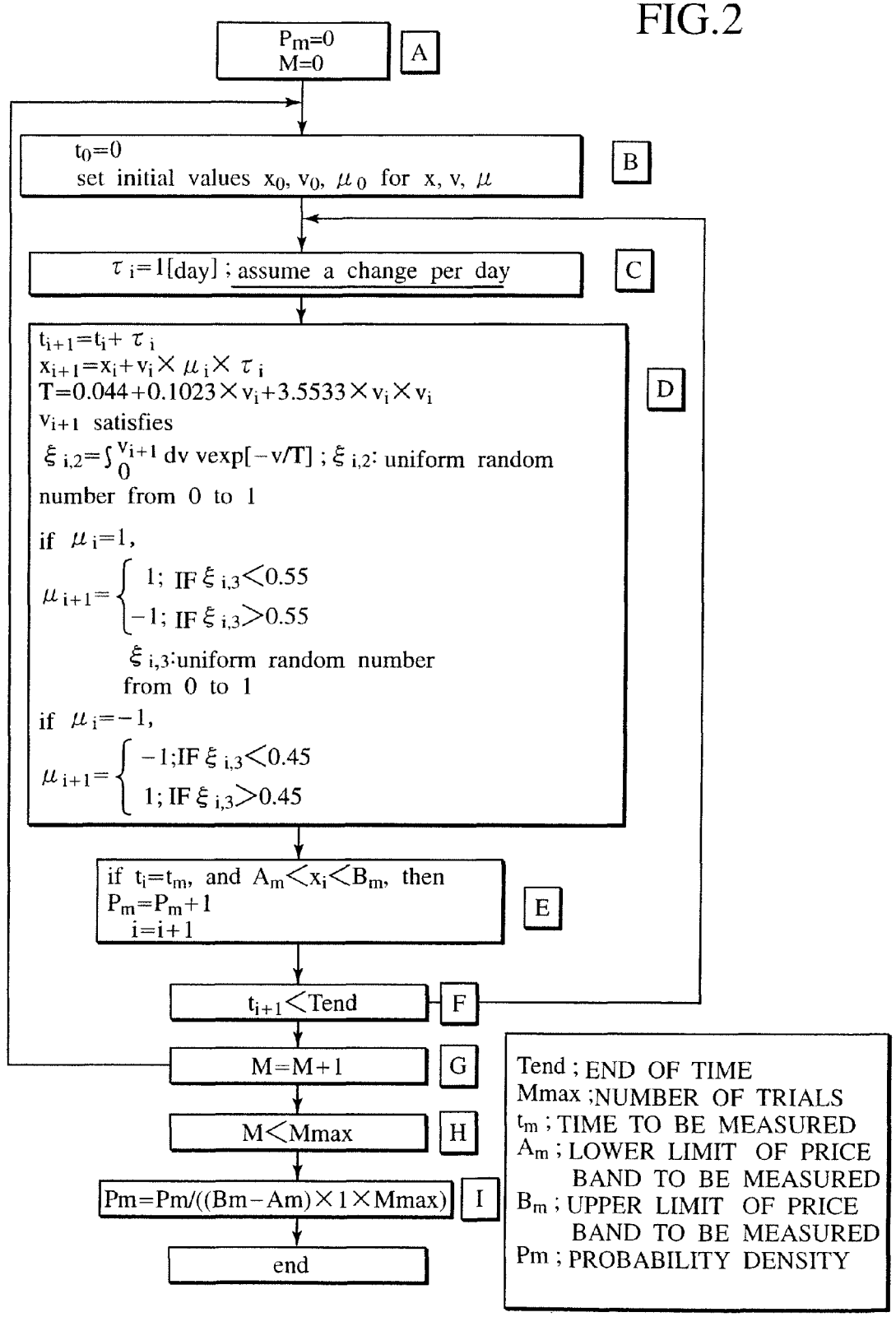
FIG. 2 illustrates an operation flow of the Boltzmann model analysis unit according to the present invention.

FIG. 2 illustrates the operation flow of the Boltzmann model analysis unit 5. The Boltzmann model analysis unit 5 executes the steps A through I, as shown in FIG. 2.

Step A is initialization of the Boltzmann equation. The initialization unit 12 executes this step.

Step B gives initial values of Boltzmann equation. Solving the Boltzmann equation is equivalent to obtaining the Green's function of the Boltzmann equation having a source term. The Green's function represents virtual particle diffusion distribution in the phase space from a point source. By setting the initial values $x_0$, $v_0$, and $\mu_0$ for the price x, the price change rate v, and the price change direction $\mu$, the source term of the Boltzmann equation is given. This step is carried out by the initial value setting unit 13.

Step C determines a sampling method. In this example, it is assumed that the price changes once a day. Sampling in accordance with the frequency of price change based on the total cross-section will be described later. The sampling unit 14 executes step C.

Step D simulates price fluctuation using the Monte Carlo method.

The Integral $$\xi_{i,2} = \int_0^{v_i+1} dv \cdot v \exp\left[-\frac{v}{T}\right] \tag{16}$$

integrates formula $v \cdot \exp[-v/T]$, which form has similarity with an empirical form for neutron kinetic energy emitted in fission reaction with the velocity term in the differential cross-section. In other words, price fluctuation is simulated by giving a velocity distribution to the Boltzmann equation, and by calculating $v_{i+1}$ satisfying the probability associated with random numbers having been generated. The price fluctuation simulator 15 carries out step D.

In the example shown in FIG. 2, the price change direction is simulated in such a manner that the price-up direction $\mu_{i+1}$ equals $1 (\mu_{i+1}=1)$ and the price-down direction $\mu_{i+1}$ equals $-1 (\mu_{i+1}=-1)$ simply from the value of the random number.

Step E carries out integration of the Green's function to obtain the probability density Pm. The probability density computation unit 16 carries out step E.

Step F determines whether or not one trial has been completed. The one-trial completion detector 17 executes step F. If one-trial has not been completed yet, the process returns to step C.

Steps G and H determine whether or not all trials have been completed. If all trials have not been completed yet, the process returns to step B. The all-trial completion detector 18 carries out steps G and H.

Step I edits the calculated probability density, which is carried out by the probability density editor 19.

Figure 3:
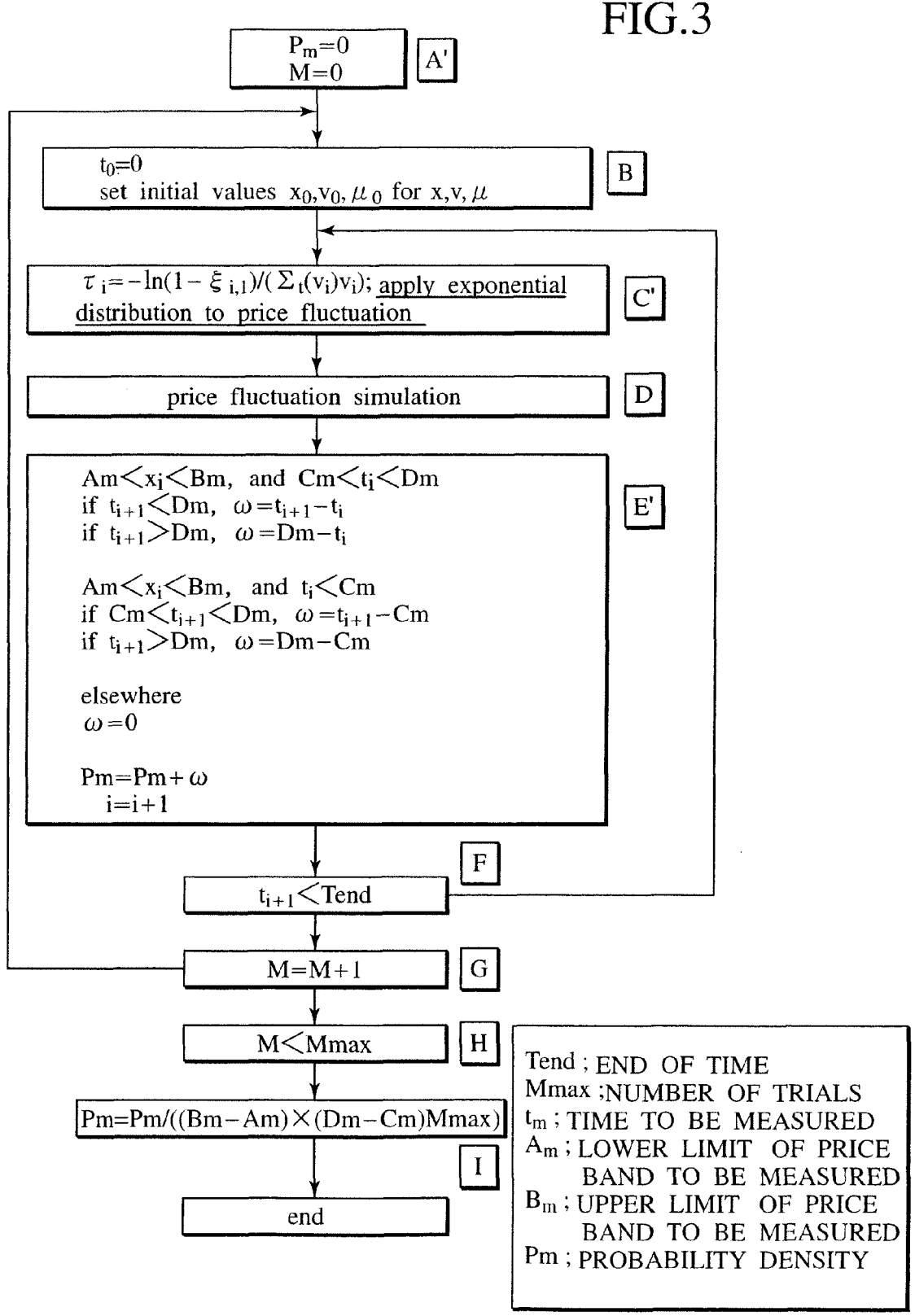
FIG. 3 illustrates another operation flow of the Boltzmann model analysis unit which uses a price change frequency; according to the present invention.

In the example shown in FIG. 2, sampling is conducted on the assumption that a price change occurs once a day. FIG. 3 illustrates another example, in which the sampling interval is set in response to the frequency of price change.

The process shown in FIG. 3 is almost the same as that shown in FIG. 2, except for steps C' and E'. In step C', the sampling interval set in accordance with the frequency of price change. The microscopic total cross-section in the Boltzmann equation means the inverse of the mean free path (which is the average distance from one collision to the next collision) of the neutron. A collision frequency (which is the collision probability per unit time) is the product of the total cross-section and the velocity v. By applying this to the change of a stock price, simulation of price fluctuation can be carried out without setting a time grid, as long as the stochastic process of the change in the stock price and the total cross-section are known.

In the conventional technique, using $\Delta t$ as a certain change in time, the price after $\Delta t$ is simulated by a normal random number having a standard deviation of $\sigma\sqrt{\Delta t}$. For this reason, the time grid $\Delta t$ must be set as an indispensable step for conducting an accurate simulation. On the contrary, with the price and risk evaluation system of the present invention, setting of the time grid can be omitted in step C'.

In step C' shown in FIG. 3, the index distribution used in the simulation of price fluctuation is expressed as $$\tau_i = \frac{-\ln(1-\xi_{i,1})}{v_i \Sigma_t(v_i)}. \tag{17}$$

In step C', the stochastic process and the total cross-section are supplied from the all cross-section/stochastic process input unit 7.

In step D of FIG. 3, price fluctuation is simulated in accordance with the sampling method mentioned above. The price fluctuation simulation itself is substantially the same as the simulation of step D shown in FIG. 2.

The difference is that the sampling interval changes in response to the frequency of price change in the process shown in FIG. 3. The sampling interval is adjusted by determining whether the next sampling position resides within the observation area (Am, Bm, Cm, Dm) after every price simulation.

Figure 4:
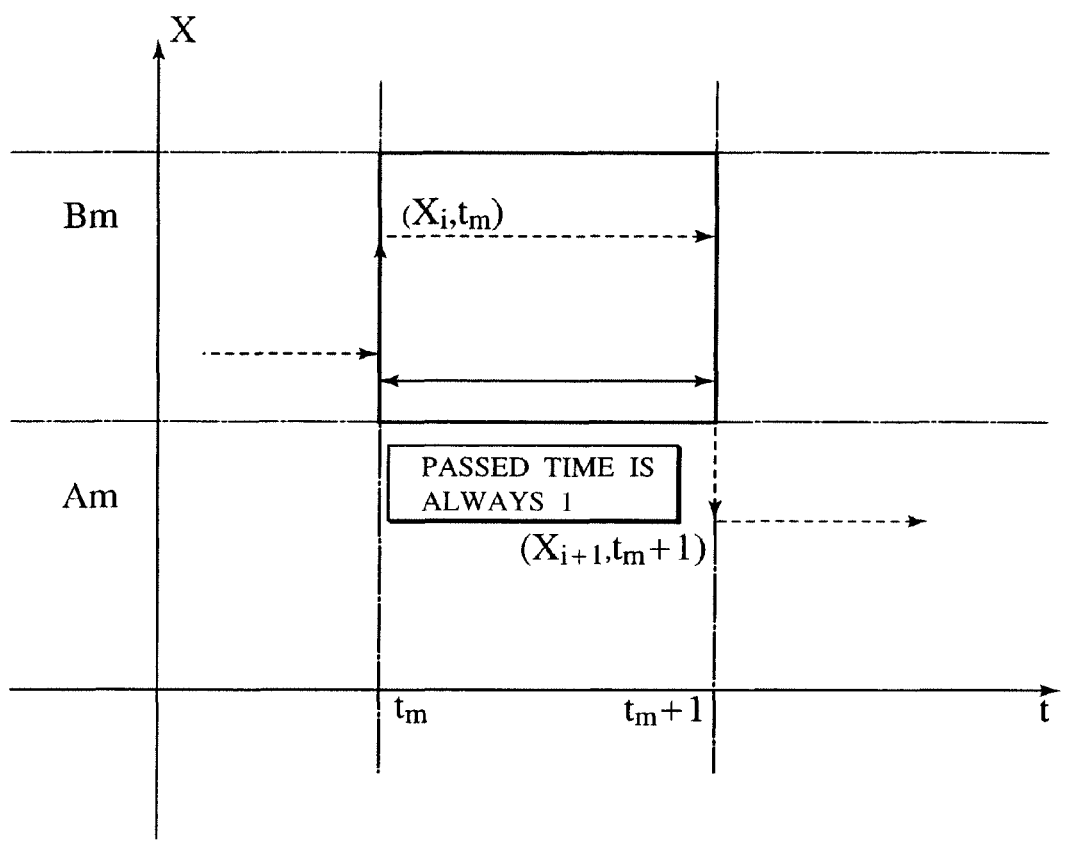
FIG. 4 schematically illustrates the simulation results of the operation flow of FIG. 2 in the observation areas.
Figure 5:
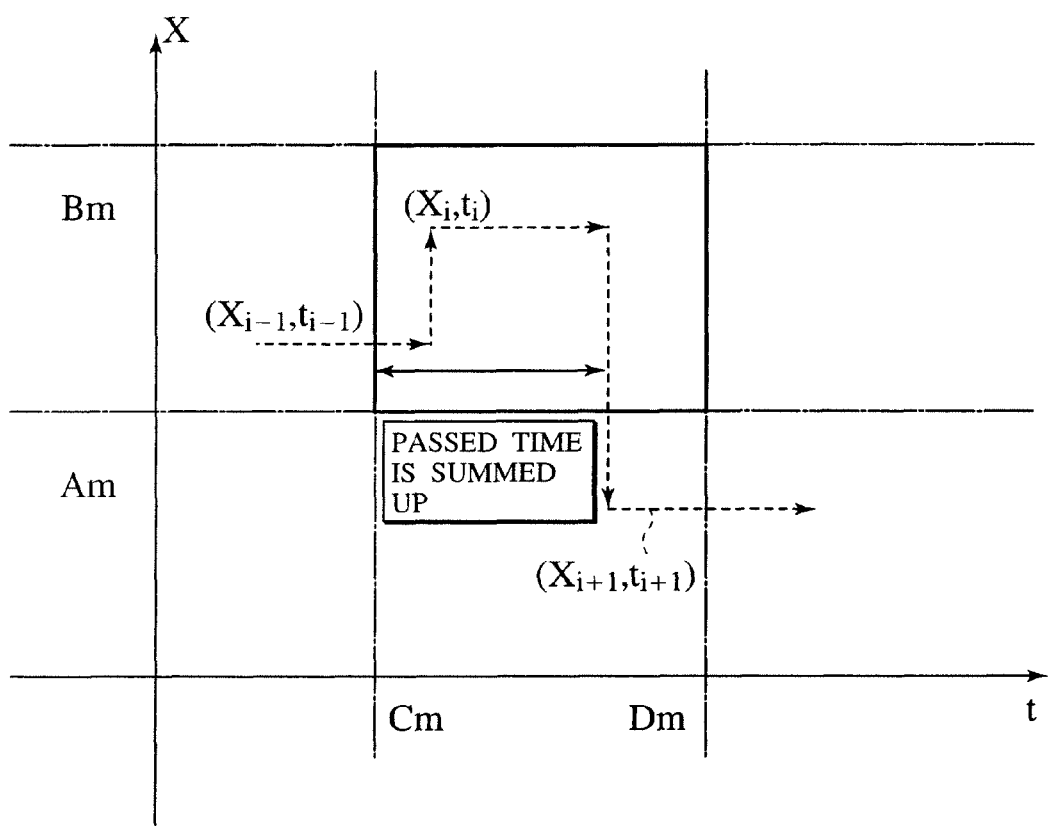
FIG. 5 schematically illustrates the simulation results of the operation flow of FIG. 3 in the observation area.

FIGS. 4 and 5 schematically show the simulation within a predetermined observation area corresponding to the processes of FIGS. 2 and 3, respectively. Especially, it is clearly shown in FIG. 5 that the price fluctuation can be simulated at a specific time interval depending on the frequency of price fluctuation, irrespective of the time grid.

The simulation method of price fluctuation based on the Boltzmann model according to the present invention can also carry out simulation based on the conventional diffusion model if equation 18 is used as a function describing time T, direction M, and velocity V.

$$T(\xi_{3i+1}, x_{i-1}, v_{i-1}, \mu_{i-1}) = -\frac{\ln(1-\xi_{3i+1})}{\lambda} \tag{18}$$

$$M(\xi_{3i+2}, x_{i-1}, v_{i-1}, \mu_{i-1}) = \begin{cases} 1 & (\text{if } \xi_{3i+2} \geq 0.5), \\ -1 & (\text{if } \xi_{3i+2} < 0.5) \end{cases}$$

-continued $$V(\xi_{3i+3}, x_{i-1}, v_{i-1}, \mu_{i-1}) = \begin{cases} v_0 + \left(r - \frac{\sigma^2}{2}\right) & (\text{if } \mu_{i-1} = 1), \\ v_0 - \left(r - \frac{\sigma^2}{2}\right) & (\text{if } \mu_{i-1} = -1) \end{cases}$$

The results of two examples will be shown below.

EXAMPLE 1 r=0.05, $\sigma^2$=0.11, and T=0.25 year

The lower and upper limits Am and Bm of x (price) shown in the flowchart of FIG. 3 define a price band, which is determined by dividing the range of $-3\sigma>x>3\sigma(\delta x=0.1\sigma)$ by 60. The lower limit Cm and the upper limit Dm of time t define a time band, where Cm equals 0.25 [years] and Dm equals Cm+(1/365) [years]. An evaluation quantity $\omega_i$ is 1.

Figure 6:
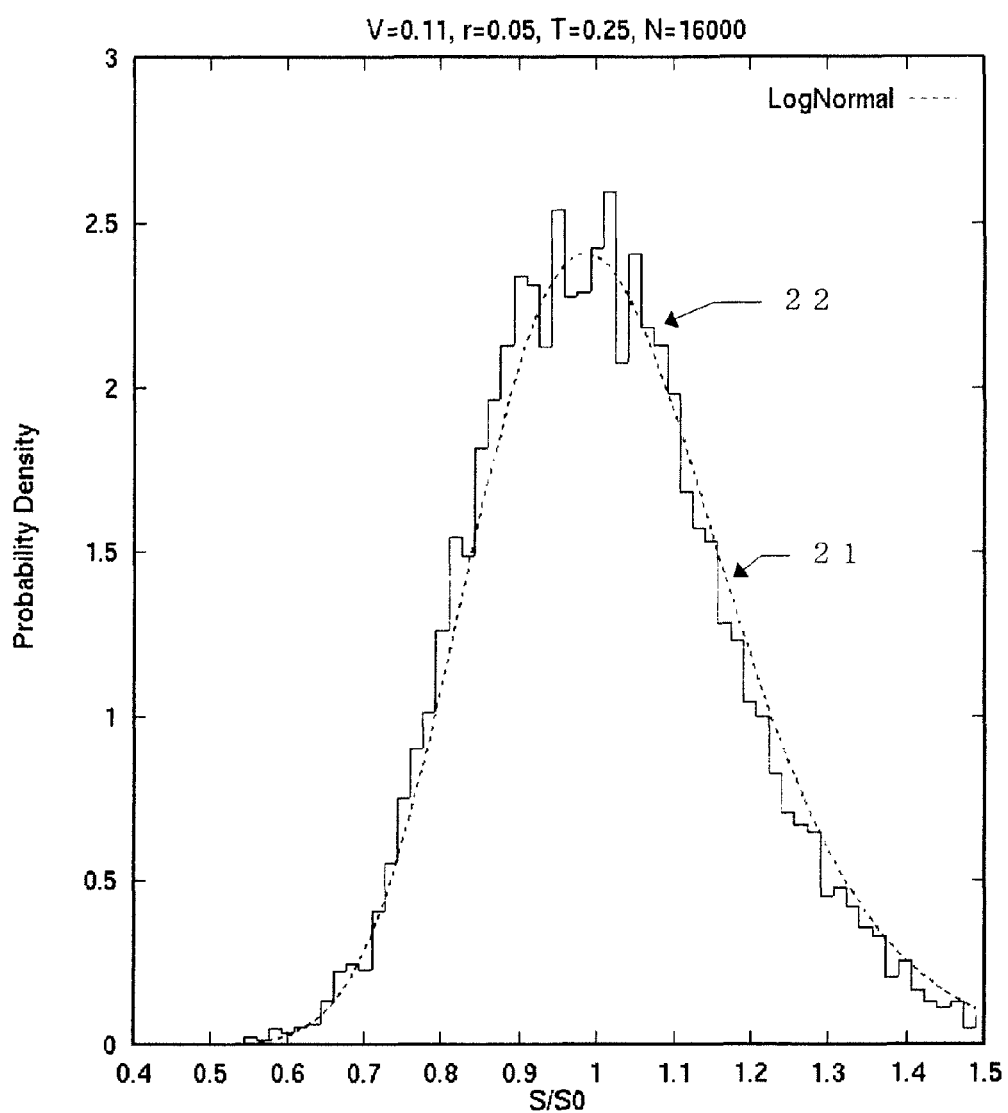
FIG. 6 is a graph showing a probability distribution simulating a diffusion model using the Boltzmann model according to the present invention.

FIG. 6 shows the evaluation result of example 1 using the solid line 22 in comparison with the theoretical distribution (i.e., the logarithmic normal distribution) indicated by the dashed line 21. As is clear from FIG. 6, the simulation result of the present invention indicated by the solid line 22 is almost coincident with the theoretical distribution 21.

EXAMPLE 2

$\sigma^2$=0.1, r=0.05 and r=0

Figure 7:
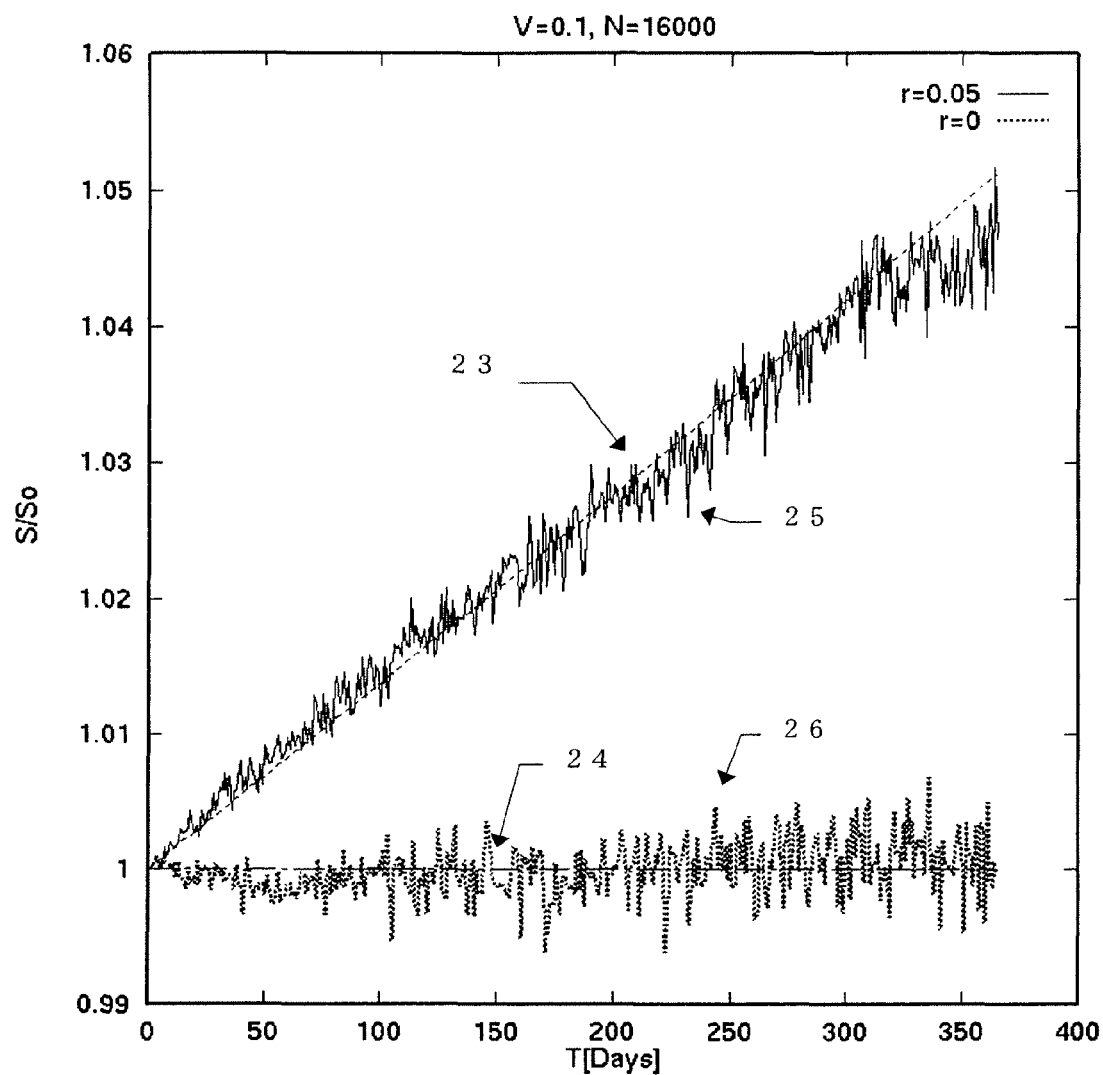
FIG. 7 is a graph showing price changes simulating the diffusion model using the Boltzmann model according to the present invention.

The lower and upper limits Am and Bm of x shown in the flowchart of FIG. 3 are set to Am=$-\infty$ and Bm=$+\infty$. The time band defined by Cm and Dm are from 0 to 365 [day] with $\delta_t$=1 [day]. The evaluation quantity $\omega_i$ is x. In FIG. 7, the dashed line 23 indicates the theoretical distribution 23 under a drift, and the long dashed line 24 indicates the theoretical distribution 24 without a drift. The simulation results 25 and 26 obtained in example 2 substantially reproduce the theoretical distributions with and without a drift.

The velocity distribution and the direction distribution used in the above-explained simulation are the probability distribution same as the standard Gaussian distribution. Consequently, the probability density obtained by the simulation becomes equivalent to that of the diffusion model.

In order to realize the Boltzmann model, the velocity distribution and the direction distribution must be evaluated.

An example of how to evaluate the velocity distribution will be now explained. To apply the geometric Brownian motions, the natural logarithm of stock price is defined as x. This corresponds to the position x of a neutron.

From stock prices of about sixty Japanese electric machinery makers over three years, the velocity distribution and the direction distribution are evaluated. To define x, the natural logarithm of the closing price (or the last price) of each day is input to x. An incident velocity v' is defined as the absolute value of the difference between natural logarithm of the closing price of the current day and natural logarithm of the closing price of the previous day. A current velocity v is defined as the absolute value of the difference between the natural logarithm of the closing price of the current day and the natural logarithm of the closing price of the next day.

The incidence direction $\mu'$ is represented by the negative or positive sign of v', and the current direction $\mu$ is represented by the negative or positive sign of v. Since a change per day is observed, the deterministic drift term (e.g., a non-risky interest rate) is omitted. If any drifts are found in the simulation using the actual data mentioned above, it is a purely stochastic drift.

Figure 8:
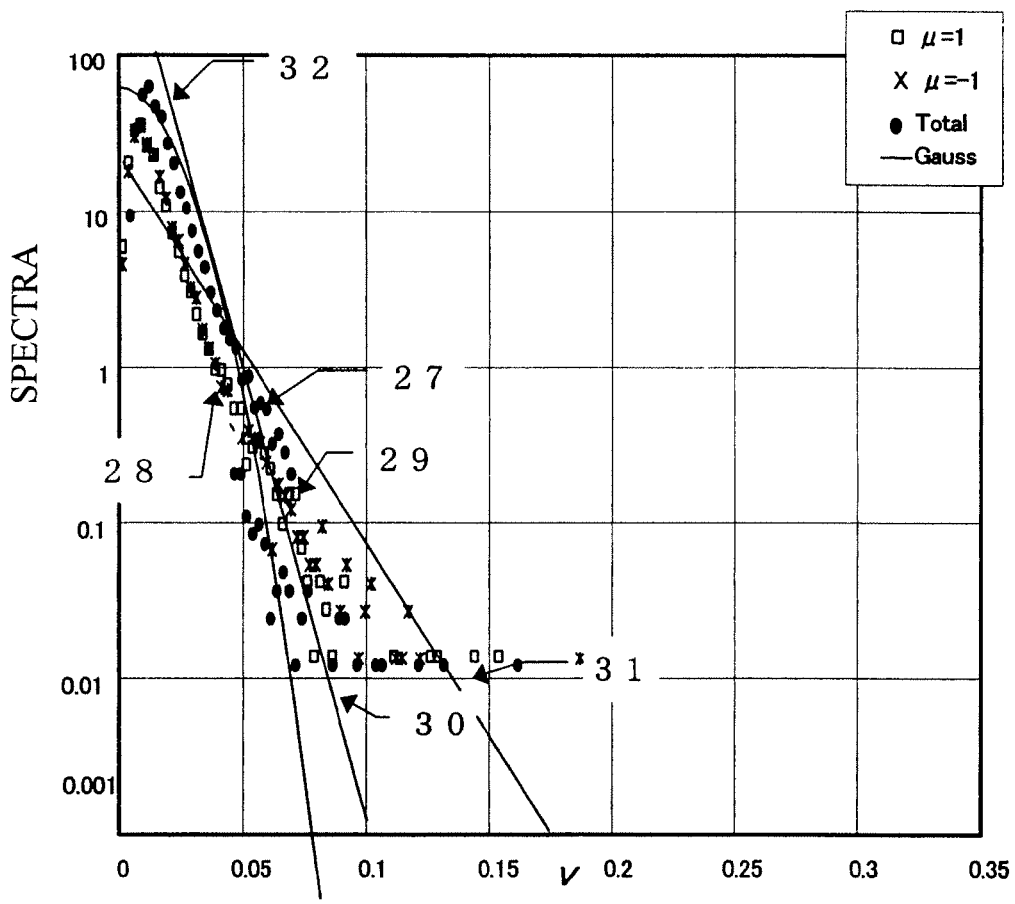
FIG. 8 is a graph showing required spectra with respect to the price change rate v of stock prices.

In order to obtain the velocity distribution of the stock price, the spectrum shown in FIG. 8 is required. The spectrum is the integral of x, μ, t of the density p (x, v, μ; t), and is expressed by equation (19).

$$S(v) = \int dt d\mu dx \cdot p(x,v,\mu;t) \tag{19}$$

In FIG. 8, the darkened circle (●) indicates the total spectrum 27 expressed by equation (19). The spectra of the negative (or price-down) direction and the positive (or price-up) direction are indicated by stars (*) and white squares (□) 29, respectively. The price-down spectrum S_(v) and the price-up spectrum S_+(v) are expressed as $$S_-(v) = \int dt dx \cdot p(x, v, -1; t) \tag{20}$$

$$S_+(v) = \int dt dx \cdot p(x, v, 1; t)$$

Although the two spectra are slightly different in size, the shapes are the same. This result shows that the velocity distribution and the direction distribution are independent of each other. These distributions are described by the sigmoid function expressed by equation 21 and its approximation using the Maxwell distribution as a typical example.

$$f(v) \propto \frac{v^k \zeta \ g\exp[\gamma v]}{g\exp[\gamma v] + \zeta - g} \tag{21}$$

here, v, k, ζ, g, and γ are arbitrary real numbers.

These spectra are approximated as indicated by the steep slop 30 and the gentle slop 31. In other words, the two spectra correspond to the two components, namely, the steep slope component and the gentle slope component. The curve 32 indicates the Gaussian distribution. The Gaussian distribution almost reproduces the steep slope component, but it evaluates the gentle slop component excessively small.

Figure 9:
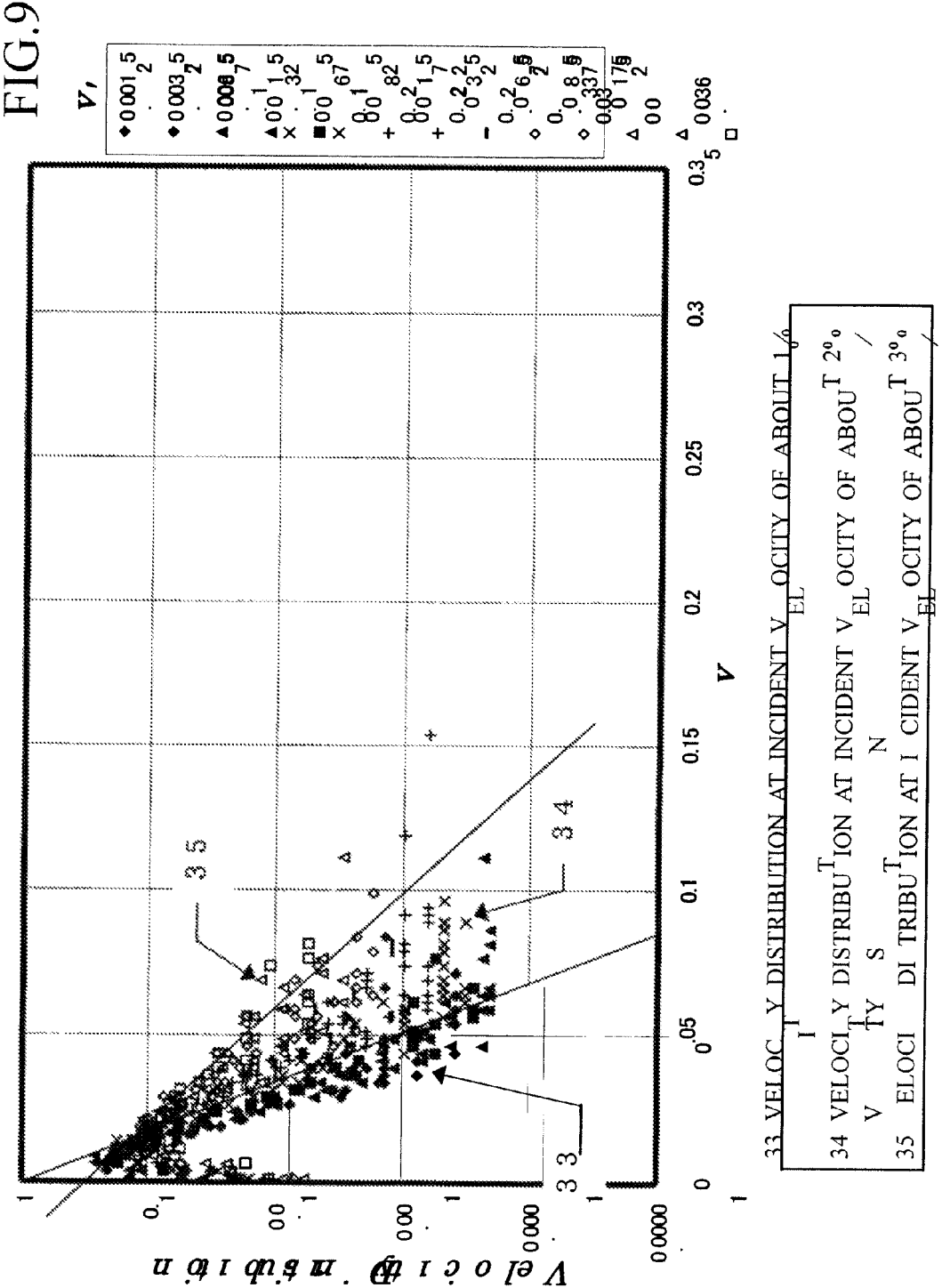
FIG. 9 is a graph showing the dependency of the spectra on the incident velocity v'.

FIG. 9 exhibits the dependency of the spectra on the incident velocity. The darkened marks 33, the cross marks 34, and the white marks 35 represent the velocity distributions with the incident velocities of about 1%, about 2%, and about 3%, respectively. These distributions are normalized to 1.0 with integration.

Figure 10:
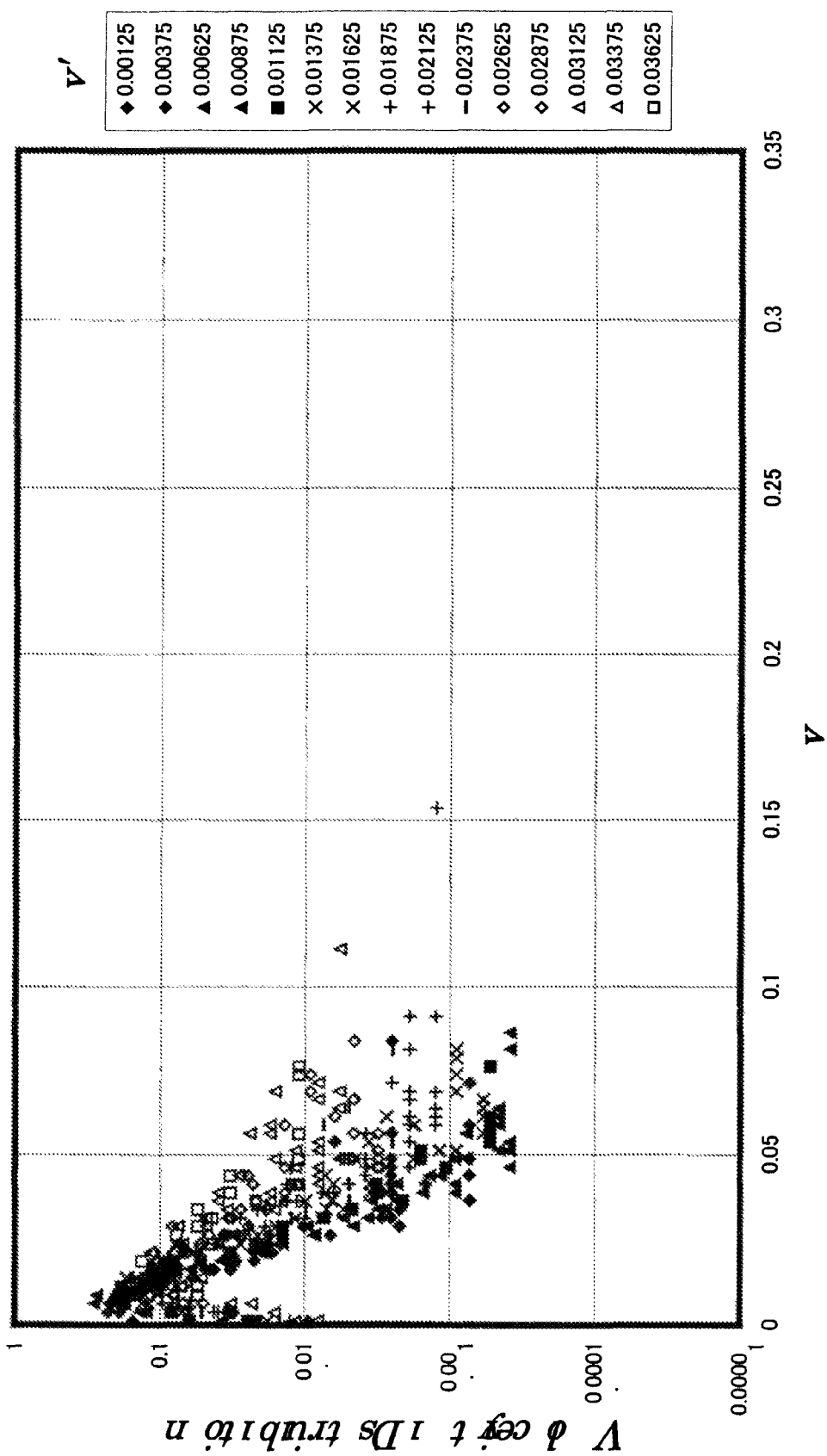
FIG. 10 is a graph showing the dependency of the price-up component (positive changes) of the spectra on the incident velocity v'.
Figure 11:
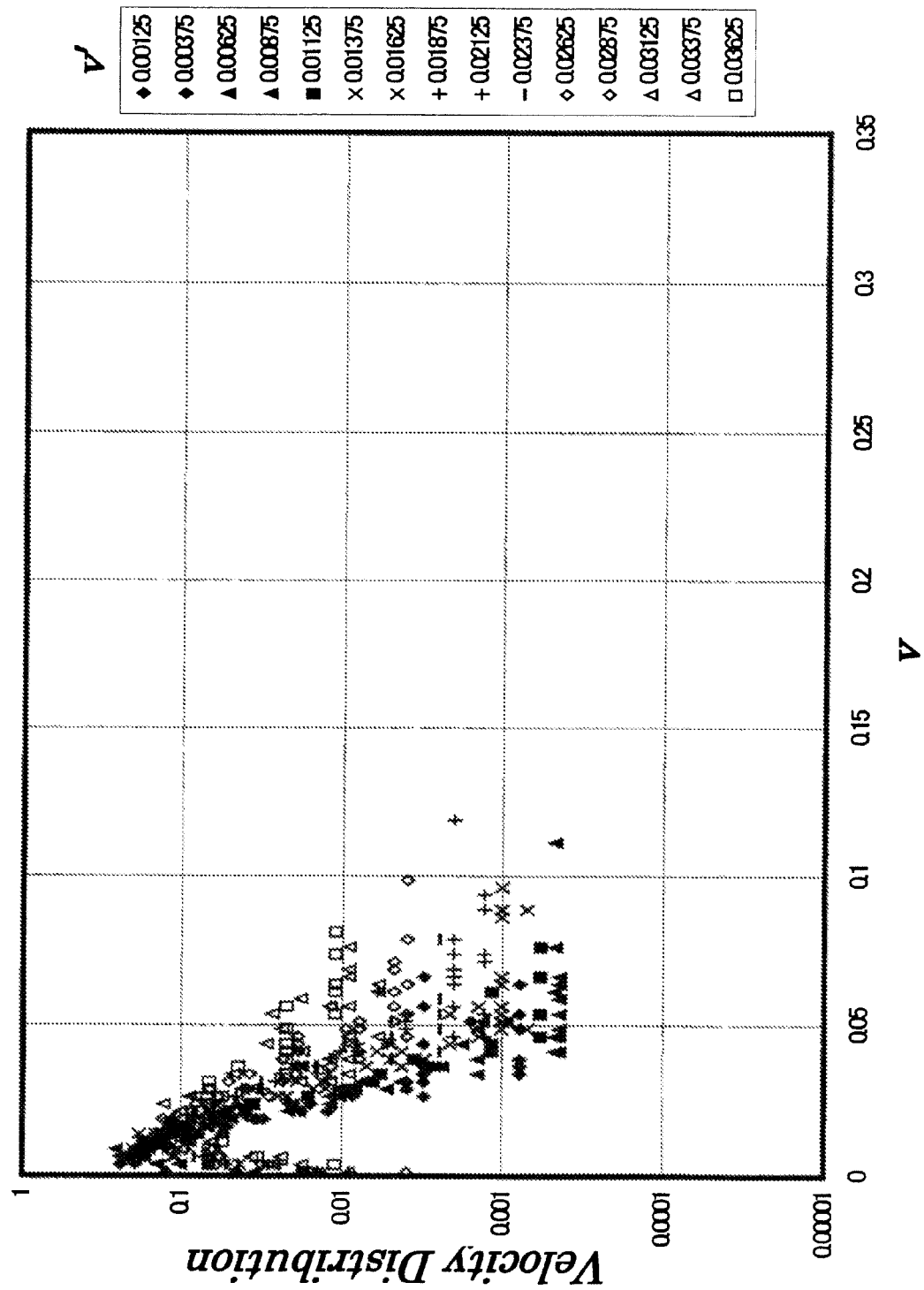
FIG. 11 is a graph showing the dependency of the price-down component (negative changes) of the spectra on the incident velocity v'.

FIGS. 10 and 11 illustrate the double differential cross-section Σ(V', μ'→v, μ) with respect to direction μ. From FIGS. 10 and 11, it is apparent that the shapes of the spectra are the same. This fact indicates that the double differential cross-section is given by the product of the velocity distribution $\Im(v' \to v)$ and the direction distribution $\wp(\mu' \to \mu)$. This can be expressed by equation 22.

$$\Sigma(v',\mu' \to v,\mu) \propto \Im(v' \to v)\wp(\mu' \to \mu) \tag{22}$$

Here is an example of determining the distribution of the price change by a sigmoid function, using the past records for price change rate as a parameter. As illustrated in FIGS. 9 through 11, the spectra shift to higher values as the incident velocity v increases. Therefore, the concept of temperature can be introduced, and the distributions shown in FIGS. 9 through 11 can be described by the Maxwell distribution.

Since the distributions shown in FIGS. 9 through 11 suggest an exponential distribution, the evaporation spectrum used to describe the neutron emitted from a nuclear reaction, which is expressed by equation (23), will be used.

$$f(v) \propto v\exp\left[-\frac{v}{T}\right] \tag{23}$$

This is a modification of the Maxwell distribution. The natural logarithm of equation 23 becomes $$\ln(f(v)) - \ln(v) = -\frac{v}{T} + Const. \tag{24}$$

Figure 12:
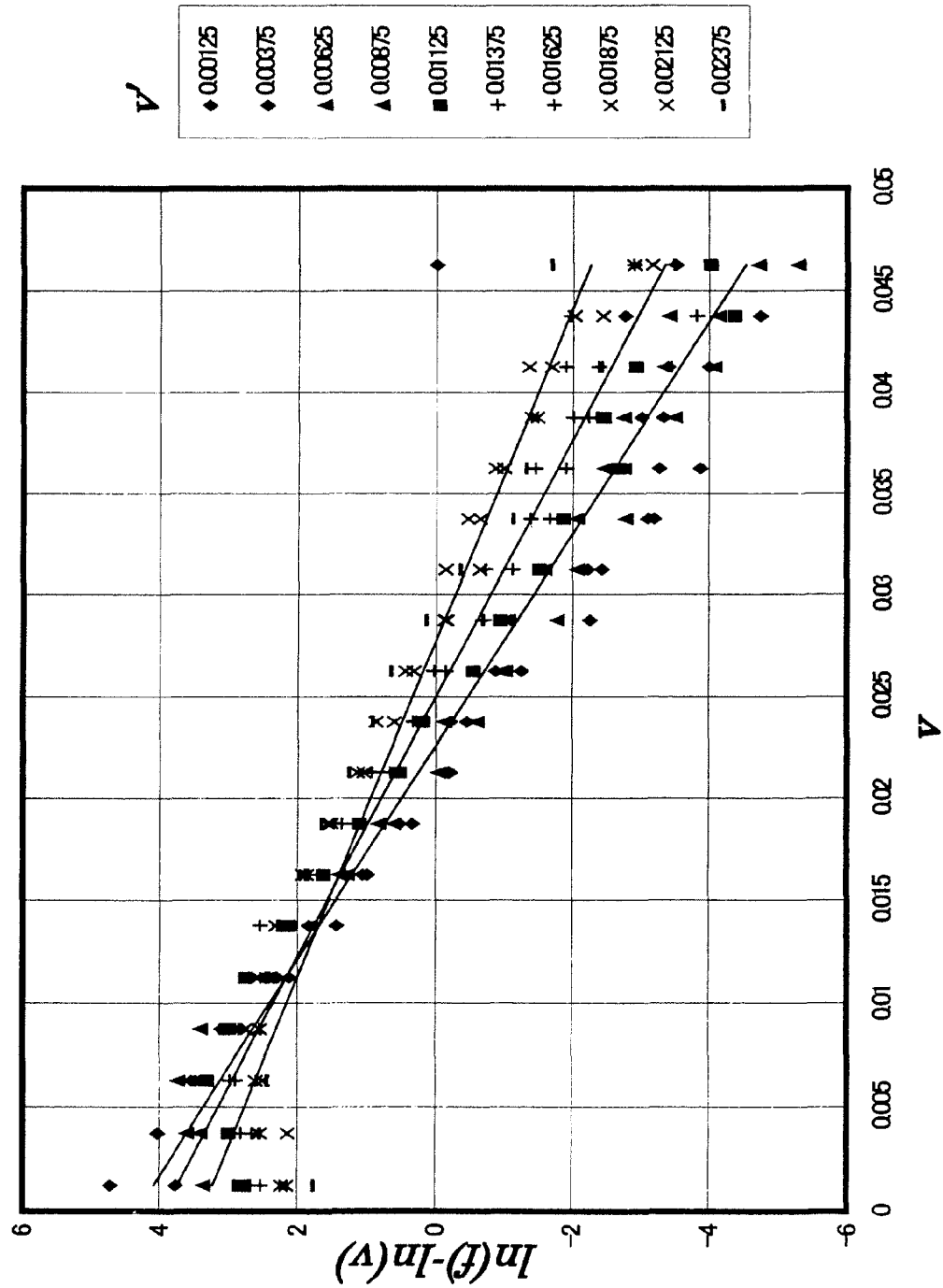
FIG. 12 is a graph showing an application of evaporation spectra.
Figure 13:
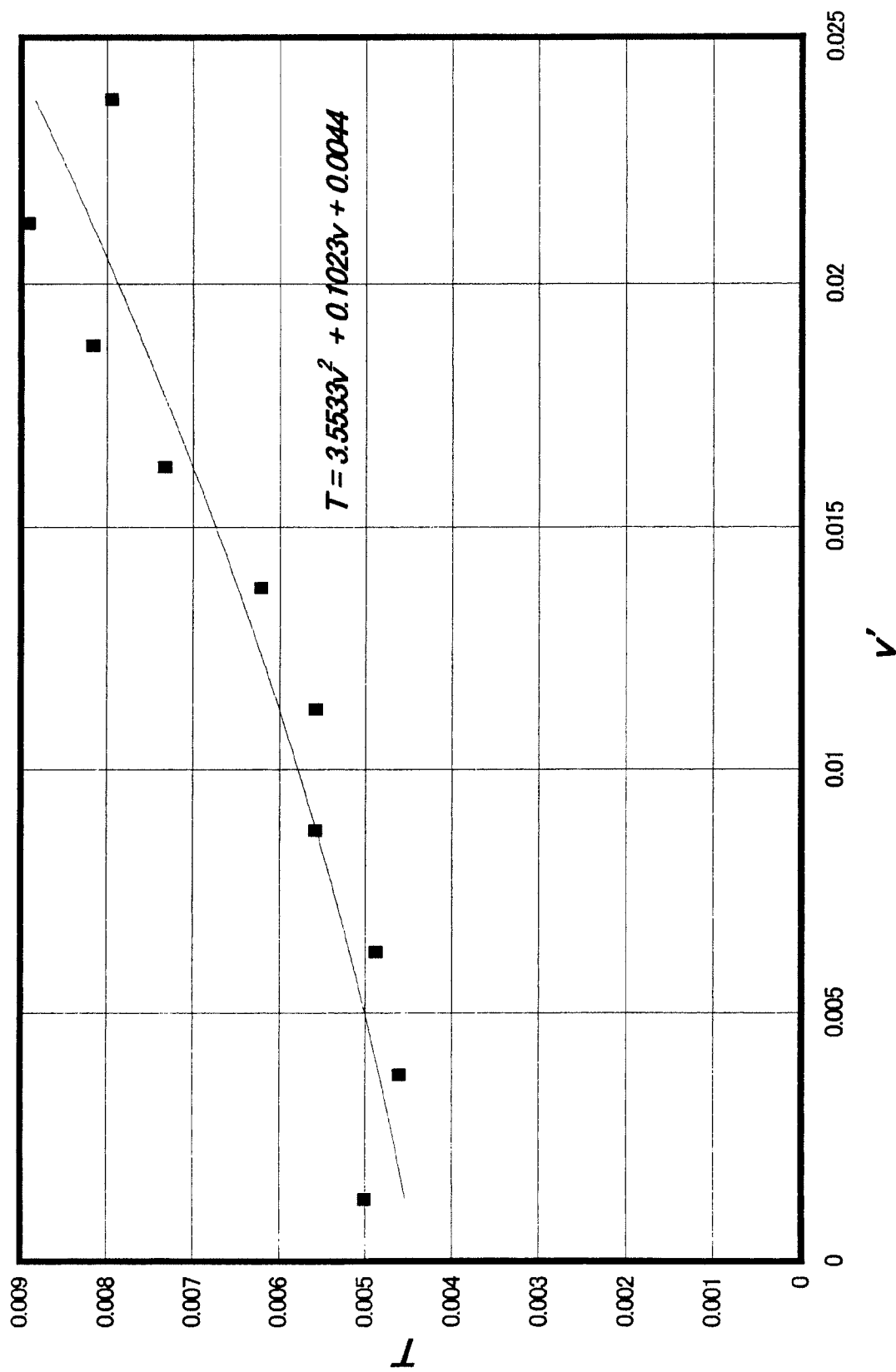
FIG. 13 is a graph showing the empirical equation of the velocity term of the differential cross-section.

FIG. 12 illustrates the relationship of equation (24). The inverse of the slope corresponds to temperature T. FIG. 12 gives an experimental equation of differential cross-section expressed by equation (25), and FIG. 13 illustrates the relationship between the velocity v' and temperature T.

$$\Im(v' \to v) \propto v\exp\left[-\frac{v}{3.5533v'^2 + 0.1023v' + 0.0044}\right] \tag{25}$$

Next, an example of estimating the probability of the change direction for a financial product or the derivatives from the past records of that financial product will be explained.

In this problem, the direction takes values of only 1 and −1. The value "1" denotes increase in price, and "−1" means decrease in price. In the financial engineering, the direction distribution is given by equation (26).

$$\wp(\mu' \to \mu; t) = \tag{26}$$

$$\begin{cases} \wp(1 \to 1; t); & \text{continuously price-up} \\ \wp(-1 \to 1; t); & \text{change from price-down to price-up} \\ \wp(1 \to -1; t); & \text{change from price-up to price-down} \\ \wp(-1 \to -1; t); & \text{continuously price-down} \end{cases}$$

Figure 14:
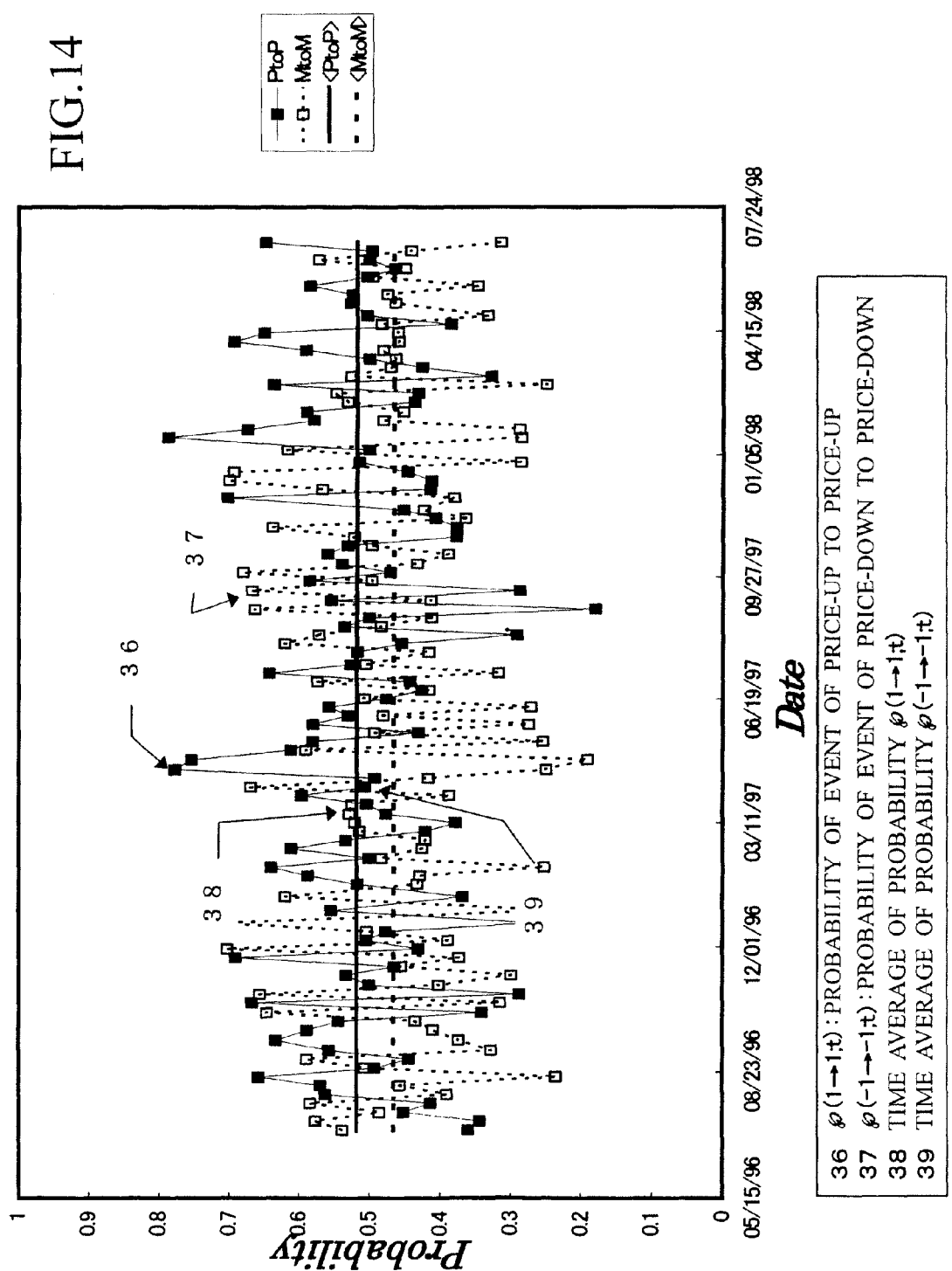
FIG. 14 illustrates the averages of the continued price-up probability and the continued price-down probability of every 5 days.

FIG. 14 illustrates the averages of the continued price-up probability $\wp(1 \to 1; t)$ and the continued price-down probability $\wp(-1 \to -1; t)$ of every five days. The darkened squares (■) 36 represent the events transient from price-up to price-up, the probability of which is expressed by $\wp(1 \to 1; t)$, and white squares (□) 37 represents the events transient from price-down to price-down, the probability of which is expressed by $\wp(-1 \to 1; t)$. The bold horizontal solid line 38 and the dashed line 39 are the time averages of these two probabilities. Other two probabilities are expressed by equation (27).

$$\wp(1 \to -1; t) = 1 - \wp(1 \to 1; t) \tag{27}$$

$$\wp(-1 \to 1; t) = 1 - \wp(-1 \to -1; t)$$

FIG. 14 exhibits the correlation between the probability of price-up and the probability of price-down with respect to the probability of the change direction for a financial product or its derivatives. FIG. 14 clearly shows that probability of price-up (denoted by ■36) and the probability of price-down (denoted by □37) change in opposite directions as time passes. This fact indicates a negative correlation.

By reflecting the correlation shown in FIG. 14 into the angle distribution of the double differential cross-section, a more accurate evaluation of the stochastic drift can be achieved.

Next, comparison will be made between the evaluation results with the price and risk evaluation system of the present invention and the evaluation results with the conventional technique.

Figure 15:
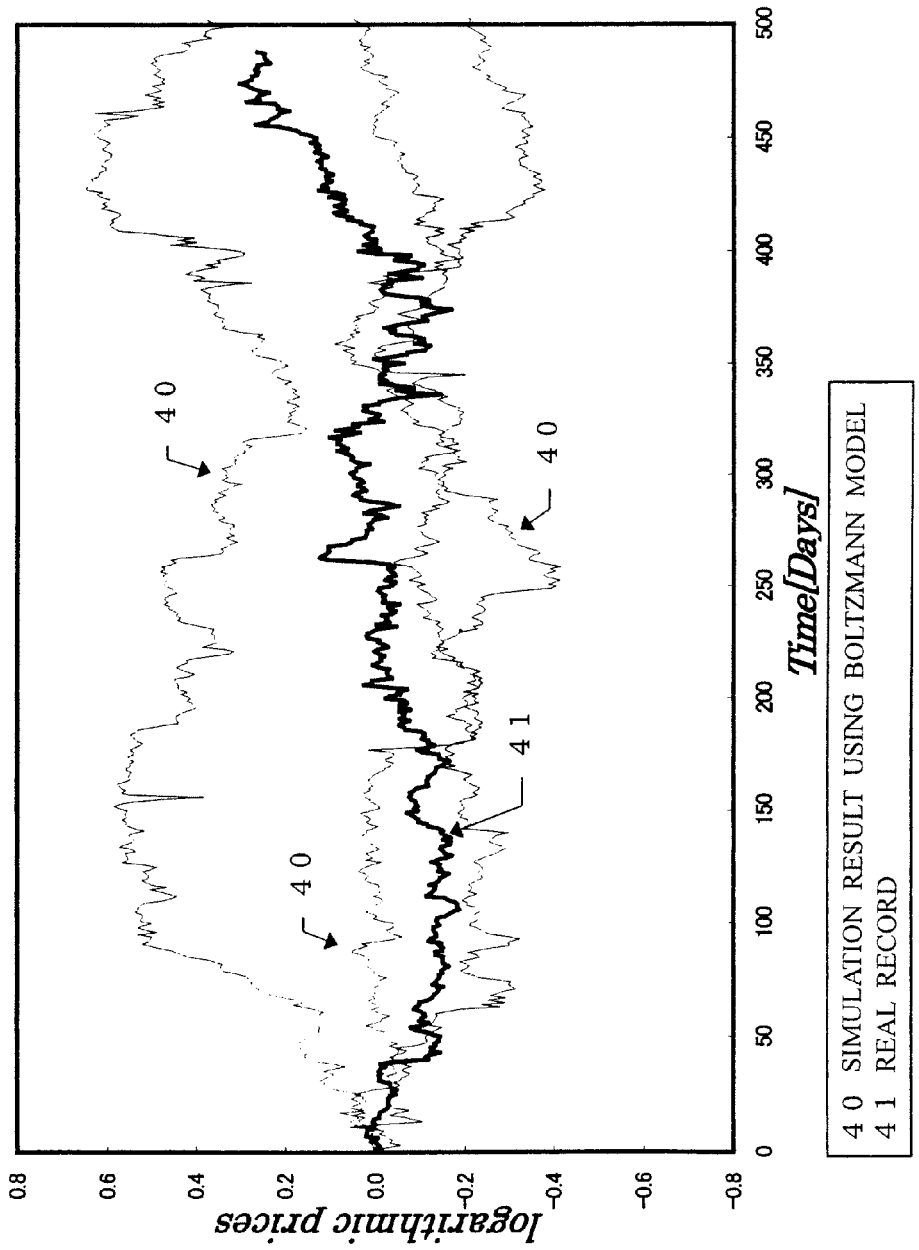
FIG. 15 is a graph of the simulation result of price fluctuation using a Boltzmann model.

FIG. 15 shows the evaluation results with the Boltzmann model that uses the price change rate distribution and the price change direction distribution. The solid lines 40 represent the results from the Boltzmann model, which effectively reproduce the jumps (big changes) in price appearing in the thick line 41 that indicates the actual record.

Figure 16:
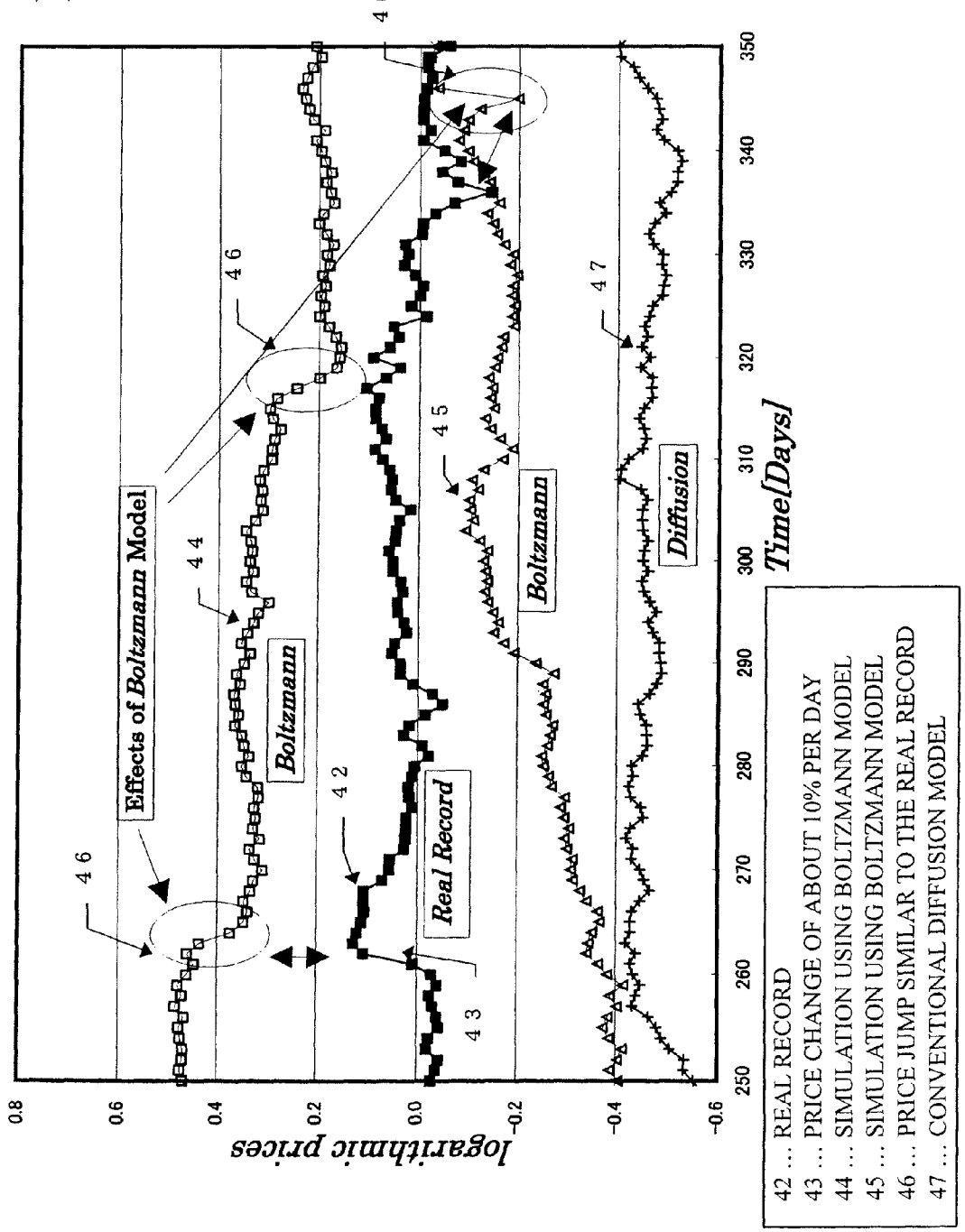
FIG. 16 shows the simulation result of price fluctuation using the Boltzmann model with a detailed view.

FIG. 16 is a detailed view of FIG. 15. The track depicted by the darkened squares 42 is the real record. The real record exhibits several big changes (jumps) 43 of about 10% per day.

The white squares (□) 44 and the white triangles (Δ) 45 are obtained from the simulation with the Boltzmann model. These symbols exhibit jumps 46 that are similar to the jumps 43 in the real record 42. The ability of simulating price jumps is the significant feature for the price and risk evaluation system of the present invention.

In contrast, the conventional diffusion model (denoted by cross marks 47 in FIG. 16) is incapable of reproducing the abrupt jumps, and it simulates price fluctuation only in the continuous manner.

Figure 17:
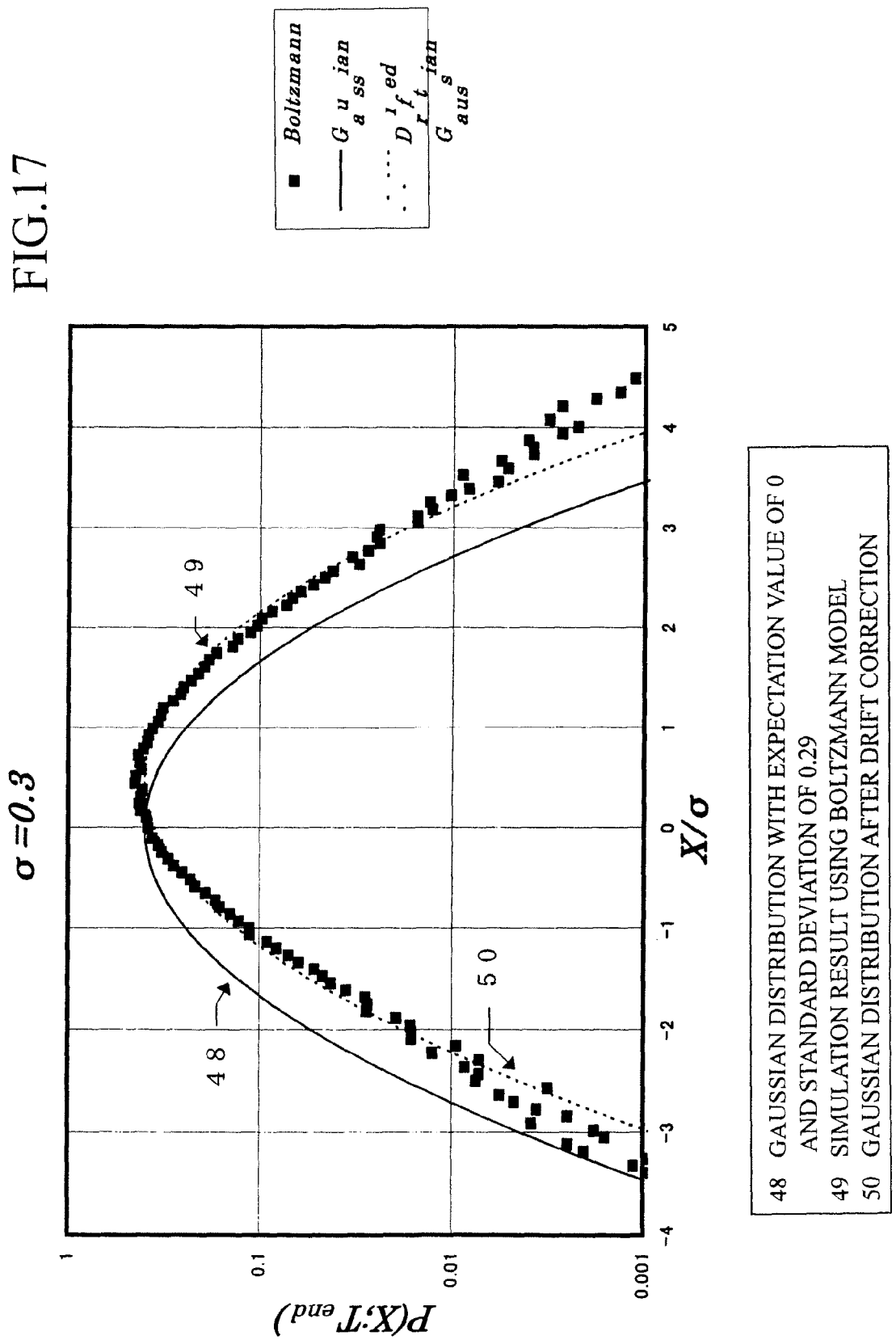
FIG. 17 illustrates the distribution of the stock price after two hundred days using the Boltzmann model.

FIG. 17 illustrates the simulation result obtained by the Boltzmann model in comparison with logarithmic distribution of a stock price of after 200 days. In this simulation, the deterministic drift term (for example, a non-risky interest rate) is not taken into account. In FIG. 17, the solid curve 48 indicates the conventional diffusion model (with the expectation value of 0 and the standard deviation of 0.29). The darkened squares 49 indicate the Boltzmann model, which is slightly drifted due to purely the stochastic process. The dashed line 50 indicates the corrected Gaussian distribution as a result of correction of the drift term. The corrected Gaussian distribution 50 covers a range of about ±2.5σ of the Boltzmann model; however, the other portions were underestimated.

The simulation result shown in FIG. 17 exhibits the significant feature of the Boltzmann model well. That is, the Boltzmann model used in the present invention is capable of evaluating the stochastic drift and the probability of big jumps in price, which can not be systematically reproduced by the conventional technique.

Next, another application will be explained with a case in which a correlation between the velocity v (corresponding to the price change rate) and the angle μ (corresponding to the price change direction) exists. In the above-described examples, the velocity v and the angle μ are supposed to be independent of each other with respect to the double differential cross-section, and therefore, separation form of variables was applied, as expressed in equation (22).

However, as the significant feature, the Boltzmann model is capable of taking the correlation between the velocity v and the angle μ into account by introducing a function that is not subjected to separation of variables. The above-described examples without considering the correlation only evaluate symmetrical distributions, which are symmetric with respect to the mean value. On the contrary, in this example, an asymmetric distribution can be evaluated by taking the correlation between the probability of the price change rate and the probability of the price change direction, and therefore, by introducing a function of non-separation of variable.

Next, a heterogeneous problem will be explained. In equation (7), the cross-section Σ is constant with respect to the price x. This is the same thing as the conventional financial engineering in which the volatility is constant with respect to the price. When the conventional financial engineering treats a heterogeneous problem containing an inconstant cross-section Σ, the price-dependency of the volatility had to be corrected by a technique of volatility smile or other techniques. However, these techniques greatly rely on past experiences and know-how. In contrast, the Boltzmann model applies equation (6) expressing a heterogeneous problem, which allows the price-dependency of volatility to be systematically considered.

If the heterogeneity varies due to the change in the price distribution, a non-linear Boltzmann equation will be introduced. Since the conventional financial engineering is not able to theoretically treat heterogeneous problems, these problems are often treated as stochastic volatilities in the conventional technique. However, stochastic volatility itself greatly relies upon know-how or experiences, and is lack of objectiveness. On the contrary, the Boltzmann model used in the present invention can treat stochastic volatility accurately using a non-linear Boltzmann equation (28).

$$-\frac{\partial \phi(x, v, \mu; t)}{v \partial t} = \mu \frac{\partial \phi(x, v, \mu; t)}{\partial x} + \Sigma_t(\phi(x, v, \mu; t), v)\phi(x, v, \mu; t) - \int dv' d\mu' \Sigma_s(\phi(x, v, \mu; t), v', \mu' \to v, \mu)\phi(x, v', \mu'; t) \quad (28)$$

In equation (28), flux φ is contained in the cross-section, and the cross-section changes along with the change in flux. This technique is actually used in computation of burning of nuclear fuel in the neutron-relating field. By applying this technique to the financial engineering, a systematic evaluation method for stochastic volatility is realized.

Next, the evaluation at an arbitrary point of time within an observation area will be explained. The density expression in equation (10) can not evaluate the probability density of an arbitrary hour between the 199th day and the 200th day because the event of price change can not be detected.

However, if the flux expressions of equations (6) and (7) are used, flux φ(x, v, μ; t) is obtained at an arbitrary time t irrespective of presence or absent of price change. Since flux φ(x, v, μ; t) can describe an arbitrary time t, and therefore, the probability density P at an arbitrary hour between the 199th day and the 200th day can be obtained correctly using equation 29.

$$P = \int_{\Delta t=1} dt \frac{\phi(x, v, \mu; t)}{v} \quad (29)$$

This is a track-length estimator.

Next, a method, for making evaluation at a point that does not allow effective sampling, will be explained. Although the estimation of the track length allows evaluation at an arbitrary time, it is impossible for the conventional technique to effectively collect sampling data at an infinitesimal price band and an infinitesimal time band even if intensive sampling is carried out. This means that evaluation can not be made from the estimation of track length.

In the present invention, the concept of point detector for evaluating a neutron at an arbitrary point in the phase space is applied to the events for financial products in order to allow evaluation at an infinitesimal interval. With the concept of point detector, a neutron that reaches point C is evaluated by computing the probability that the neutron starting from point A collides at point B and is scattered toward point C. The probability that the neutron passes point C is estimated from scattering information that the neutron does not pass point C. In the simplest example, with the distance r between points B and C, the neutron decays by exp $(-\Sigma_t \cdot r)$, and the solid angle changes in accordance with the distance. In this case, the neutron that changes at point B and reaches point C is estimated accurately to the considerable extent by correction of $1/r^2$. Because it is known that the probability of the scattering angle at point B is the differential cross-section $\Sigma_s(v', \mu' \rightarrow v, \mu)$, the probability of the neutron that changes at point B during the sampling and does not reach point C can be estimated.

The concept of point detector is introduced into evaluation for a financial product, while using all of or a part of the events of the price change for the financial product or its derivatives. This arrangement allows the price distribution or the risk distribution for the financial product in an infinitesimal observation area (or a target area).

In reality, no events of price change are likely to occur during the random sampling, and no flux pass through in an infinitesimal price band and at an infinitesimal time. In spite of the fact that an event can not occur in an infinitesimal area in the target phase space, the probability of events in such an infinitesimal area can be evaluated by the present invention within realistic computation time by automatically checking the route of causing the events. Evaluating the probability in an infinitesimal area, through which flux can not pass, allows the variance to be reduced efficiently.

Next example shows a case in which an adjoint probability density or adjoint flux of the Boltzmann model is introduced. The adjoint equation of equation (7) is expressed by equation (30).

$$-\frac{\partial \phi^*(x, v, \mu; t)}{v \partial t} = \mu \frac{\partial \phi^*(x, v, \mu; t)}{\partial x} + \Sigma_t(v) \phi^*(x, v, \mu; t) - \int dv' d\mu' \Sigma_s(v, \mu \rightarrow v', \mu') \phi^*(x, v', \mu'; t) - S^*(x, v, \mu; t) \quad (30)$$

The adjoint flux $\phi^*(x, v, \mu; t)$ is a solution of equation (30), and it represents the sensitivity of the expectation value of the a joint radiation source $S^*(x, v, \mu; t)$. The expectation value is expressed by equation (31)

$$\langle S^*(x,v,\mu;t) \phi(x,v,\mu;t) \rangle = \int dv d\mu dx dt S^*(x,v,\mu;t) \phi(x,v,\mu;t) \quad (31)$$

The adjoint source $S^*(x, v, \mu; t)$ corresponds to the price evaluation equation for a financial product or its derivatives.

By providing weights proportional to the adjoint flux $\phi^*(x, v, \mu; t)$ in the phase space, the variance inevitably accompanying the Monte Carlo method can be reduced when evaluating the expectation value of the financial product or its derivatives.

Next, an application will be made to the case in which there is a correlation among financial products. For example, there is a correlation expressed by equation (32) among multiple (e.g., two) financial products and their derivatives.

$$dx_1 = \mu_1 dt + \sigma_1 \sqrt{dt} \, \xi_1 \quad (32)$$
$$dx_2 = \mu_2 dt + \sigma_2 \sqrt{dt} \, \xi_2$$

If there is the correlation of equation (32) among the financial products, the conventional technique simulates a price by generating a correlative random number in accordance with a known correlation coefficient when producing normal random numbers $\xi_1$ and $\xi_2$ with respect to two Ito's processes. This conventional method is capable of evaluating not only the price for a single financial product, but also the price of a portfolio consisting of a combination of multiple financial products.

In contrast, the present invention realizes application to the portfolio by simultaneously setting multiple equations (33) for multiple financial products based on the Boltzmann model.

$$-\frac{\partial \phi_1(x_1, v_1, \mu_1; t)}{v_1 \partial t} = \quad (33)$$
$$\mu_1 \frac{\partial \phi_1(x_1, v_1, \mu_1; t)}{\partial x_1} + \Sigma_t(v_1) \phi_1(x_1, v_1, \mu_1; t) -$$
$$\int dv_1' d\mu_1' \Sigma_s(v_1', \mu_1' \rightarrow v_1, \mu_1)(\phi_1(x_1, v_1', \mu_1'; t) + \phi_2(x_1, v_1', \mu_1'; t))$$
$$-\frac{\partial \phi_2(x_2, v_2, \mu_2; t)}{v_2 \partial t} =$$
$$\mu_2 \frac{\partial \phi_2(x_2, v_2, \mu_2; t)}{\partial x_2} + \Sigma_t(v_2) \phi_2(x_2, v_2, \mu_2; t) -$$
$$\int dv_2' d\mu_2' \Sigma_s(v_2', \mu_2' \rightarrow v_2, \mu_2)(\phi_1(x_2, v_2', \mu_2'; t) + \phi_2(x_2, v_2', \mu_2'; t))$$

By considering the correlation between the double differential cross-sections $\Sigma_s(v_1', \mu_1' \rightarrow v_1, \mu_1)$ and $\Sigma_s(v_2', \mu_2' \rightarrow v_2, \mu_2)$ for the third terms of the right-hand-side of the respective equations, an effect equal to or higher than the conventional technique using equation (32) can be achieved.

Next, the application of Ito's theorem into the Boltzmann model of the present invention will be explained. Ito's theorem defines that if the price S of a financial product, such as a stock, obeys the Ito's process expressed by equation (34), then the price F (S, t) of the derivative product moves in accordance with the stock price, and also obeys the Ito's process.

$$dS = a(S,t)dt + b(S,t)\sqrt{dt} \xi \quad (34)$$

In this case, the price F of the derivative product is expressed by equation (35).

$$dF = \left( \frac{\partial F}{\partial t} + a \frac{\partial F}{\partial S} + \frac{1}{2} b^2 \frac{\partial^2 F}{\partial S^2} \right) + b \frac{\partial F}{\partial S} \sqrt{dt} \xi \quad (35)$$

The conventional technique that does not apply the Ito's theorem is based on the assumption that the random number $\xi$, has a normal distribution. On the contrary, the Ito's theorem stands in the Boltzmann model even if the distribution is not Gaussian, as long as the random process of the second term is proportional to the square root of the infinitesimal time dt.

For this reason, the Boltzmann model applying the Ito's theorem can evaluate a price distribution irrespective of whether or not the distribution is Gaussian. If the variance of the distribution evaluated by the Boltzmann model is proportional to the square root of time, the Ito's theorem can be applied to a conventional price/risk evaluation system. In this case, the conventional system applying the Ito's theorem will achieve the similar effect as the present invention by replacing the normal distribution of the random number x with the distribution obtained by the Boltzmann model.

Figure 18:
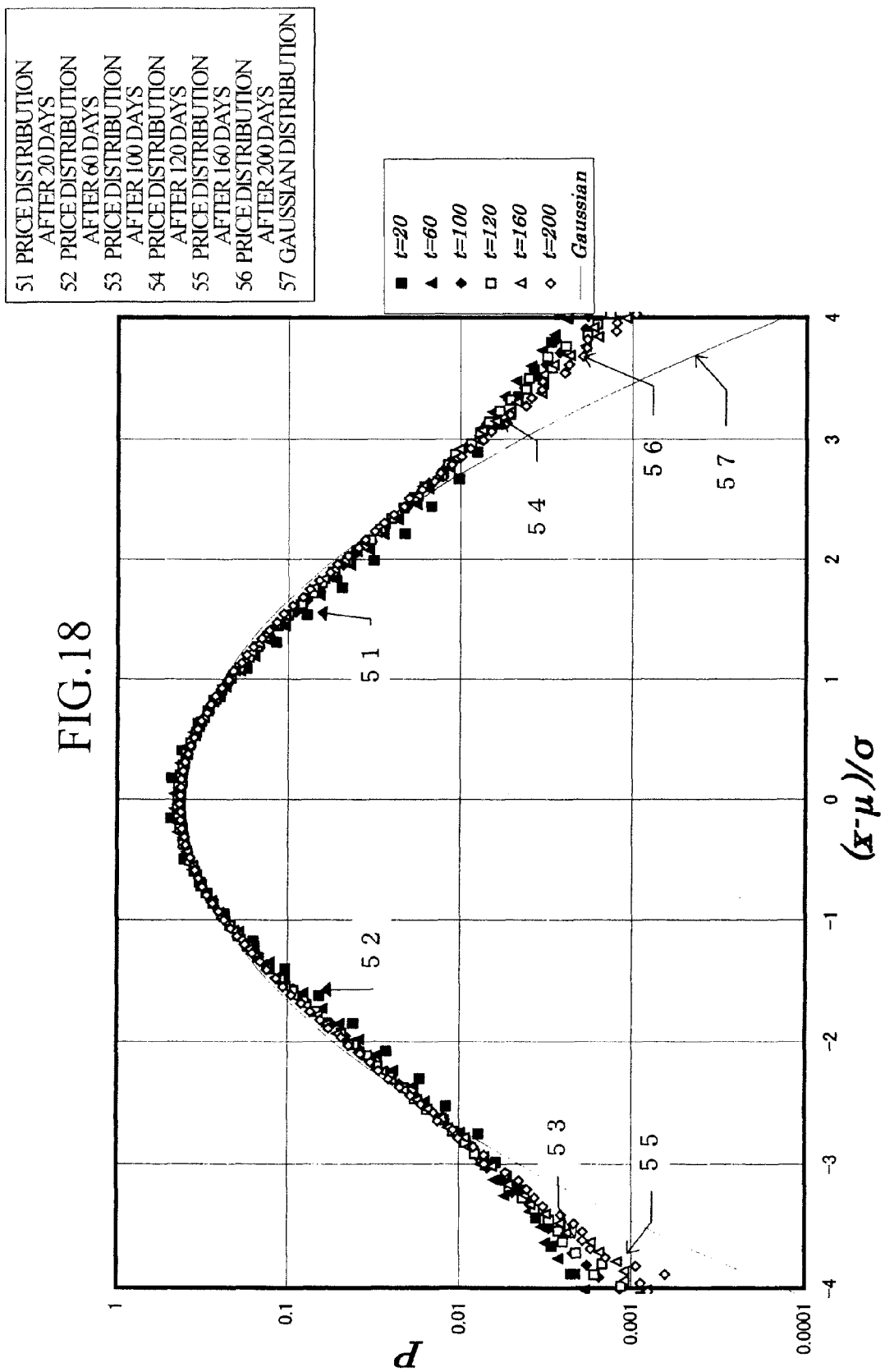
FIG. 18 is a graph of stock price distributions of every twenty days using the Boltzmann model.

Although a price distribution obtained by the Boltzmann model is different from a price distribution using Gaussian in the strict sense, the distribution obtained by normalizing the price to the standard deviation become constant independent of time, as shown in FIG. 18. In FIG. 18, the darkened square (■) 51, the darkened triangle (▲) 52, and the darkened diamond (♦) 53 show the price distribution of after 20 days, after 60 days, and after 100 days, respectively. The white square (□) 54, the white triangle (△) 55, and the white diamond (◇) 56 show the price distribution of after 120 days, after 160 days, and after 200 days, respectively. These data coincide with the normal distribution 57 within the range of about ±2.5σ. The standard deviation of this normal distribution is proportional to the square root of time. This means that the standard deviation of the probability distribution obtained by the Boltzmann model is in proportion to the square root of time.

The example shown in FIG. 18 is the simulation result of the stock-price distribution for about sixty Japanese electric machinery makers. If a conventional system is designed based on the Ito's theorem, it can evaluate a price distribution or a risk distribution for derivatives deriving from the stock prices of these makers. In this case, the conventional system using the Ito's theorem can replace the normal distribution with the Boltzmann model distribution in order to improve the prediction ability for a price distribution of the derivatives.

Lastly, an application of the present invention to a parallel processing system will be explained. The present invention uses the Monte Carlo method for the numerical calculations. It is widely known that the Monte Carlo method is an advantageous technique because the processing speed can be drastically improved by parallel processing. Especially, it is well known that parallel processing is quite effective in application of the neutron transport Monte Carlo method. Since the present invention makes use of the neutron transport Monte Carlo technique in the Boltzmann model, the calculation speed can be effectively improved using parallel processing computers.

Figure 19:
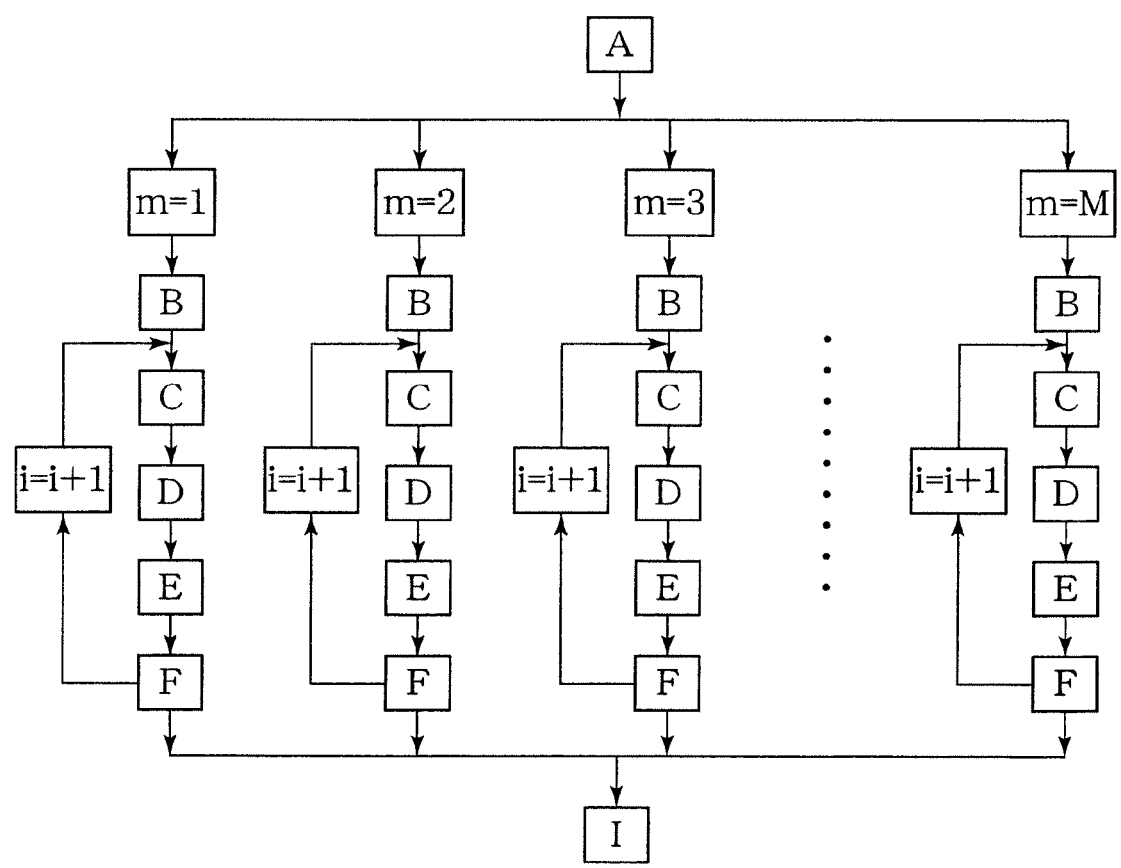
FIG. 19 illustrates the configuration of parallel processing of the price and risk evaluation system for a financial product or its derivatives according to the present invention.

FIG. 19 illustrates an example of a parallel processing system. In FIG. 19, each operation flow A through I is the same as that shown in FIGS. 2 and 3. Especially, simulation process consisting of steps B through F is divided into multiple parallel flow in order to allocate the trials to a plurality of CPUs. The operation speed increases depending on the number of the CPUs used in the parallel processing.

The foregoing is the preferred embodiment of the first feature of the present invention, which is realized as a price and risk evaluation system for a financial product. The present invention is also realized as a computer-readable recording medium storing the price and risk evaluation program, which controls a computer system to carry out the process described above. In this case, the program is installed in a computer system, and the price and risk evaluation system is realized when the program is started on the computer system.

The second feature of the present invention, which is embodied as a dealing system, will be described with reference to FIG. 20 and the subsequent drawings. First, option-pricing methodology will be explained in the frame work of the theoretical and realistic aspects. A price of European option for stocks and stock indices at delivery dates can be evaluated using integral equations (36) and (37) based on the risk-neutral probability measure (probability density) P (S, τ) for underlying assets in the free market.

$$\text{Call}(K, \tau) = e^{-r\tau} \int_K^\infty dS P(S, \tau)\, (S - K) \tag{36}$$

$$\text{Put}(K, \tau) = e^{-r\tau} \int_0^K dS P(S, \tau)\, (K - S) \tag{37}$$

here S is the price of the underlying assets, τ is the period to the maturity, r is the non-risky interest rate (that is, the money rate fixed up to the maturity), and K is the exercise price.

Equation (36) expresses the theoretical call option price to buy the underlying assets (i.e., call option) at the maturity with the exercise price K. Equation (37) expresses the theoretical put option price to sell the underlying assets (i.e., put option) at the maturity with the exercise price K. A purchaser of these options can exercise the right at the exercise price K irrespective of the actual price of the underlying asset at the maturity. For example, the purchaser of a call option can buy that option at price K, even if the underlying price (i.e., the price of the underlying assets) is higher than the exercise price at the maturity. The purchaser of a put option has an obligation of selling the option at the maturity at price K. However, this purchaser can repeatedly trade the underlying assets in response to price changes, and can sell the option at price K at least at cost of equation (36).

Black-Sholes equation (BS equation) is often used to evaluate an option price. If the logarithm normal distribution expressed by equation (38) is input to the risk neutrality probability measurement in equations (36) and (37), then Black-Sholes equations (39) and (40) are obtained.

$$P(S, \tau) = \frac{1}{S\sigma\sqrt{2\pi\tau}} \exp\left[-\frac{\left(\ln(S) - \frac{\sigma^2\tau}{2}\right)^2}{2\sigma^2\tau}\right] \tag{38}$$

$$\text{Call}(K, \tau) = SN(d_1) - Ke^{-r\tau}N(d_2) \tag{39}$$

$$\text{Put}(K, \tau) = -SN(-d_1) + Ke^{-r\tau}N(-d_2) \tag{40}$$

here $d_1$ and $d_2$ are expressed by $$d_1 = \ln\left(\frac{S}{K}\right) + \left(r + \frac{\sigma^2}{2}\right)\frac{\tau}{\sigma\sqrt{\tau}} \tag{41}$$

$$d_2 = d_1 - \sigma\sqrt{\tau}$$

The parameter σ in equations (38), (39) and (40) is the price change rate (or volatility), and is the diffusion constant of the geometric Brownian motion model, in which the underlying price diffuses with respect to the logarithm of the price, for the underlying assets.

The Black-Sholes equation is derived on the assumption that the volatility σ is constant with respect to τ and S. Accordingly, the Black-Sholes equation assumes a statistic market that exhibits a constant irrespective of time and price.

However, the real market changes as time and price change. FIG. 20 illustrates the price change rate C1 for the underlying assets predicted by the geometry Brownian model, in comparison with the change rate of the closing price (i.e., the daily earning rate) C2 for a typical stock price. Although the volatility of the two data are almost the same, the appearances of the price change quite differ from each other. The geometric Brownian motion model C1 does not exhibit a big price change, whereas the actual market price significantly varies as indicated by the curve C2. This comparison result leads to the conclusion that it is difficult to evaluate the option price based on the Black-Sholes equation, if the underlying assets is the individual stock price. In reality, the transaction of individual stock option is small in number.

The stock index, that is, the corrected average of the stock prices of many issues (for example, the Nikkei 225 Stock Average) moves more moderately than the individual stock price. Accordingly, it becomes easier to evaluate the option price for the stock based on the Black-Sholes equation, and many transactions are carried out at the present. However, even if taking Nikkei 225 stock average, the appearance of the daily earning rate C3 is still different from the geometric Brownian motion model (curve C1 in FIG. 20), as shown in FIG. 21. If curve C3 is compared with curve C2 of actual record shown in FIG. 20, these two curves are essentially the same, except for the size in change. To this end, dealers of stock index options generally use modified Black-Sholes equations to evaluate option prices.

Figure 22:
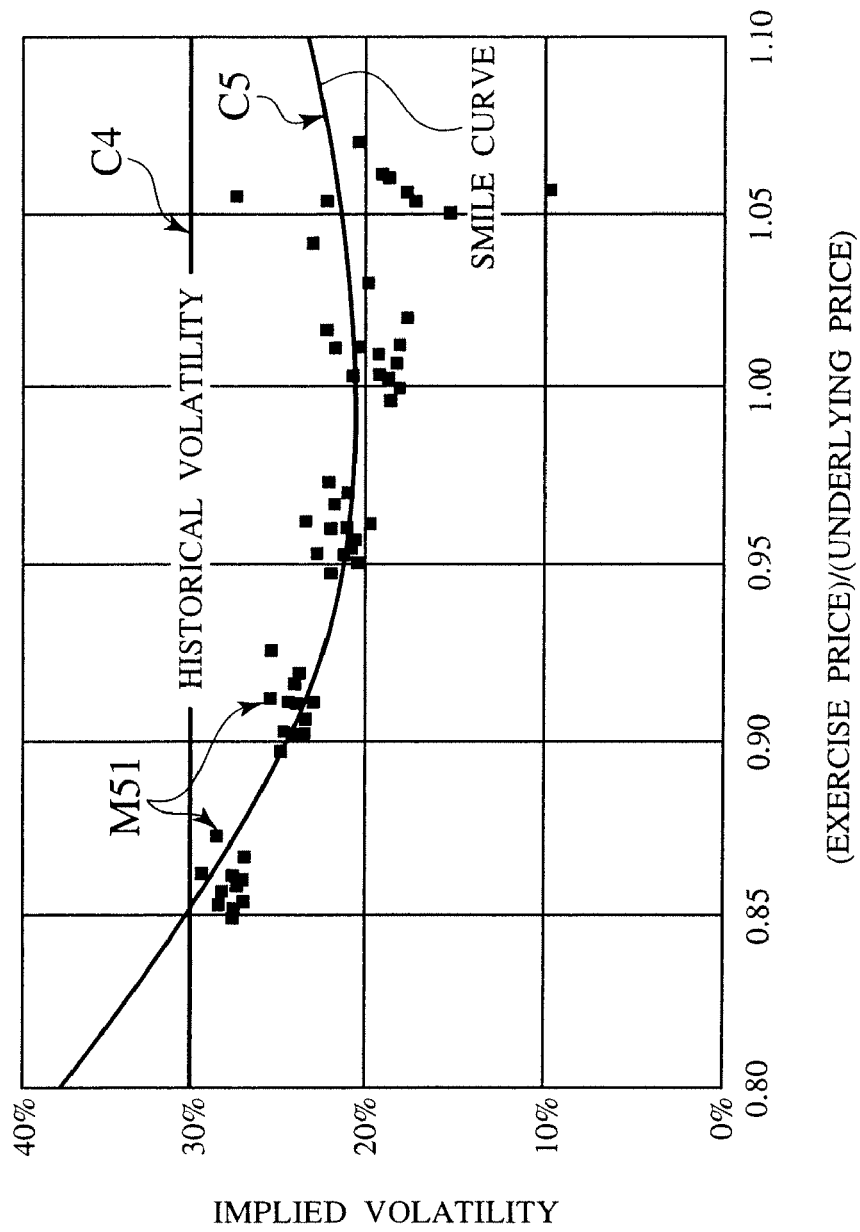
FIG. 22 is a graph showing the implied volatility of the put option of the price index of stocks of the Nikkei 225 stock average, together with a smile curve.

FIG. 22 illustrates an example of the correction. The implied volatility (IV) is defined as the volatility implying an option price actually traded in the market using the Black-Sholes model. The darkened squares (■) M51 shown in FIG. 22 represent a typical implied volatility of the closing price for a stock index put option of the Nikkei 225 Stock Average.

The horizontal line C4 extending at 30% of the vertical axis is the historical volatility calculated from the motion of the option of the Nikkei 225 Stock Average. If the market completely obeys the geometric Brownian movement model that is the basis of the Black-Sholes equation, the darkened squares (■) M51 should be located on the 30% line C4. However, in reality, as the exercise price separates from the underlying price, the implied volatility tends to increase. The tendency that the implied volatility increases from the point at which the exercise price and the underlying price are equal, that is, with the ratio of (exercise price)/(underlying price) being 1.00, is called a smile curve, which is indicated as C5 in FIG. 22. It is known that the smile curve has a term structure in which the curvature becomes gentle as the term (or period) increases up to the maturity.

In general, option-dealers try to grasp the volatility matrix, which bring the smile curve and the term structure of the implied volatility together based on the transaction price in the market. They determine the option price by correcting the option price obtained by the Black-Sholes equation using the volatility matrix.

Although the volatility matrix is one of the most successful tools for evaluating an option price, it still has some drawbacks. The major drawbacks of the volatility matrix are the following two:

1. If there is no or a few transactions, it is impossible to obtain implied volatility.
2. The volatility matrix can not specify a typical transaction in the market, in which the transaction price varies widely.

The drawback 1 is the essential problem concerning the implied volatility, and can not be solved by the implied volatility. On the other hand, the drawback 2 could be solved by a filtering technique for extracting significant information among from the widely varied information in order to specify the realistic transaction.

Prior to applying the filtering technique, the mechanisms, why the smile and the term structure of the implied volatility appear, must be clarified in order to grasp the average behavior. Although the mechanisms of the smile curve and the term structure have not been completely clarified yet, various researches suggest that the major reasons are relating to the Leptokurcity and the Fat-tail occurring in the probability distributions for the actual price changes in free trade markets. Leptokurcity is the phenomenon that the probability of the actual price changes observed is sharper than the normal distribution assumed in the Black-Sholes equation in the region of small price change. Fat-tail is the phenomenon that the probability of the actual price changes widens toward the end in the region of big price changes.

Figure 23:
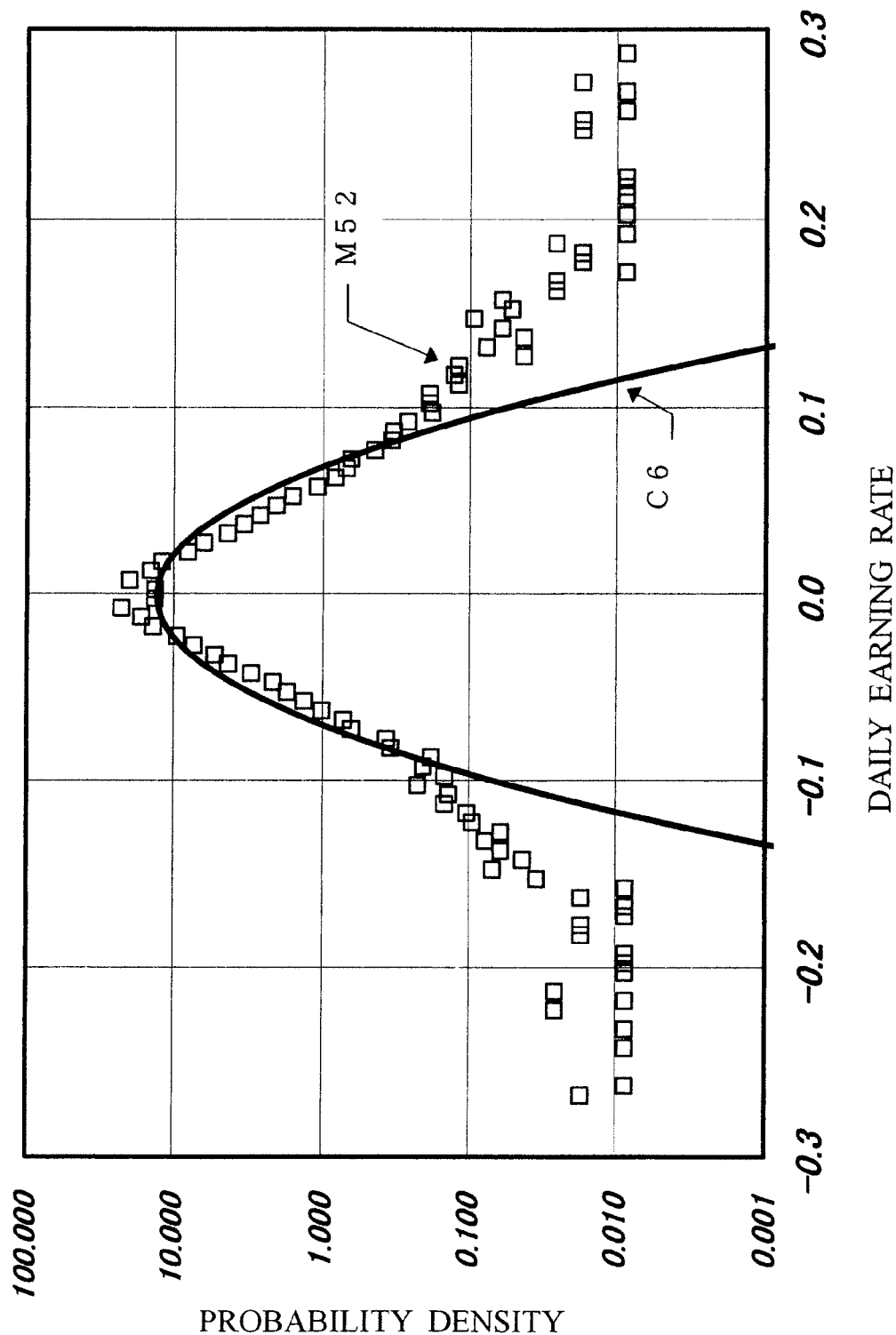
FIG. 23 is a graph showing the probability density of an actual daily earning rate, together with the normal distribution presumed by Black-Sholes equation.
Figure 24:
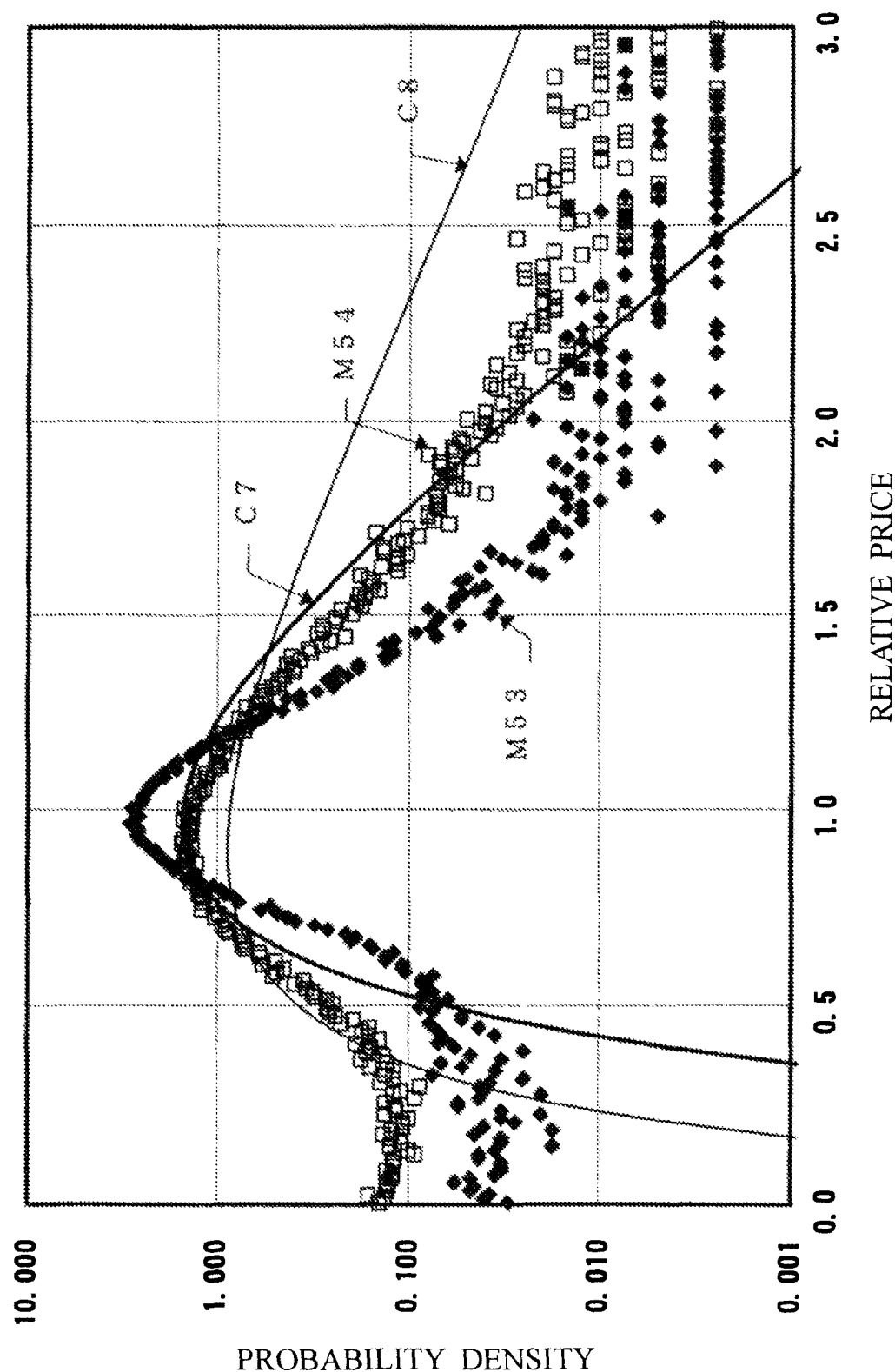
FIG. 24 is a graph showing the price change probability estimated by the Boltzmann model, together with the logarithmic normal distribution used in Black-Sholes equation.

FIG. 23 illustrates an example of these phenomena. The distribution of the white squares (□) M52, which represent the actual daily earning rates, becomes sharper than the normal distribution C6 near the center, and broadens towards the ends. FIG. 24 illustrates the probability of price change estimated from the Boltzmann model, in comparison with the logarithmic normal distribution of the Black-Sholes equation. Under this price distribution, the width (that is, the volatility) of the probability density distribution is smaller than that of the logarithmic normal distribution C7 around the relative price of 1.0, as is indicated by darkened square (■) M53. The volatility of the probability density distribution becomes larger than that of the logarithmic normal distribution C7 in the ranges of the relative price of above 2.0 and below 0.5. It is supposed that the price distribution (indicated by white squares (□) M54 approaches the normal distribution as time elapses according to the central limit theorem. Accordingly, the peak portion and the skirt of the price distribution become very similar to the normal distribution C8 as time passes. This is supposed to be the factor of emergence of the smile curve and the term structure. The similar discussion is made in "John C. Hull, "OPTIONS, FUTURES & OTHER DERIVATIVES, Fourth Edition", Prentice-Hall International Inc., 2000, chapter 17.

Figure 20:
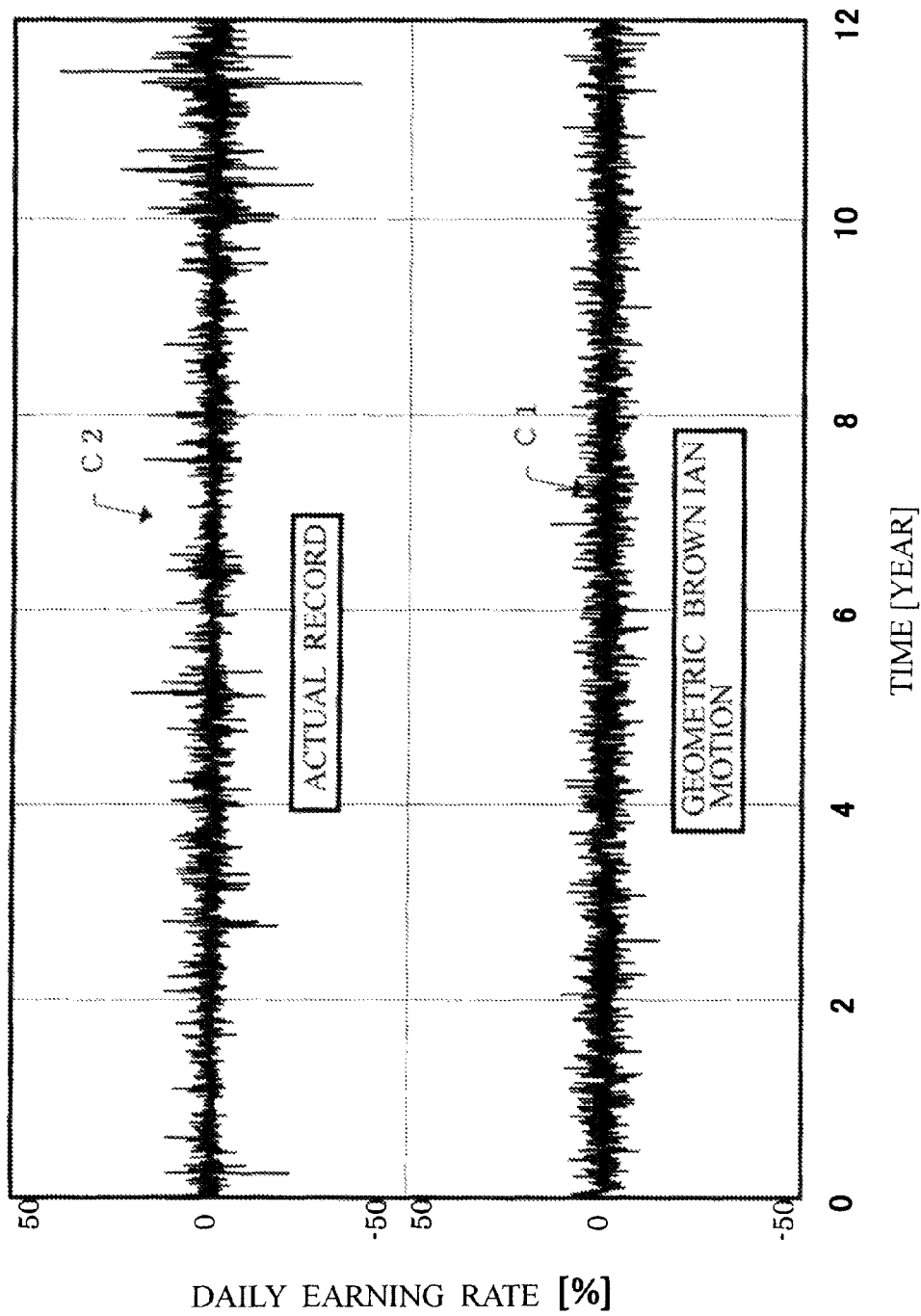
FIG. 20 is a graph showing the price fluctuation C1 of the underlying assets expected by the geometric Brownian model, in comparison with the closing-price fluctuation (daily earning rate) C2 of a typical stock price.
Figure 21:
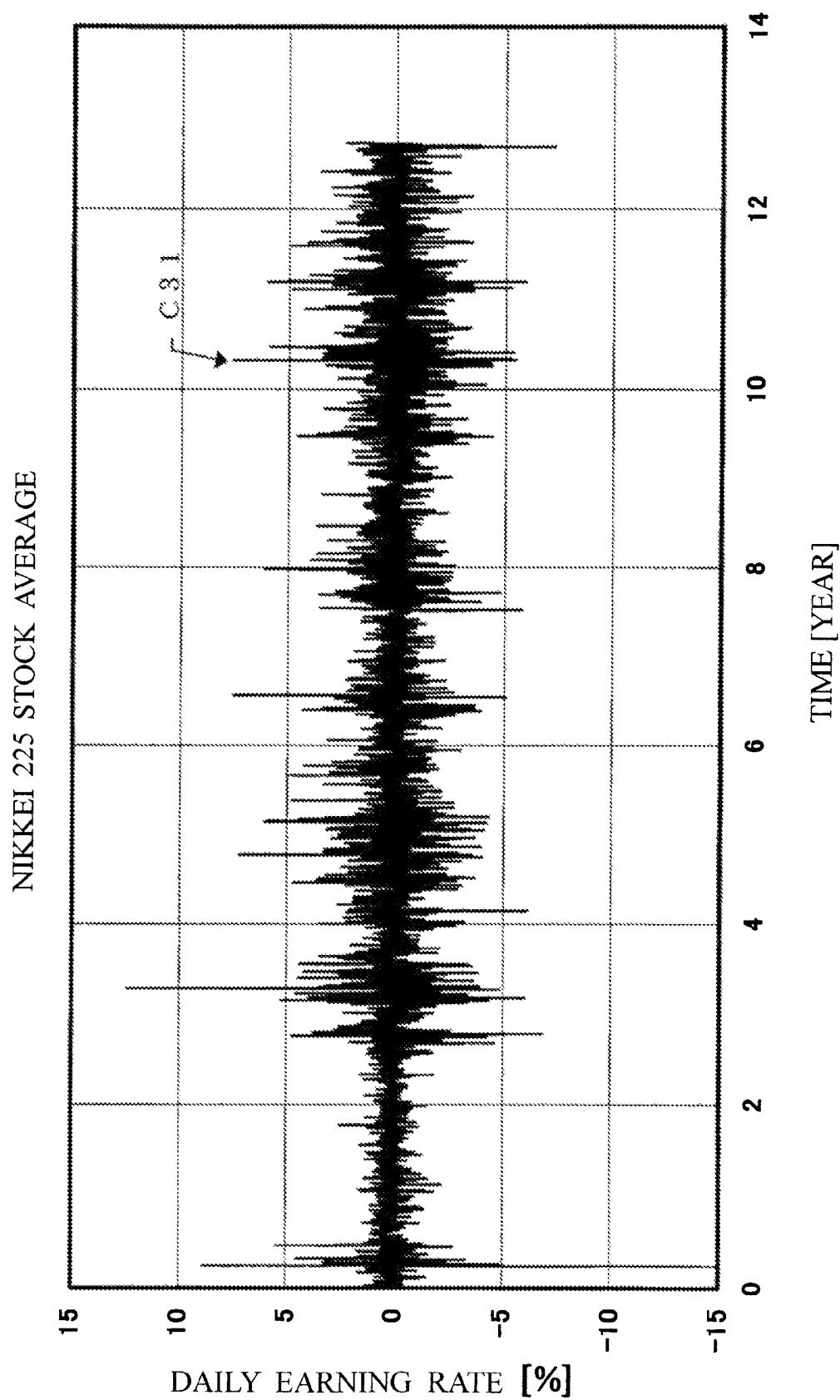
FIG. 21 is a graph of fluctuation of the daily earning rate C3 of the stock price average of the Nikkei 225 stock average.

The Fat-Tail of the price-change distribution corresponds to the big price changes that occur in the real price fluctuations C2 and C3 shown in FIGS. 20 and 21. There are two models taking such big changes into account, namely, a Jump model and a probability volatility model. The jump model reproduces the Fat-tail independently in the stochastic process that is totally different from the normal distribution. In the probability volatility model, the standard deviation of the normal distribution (that is, the volatility) fluctuates with time. The jump model is based on the assumption of discontinuous price changes, while the probability volatility model is essentially a non-linear problem. For this reason, either model is incapable of achieving the risk-neutral probability measure uniquely. Consequently, equations (36) and (37) of evaluating option prices can not be applied to these two models, which is the major drawback.

In contrast, although the Boltzmann model proposed by the present invention covers the category of probability volatility model in a broad sense, a linear Boltzmann equation can reproduce the characteristics of the Leptokurcity and Fat-Tail. If the angle distribution of the linear Boltzmann equation is isotropic (that is, if $(\mu' \to \mu; t) = \frac{1}{2}$ in equation (26)), the solution becomes risk-neutral and unique. Therefore, applying the Boltzmann model to evaluation of option prices allows the essential trend of the volatility matrix to be properly estimated.

One of the significant features of the Boltzmann model is that the present model can treat market-dependency of price fluctuation. The market-dependency means that a set of big price changes occur coincidentally with certain time intervals. The price evaluation system that has been described above as the first feature of the present invention preferably recommends applying an evaporation spectrum equation (42), which is a modification of the Maxwell's distribution, as the price distribution f(v) in order to taking Leptokurcity into account.

$$f(v) \propto v \exp\left[-\frac{v}{T(v')}\right] \quad (42)$$

Figure 25:
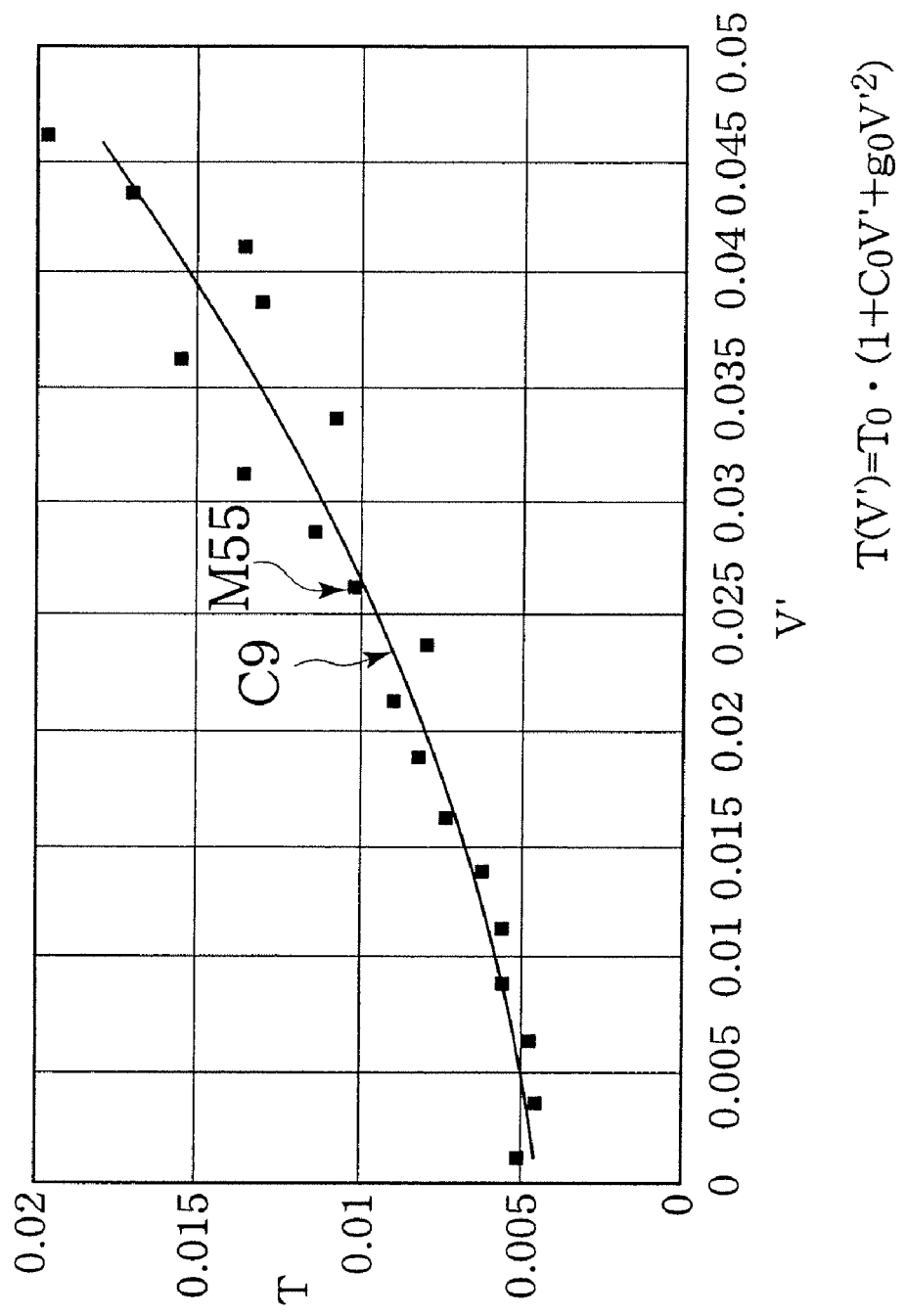
FIG. 25 is a graph of temperature T as a function of daily earning rate v' of the previous day.

The Boltzmann model treats the correlation between the price change rate in the underlying assets and the previous price change rate. The Boltzmann model claims the existence of a definite market-dependency between the daily earning rate v' of the previous day and the daily earning rate v of the current day via temperature T as exemplified in Eq.(42) in case focusing on the closing prices. FIG. 25 illustrates a typical example of the market-dependency. In FIG. 25, the darkened squares (■) M55 represent the temperature obtained from the real records of the closing price. The curve C9 is a fitting line of the darkened squares with a quadratic function. The fitting line exhibits the fact that the temperature T has a quadratic tendency with respect to the daily earning rate v' of the previous day expressed by equation (43).

$$T(v')=T_0(1+c_0 v'+g_0 v'^2) \quad (43)$$

The quadratic dependency recalls a direct analogy to the instability of the stock market in a system with a positive feedback such that the specific heat increases as the temperature rises.

Figure 26:
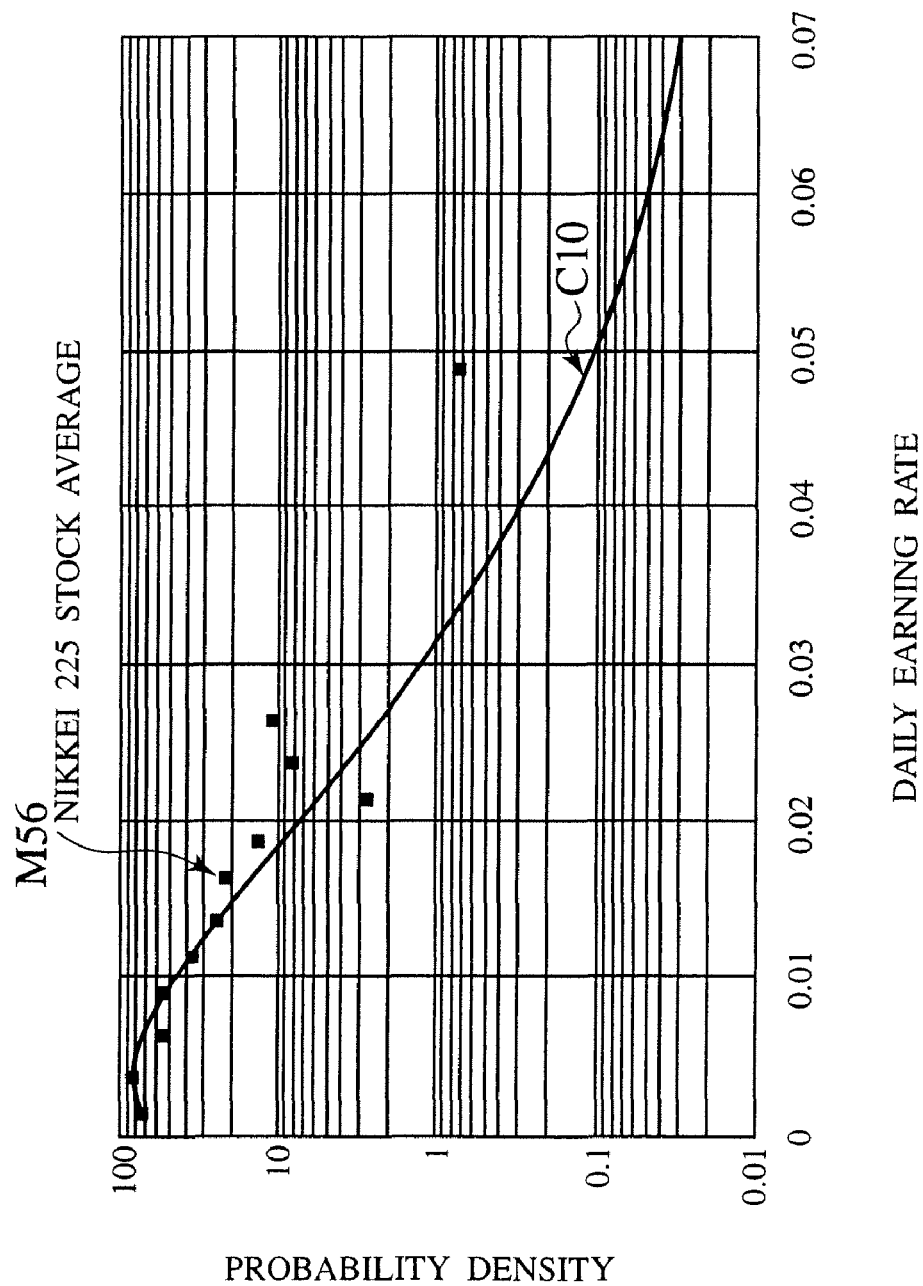
FIG. 26 is a graph of simulated probability density as a function of daily earning rate for the price valuation using the Boltzmann model.

The curve C5 extending along the real records (i.e., the darkened squares (■) M51) in FIG. 22 exhibits a volatility smile. This volatility smile is obtained by evaluating the option prices of equations (36) and (37) based on the Boltzmann model and plotting the volatility of the Black-Sholes equation that become equal to the evaluation result. FIG. 26 illustrates the daily return rate C10 obtained by the Boltzmann model in the simulation process for price evaluation. The curve C 10 very well reproduces the daily earning rate (i.e., the darkened squares (■) M56) of the Nikkei 225 Stock Average in the same term as the option transaction.

The daily earning rate shown in FIG. 26 shows a typical Fat-Tail.

Based on this daily earning distribution obtained from the Boltzmann model, a random number ξ is generated to simulate the tracks of the underlying assets S using equation (44).

$$\frac{dS}{S} = rdt + \xi \quad (44)$$

The jump model described above does not take the market-dependency into account, and it treats a big price variation as abrupt and discontinuous jumps. This jump model may appear to give the similar results as the Boltzmann model; however, the result is quite different from those obtained from the Boltzmann model.

Figure 27:
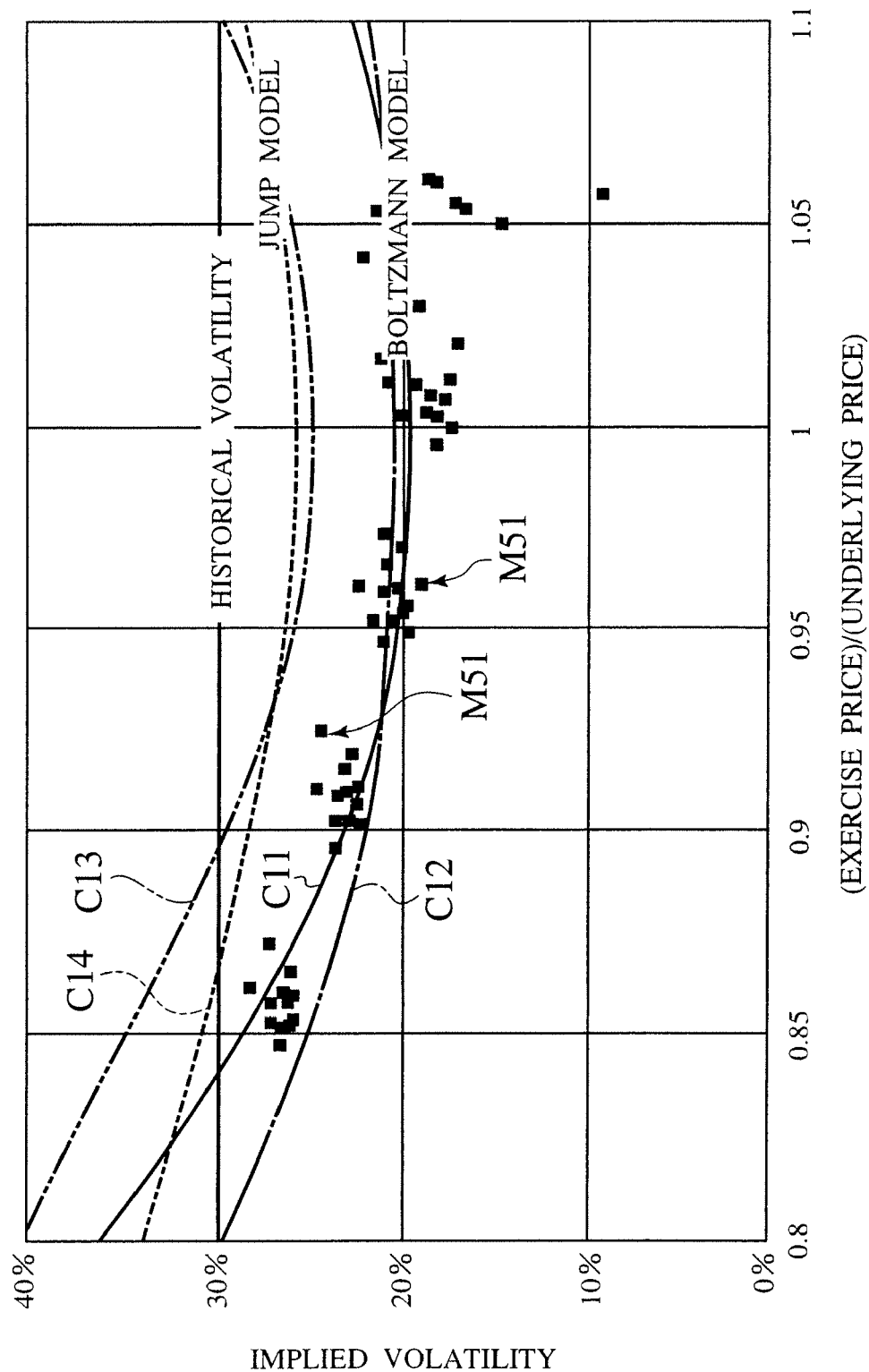
FIG. 27 is a graph showing the implied volatility of the Boltzmann model, in comparison with a jump model.

FIG. 27 illustrates the implied volatility of the Boltzmann model in comparison with that of the jump model. The solid line C11 and the broken line C12 show the result of Boltzmann model with the terms toward the maturity being 40 days and 80 days, respectively. Another broken line C13 and the dashed line C14 show the result of the jump model with the terms toward the maturity being 40 days and 80 days, respectively.

The comparison result shows that the implied volatility of the jump models C13 and C14 become larger than that of the Boltzmann models C11 and C12, and that the curvature of the smile curves of the jump model is smaller than that of the Boltzmann model. This result, that is, the excessive implied volatility of the jump model, also applies to the comparison between the jump model and the actual past records. Because in the jump model the size of a price change is not correlated at all, the central limit theorem affects earlier. This is due to the earlier diffusion of price in a discontinuous model, such as the jump model. In order to obtain the same result as the Boltzmann model, it is necessary for the jump model to use a distribution having a larger probability density in the region of lower earning rate than the curve C10, thereby reducing the diffusion of price. However, the resultant distribution of the daily earning rate becomes quite different from the underlying assets. In this manner, the jump model differs from the Boltzmann fundamentally.

The Boltzmann model is not particularly complicated, as compared with the jump model. This is true from the comparison between the Boltzmann model and the simplest jump model, for instance, the Merton's complex jump model. The Merton's jump model uses a random number ξ of the normal distribution, a random number η of the Poisson distribution, a standard deviation σ of the normal distribution, the average size k of jumps, and the probability λ of occurrence of jumps per unit time. Thus, the Merton's jump model express stochastic differential equation (45) of the underlying assets S using two probability density functions, that is, the Gaussian and the Poisson, and three parameters.

$$\frac{dS}{S} = -\lambda k dt + \sigma \xi \sqrt{dt} + \eta \quad (45)$$

In contrast, the Boltzmann model uses a single probability density function, that is, the Maxwell's distribution, and three parameters. The Boltzmann model is simpler using a less number of probability density functions.

The foregoing is the brief description of the related theory and the reality of option pricing. A dealing system for evaluating option prices based on the Boltzmann model will be explained hereafter.

Figure 28:
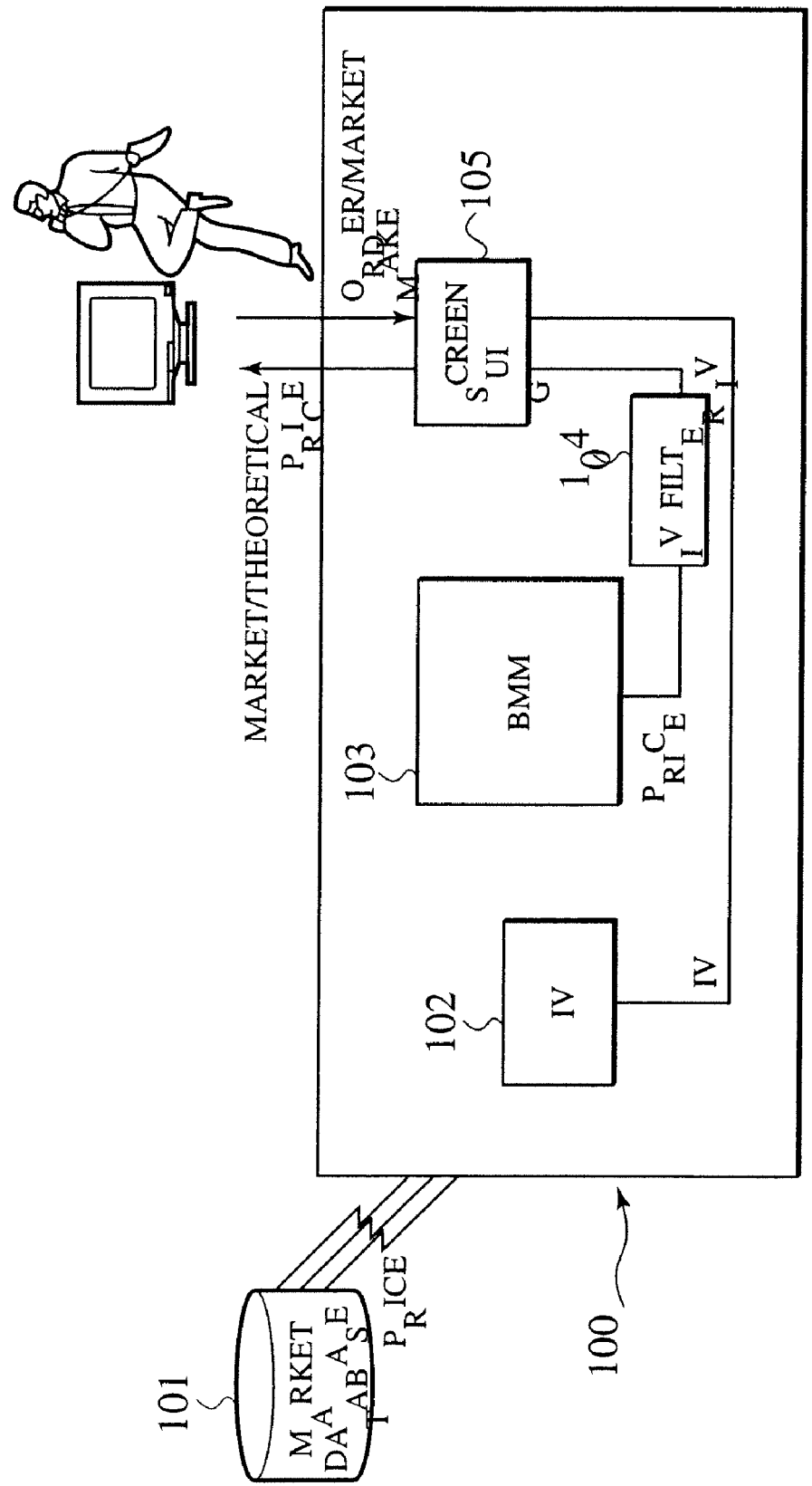
FIG. 28 is a block diagram for the dealing system according to the present invention.
Figure 29:
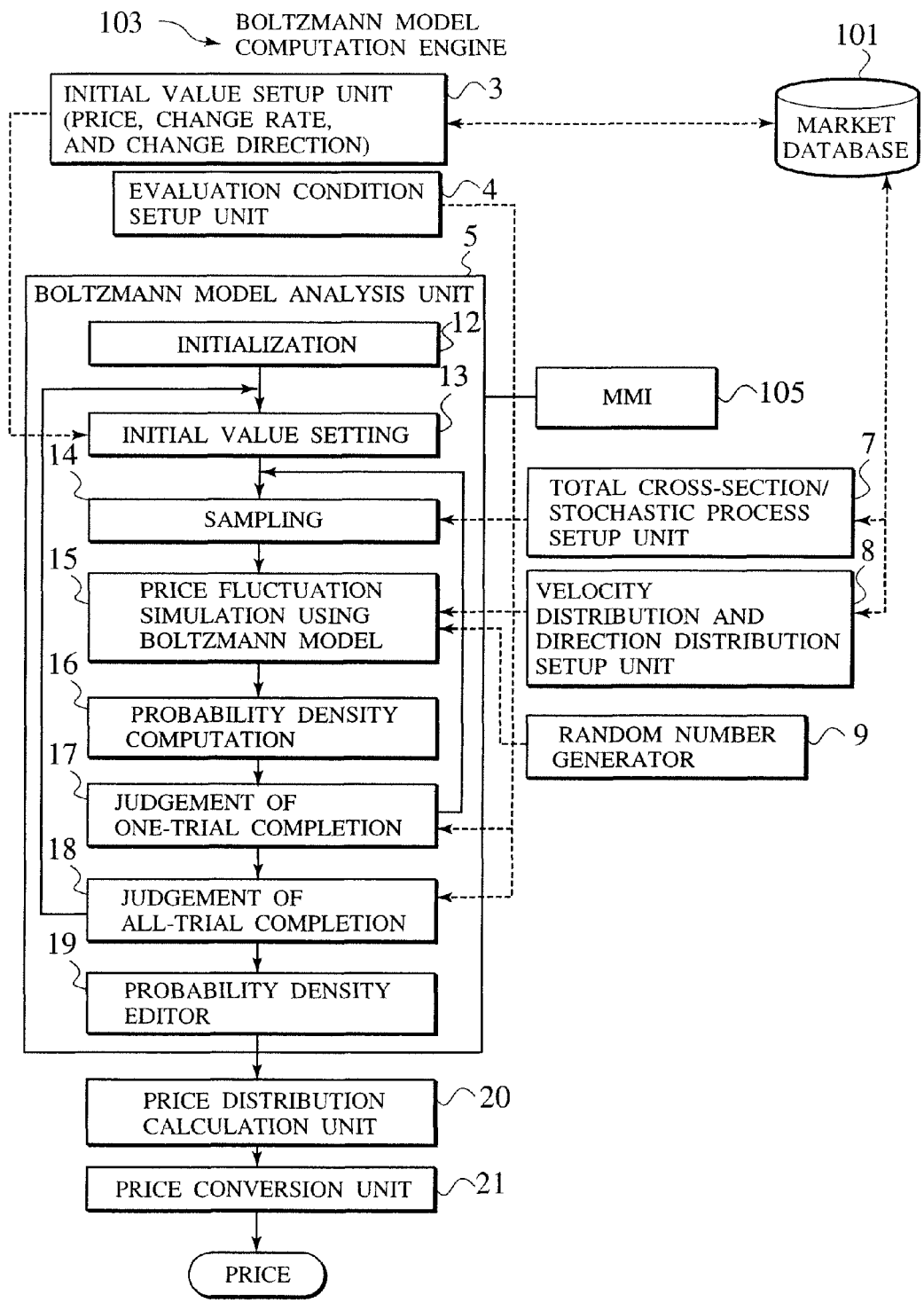
FIG. 29 is a block diagram showing the operation flow and the structure of the Boltzmann model computation engine used in the dealing system shown in FIG. 28.

FIGS. 28 and 29 illustrate the structure of a dealing system 100 of the preferred embodiment of the present invention. The dealing system 100 comprises an implied volatility calculation unit 102, a Boltzmann model computation engine (BMM) 103, an implied volatility (IV) filter 104, and a dealing terminal 105. The implied volatility calculation unit 102 communicates with an external market database 101, and acquires market data to calculate implied volatility. The Boltzmann model computation engine (BMM) 103 has a structure shown in FIG. 29, and conducts option price evaluation based on the Boltzmann model. The implied volatility (IV) filter 104 converts the option price provided from the BMM 103 into the implied volatility (IV). The dealing terminal 105 functions as a graphical user interface (GUI), and displays necessary information. The dealing terminal 105 also outputs data as, for example, hard copies, and inputs data to the system 100.

FIG. 29 illustrates the structure of the Boltzmann model computation engine (BMM) 103. The BMM 103 comprises an initial value setup unit 3, an evaluation condition setup unit 4, a Boltzmann model analysis unit 5, a graphical user interface (GUI) 105, a total cross-section/stochastic process setup unit 7, a velocity/direction distribution setup unit 8, and a random number generator 9. The initial value setup unit 103 allows the initial values of at least a price, a price change rate, and a price change direction to supply to the BMM 103. The GUI 105 may be used in common with the GUI shown in FIG. 28. The BMM 103 is connected to an external market database 101 in order to take necessary market data in.

The Boltzmann model analysis unit 5 includes an initializing unit 12, an initial value setting unit 13, a sampling unit 14, a price fluctuation simulator 15, a probability density calculation unit 16. It also has a one-trial completion detector 17, an all-trial completion detector 18, a probability density editor 19, a price distribution calculating unit 20, and price converter 21. The simulator 15 conducts calculations of price fluctuation based on the Boltzmann model.

The invention will not be limited to the exemplified system configuration, in which the system 100 is installed in a single computer in the physical meaning. For example, the system 100 can be a divided system, such as a client-server system for conducting operations separately. Preferably, the elements in the system correspond to programs for causing the associated elements to execute the operations, or perform the functions, indicated in the blocks in the drawings. Accordingly, the dealing system 100 can be realized by installing a dealing program for causing a single computer with a communication function to perform these functions.

The initial value setup unit 3 inputs $T_0$, $C_0$, $g_0$ of equation (43) to the Boltzmann model analysis unit 5. These parameters are directed to the underlying assets of a stock price or a stock index to be evaluated, and are obtained from the past records. Preferably, the initial value setup unit 3 retrieves information on the stock price or the stock from the market database 101, and acquires the initial values of the price, the price change rate, and the price change direction from the retrieved information. The evaluation condition setup unit 4 supplies evaluation conditions to the Boltzmann model analysis unit 5. The evaluation conditions include the number of trials, a time band, a price range concerned, which are required by the Boltzmann model analysis unit 5 to conduct essential calculations.

The Boltzmann model analysis unit 5 is the center of the dealing system, and the most essential element. The structure of the Boltzmann model analysis unit 5 are almost the same as that of the price and risk evaluation system shown in FIG. 1, but new elements, a price distribution calculation unit 20 and a price conversion unit 21, are added.

The price distribution calculation unit 20 calculates the price distribution based on the price change probability density of the underlying assets edited by the probability density editor 19.

The price conversion unit 21 computes and outputs an option price, based on the price distribution calculated by the price distribution calculation unit 20.

The dealing terminal 105, which functions as a GUI, outputs the intermediate operation results and the final results of the process. The dealing terminal 105 also outputs the price distribution of the option to be evaluated. This terminal 105 has an input function for allowing the user to input data by a pointing device, such as a keyboard or a mouse. The dealing terminal 105 has an output functions, such as displaying information on the monitor screen, printing out as hard copies, transferring data to other systems via a network, and writing in to the memories, etc.

The market database 101 stores information as to option products. In this context, the term "database" includes the data systematically stored in the database, means for retrieving the data, and the hardware storing and managing these.

The market database 101 may be dedicated to this system, or alternatively, it may be an existing external database, if there are any.

An evaluation method of stock index option price carried out by the above-explained system will now be described.

Figure 30:
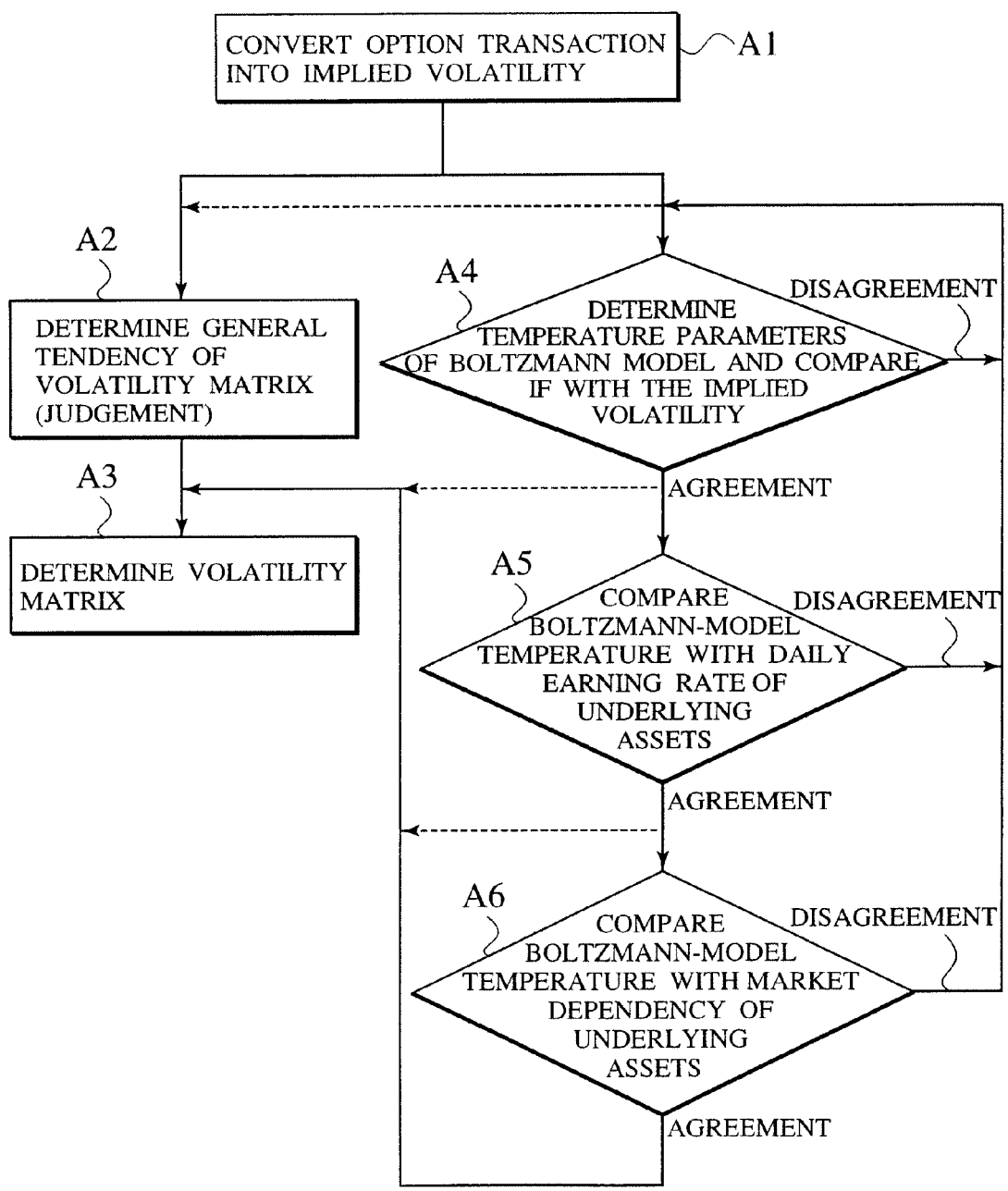
FIG. 30 is a flowchart of theoretical computation carried out by the dealing system shown in FIG. 28.

FIG. 30 illustrates six steps A1 through A6. In the evaluation of stock index option price, many transaction data are generally utilized. The past records including such transaction data are accumulated in the market database 101. In step A1, the total cross-section/stochastic process setup unit 7 calculates an implied volatility using the past records stored in the database 101.

The steps A2 and A3 illustrated in the left half of FIG. 30 show the conventional procedure for the sake of comparison. In A2, a general trend of a volatility matrix is determined from the implied volatility obtained in A1, based on the experiences and intuition, or otherwise, on the simple path average or a recurrent model. Then, in A3, a volatility matrix is determined. The conventional technique required arbitrary judgments in step of A2.

In contrast, the dealing system 100 of the preferred embodiment receives the implied volatility at the Boltzmann model analysis unit 5 in step A4, and determines the temperature parameters (i.e., the three coefficients $T_0$, $c_o$, $g_o$ in equation (43)) of the Boltzmann model. These parameters must be determined so that the temperature of the Boltzmann model coincides with the implied volatility.

In step A4, it is determined wither the Boltzmann model temperature agrees with the implied volatility. If they agree with each other, then the process proceeds to step A5, in which it is determined whether the outcome of the Boltzmann model agrees with the daily earning rate of the underlying assets. If they do not agree with each other, the process returns to step A4, and the parameters are reselected. If they agree with each other, then the Boltzmann model is compared with the market-dependency of the underlying assets in step A6.

If, in step of A6, the Boltzmann model agrees with the market-dependency of the underlying assets, the process proceeds to step A3, in which a volatility matrix is determined based on the outcome of the Boltzmann model. In reality, it is rare that an apparent market-dependency is observed. Accordingly, the flow from A5 to A6 becomes the final decision in many cases. If an apparent market-dependency is observed, and if the Boltzmann model temperature does not agree with this market-dependency, then the process returns to step A4 in order to reselect the parameters.

The Boltzmann model can not always explain the real market very well. Even if a volatility matrix can be described very well in step A4, it may be contradict with the daily earning rate. In such a case, the agreement between the Boltzmann model and the daily earning rate may be given up, and the process proceeds to step A3. If the Boltzmann model does not agree with the implied volatility in step A4, it means that the actual market exceeds the limit of the Boltzmann model. In this case, the process returns to the conventional step A2, and the evaluation is left to the judgement of dealers.

Next, how the dealing system 100 evaluates the option price of an individual stock will be explained.

It is observed that the daily earning rates for the option estimated from the past records using the Boltzmann model agree with the reproduced option price based on the underlying assets through the Boltzmann model well. This fact means that the Boltzmann model has capability for estimating the option prices based on the past records of the underlying assets, without past option-transaction records. Accordingly, the method of the present invention is the most efficient method for evaluating the option price of an individual stock having little transaction record at present time.

Basically, the Boltzmann model uses the same technique for evaluating the option price of an individual asset as that for evaluating the option price of a stock index. In other words, the option prices of individual asset can also be evaluated by determining the three coefficients $T_0$, $c_0$, $g_0$ of equation (43) for each asset.

Figure 31:
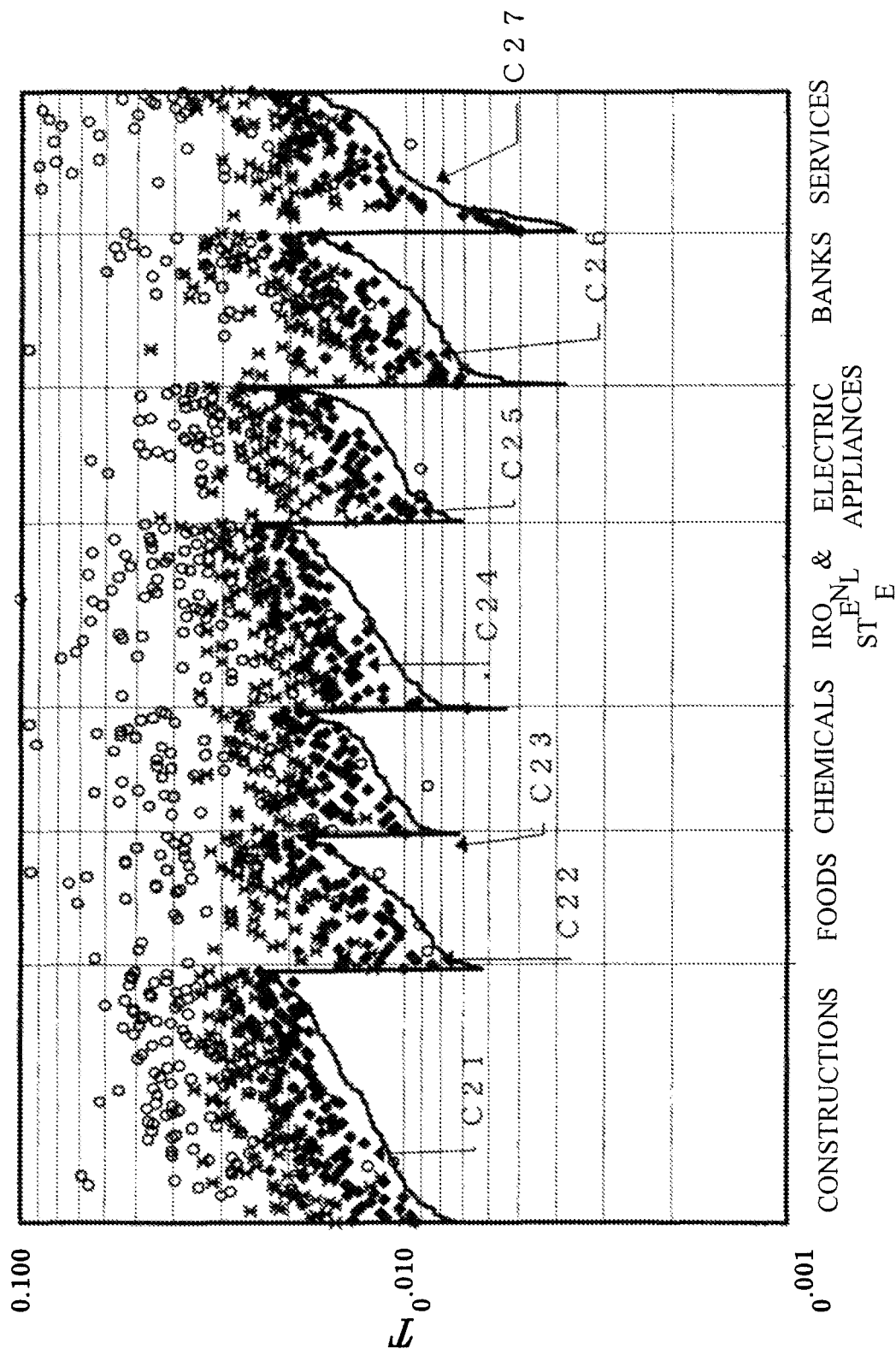
FIG. 31 is a graph of the temperatures T of various listed stocks of Tokyo stock exchange obtained by the dealing system of the invention.

FIG. 31 illustrates the application of the tendencies reproduced by equation (43) to individual asset. FIG. 31 illustrates the temperatures T of various assets listed in the Tokyo Stock Exchange. Along the horizontal axis, various industries (constructions, foods, chemicals, steels, electric appliances, finances, and services) are arranged in the increasing order of the historical volatility of stock price. Solid lines C21, C22, ..., C27 in FIG. 31 represent the temperature T converted from the historical volatility. In the drawing, the darkened circles (symbol ●) denote the temperature of the earning-rate distribution of the current day with the daily earning rate of within 5% of the previous day. The cross marks (×) denote the temperatures with the daily earning rate of between 5% to 10% of the previous day. The white squares (□) denotes the temperature with the daily earning rate of between 10% to 15% of the previous day.

FIG. 31 reveals that the temperatures of three ranges are almost proportional to the corresponding historical volatility such as C21, C22, ..., C27. It is also found that the temperature T increases as the daily earning rate of the previous day becomes larger. Concerning the distributions of the three symbols, the separation between the group of the white squares and the group of the darkened circles (⊙) is larger than the separation between the group of the white squares (□) and the cross marks (×). This means that as the daily earning rate of the previous day increases, not only the temperature, but also the temperature rising rate increases. These observations suggest that temperature T has the quadratic form with the previous day's returns as expressed in equation (43).

Figure 32:
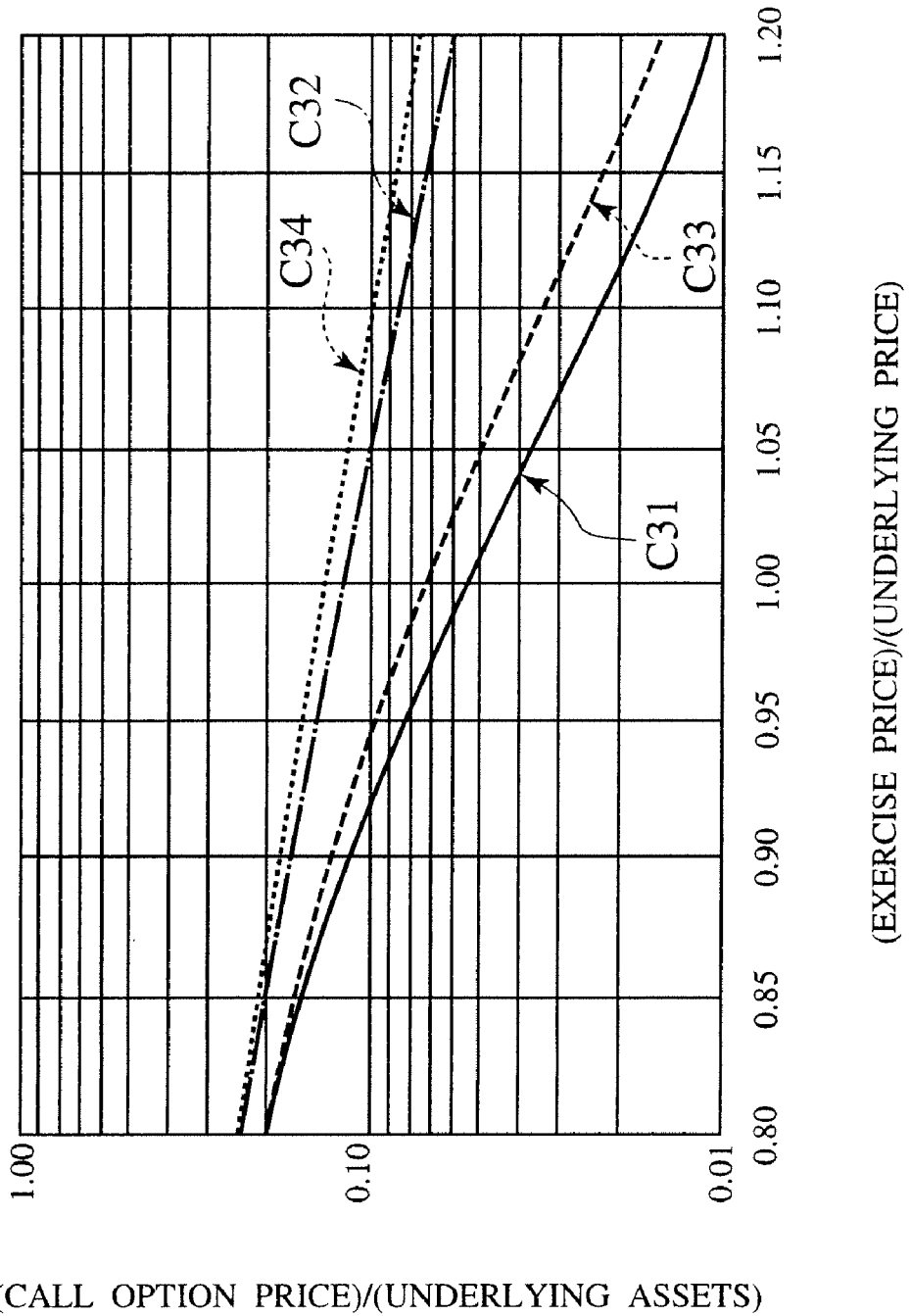
FIG. 32 shows examples of evaluation for call option pricing of individual stock options, which is expressed by ratio of call option price to underlying assets as a function of ratio of exercise price to underlying assets.
Figure 33:
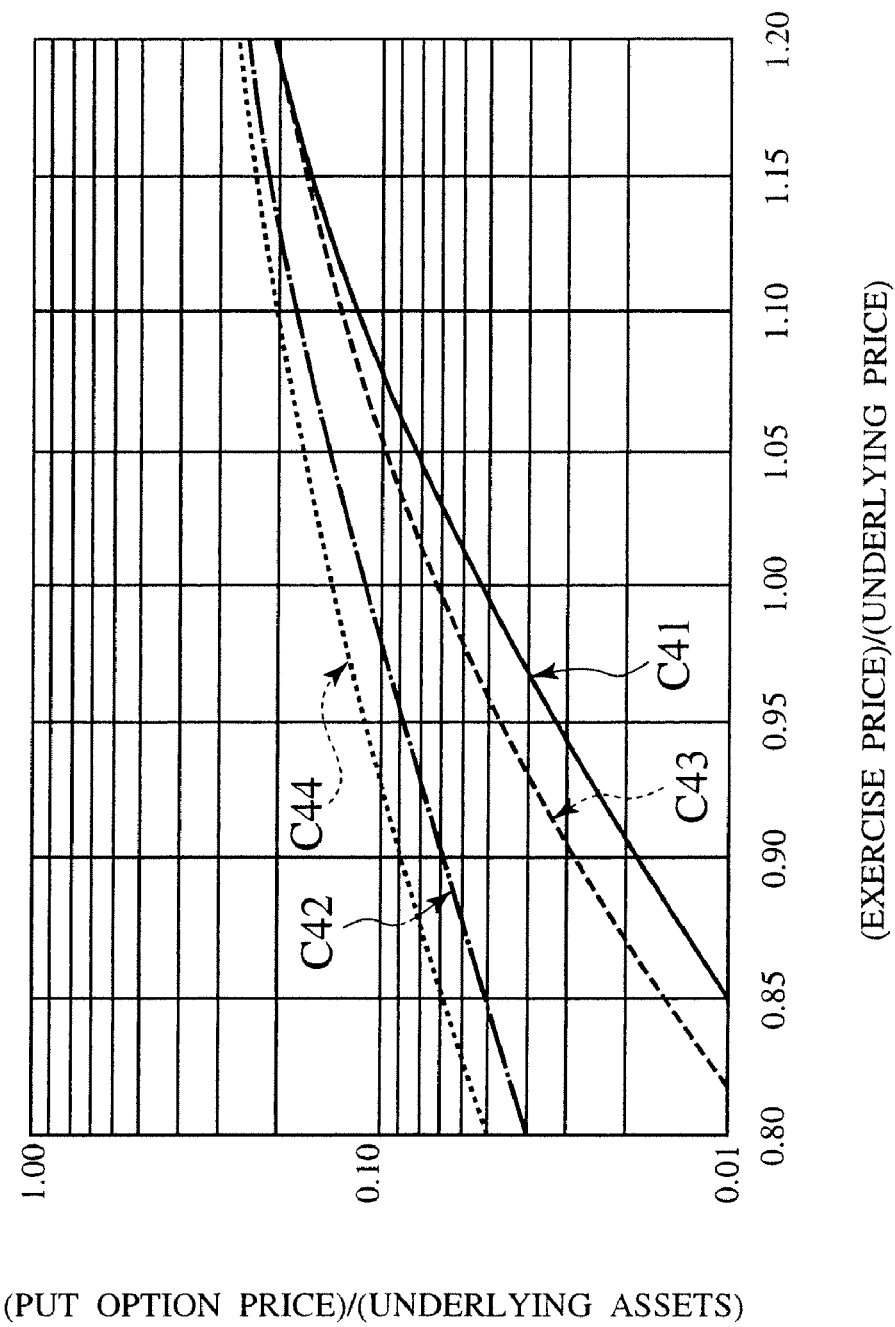
FIG. 33 shows examples of evaluation of put option pricing of individual stock options, which is expressed by ratio of call option price to underlying assets as a function of ratio of exercise price to underlying assets.

FIGS. 32 and 33 illustrate examples of option price evaluation for individual stocks. FIG. 32 shows examples of evaluation for call options. The horizontal axis denotes the ratio of exercise price to the underlying price (i.e., the price of the underlying assets). The vertical axis denotes the ratio of the call option price to the underlying price. FIG. 33 shows examples of evaluation for put options. The horizontal axis denotes the ratio of exercise price to the underlying price. The vertical axis denotes the ratio of the price of put option to the underlying price. In FIGS. 32 and 33, the solid lines C31, C41 represent the evaluated results of the Boltzmann model with the term to the maturity of 20 days. The one-dot broken lines C32 and C42 represent the evaluated results of the Boltzmann model with the term to the maturity of 40 days. The dashed lines C33 and C43, and the dotted lines C34 and C44 represent the results based on the Black-Sholes equation of the corresponding terms.

Here, temperature T is given in the following equation (46) from FIG. 31 under the assumption that an underlying asset concerned has historical volatility with the magnitude of about 70%.

$$T(v')=0.007(1+15v'+300v'^2) \quad (46)$$

The magnitude about 70% of historical volatility is almost doubled with the volatility of the stock index like option of Nikkei 225 stock average. Although this value is slightly larger than the historical volatility for many stocks, the magnitude is still in the range of realistic values.

Figure 34:
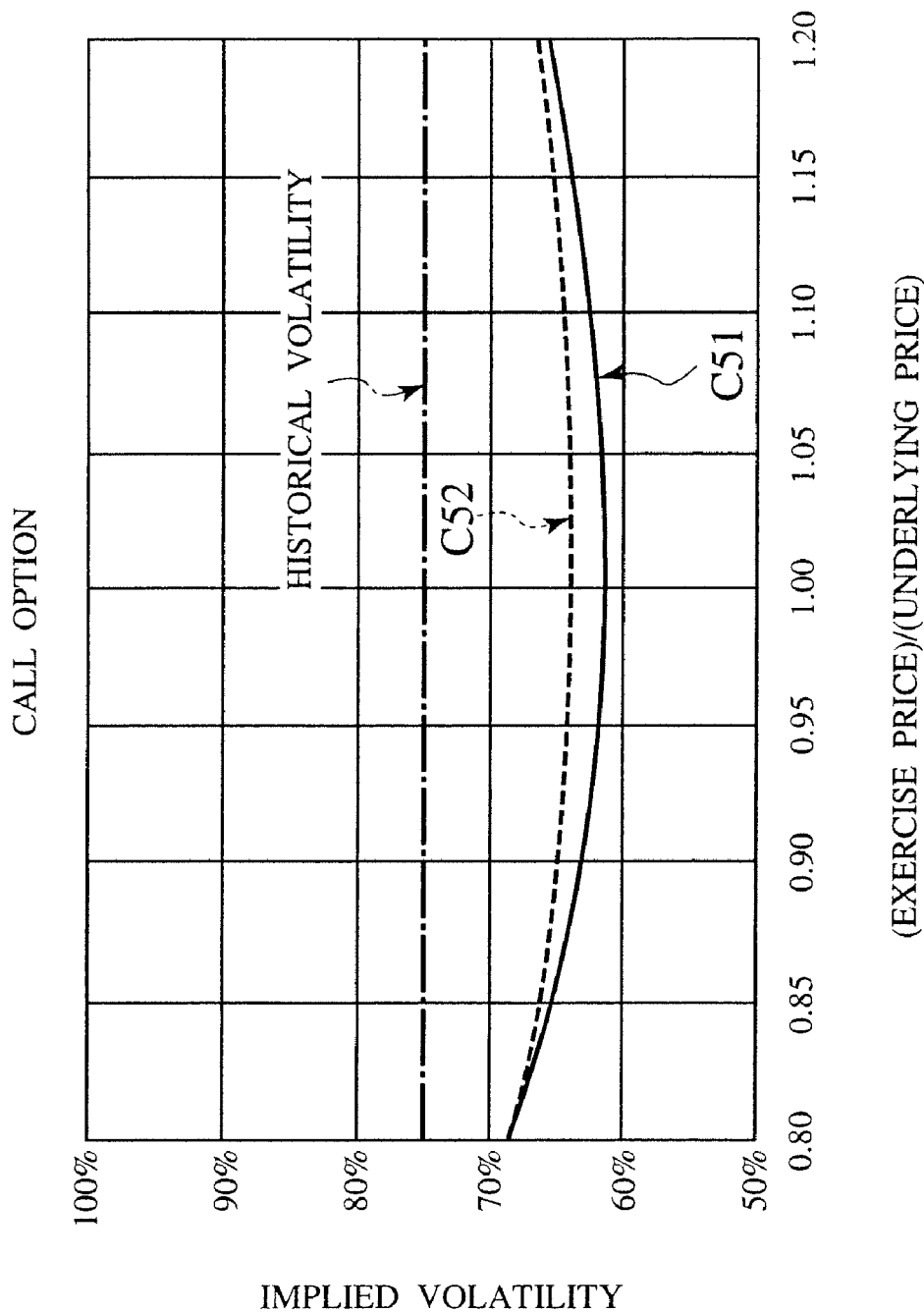
FIG. 34 is a graph indicating the relationship between the ratio of exercise price of a call option to underlying assets and the implied volatility, which is obtained by the dealing system of the invention.
Figure 35:
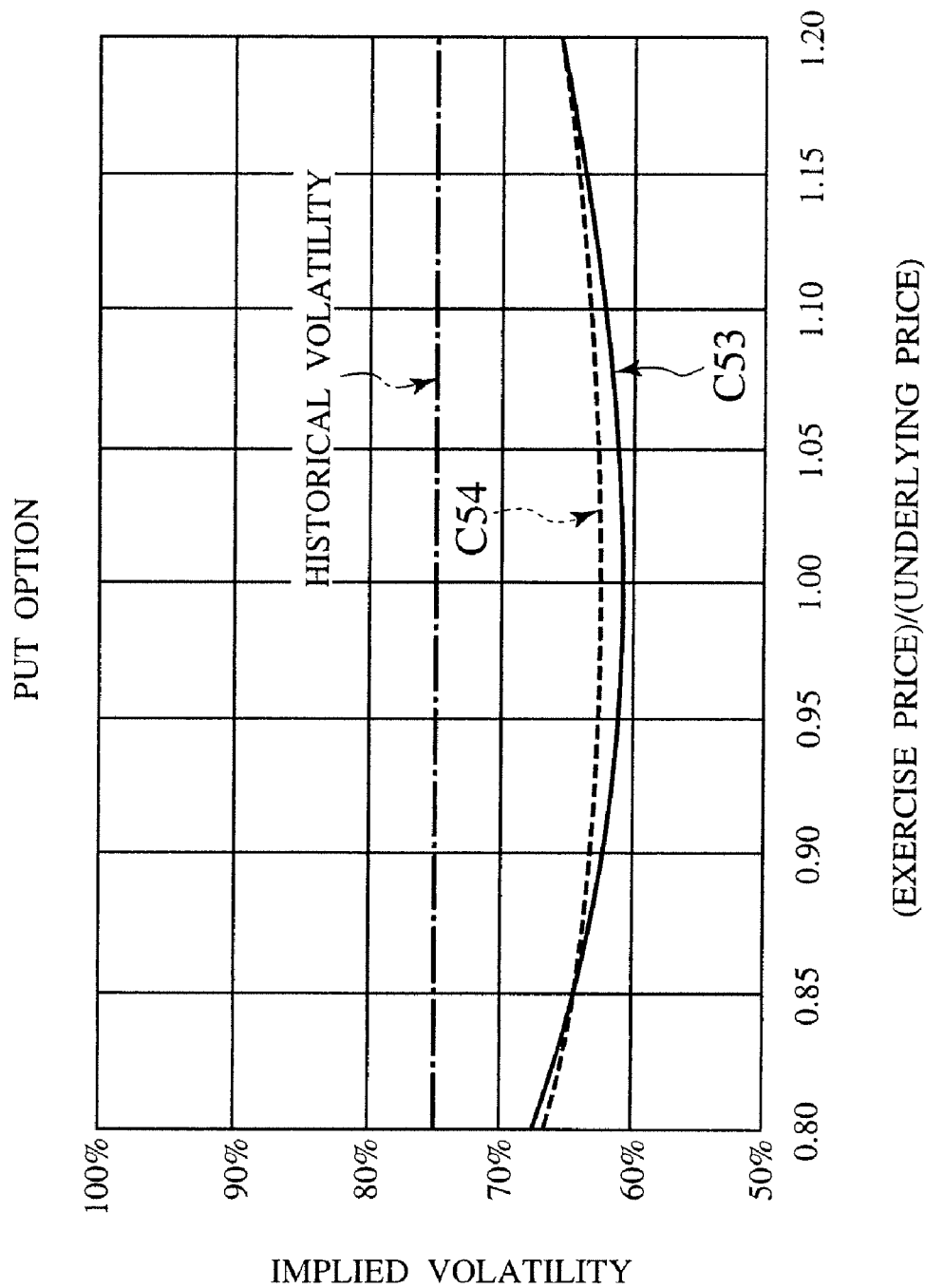
FIG. 35 is a graph indicating the relationship between the ratio of exercise price of a put option to underlying assets and the implied volatility, which is obtained by the dealing system of the invention.

FIGS. 34 and 35 illustrate the implied volatility for a call option and a put option, respectively. These two graphs exhibit smile curves and the term structures, as the smile curves and the term structure for the example of the implied volatility for the stock index shown in FIG. 27.

Figure 36:
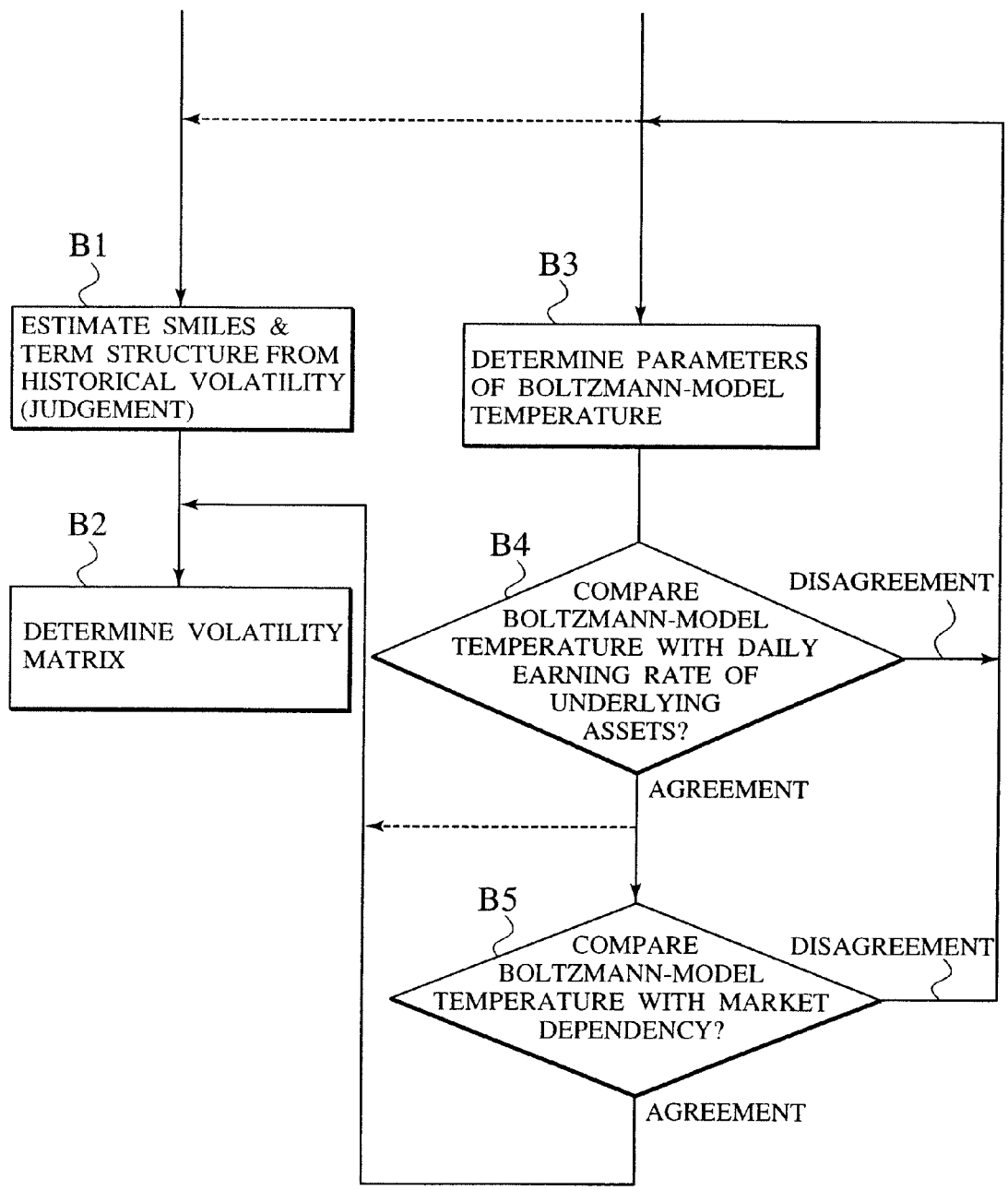
FIG. 36 shows the operation flow of theoretical computation flow carried out by the dealing system according to the invention.

FIG. 36 shows the operation flow in evaluating the option price for the individual stock executed by the dealing system 100. The left half of the drawing is the conventional flow, as in FIG. 30.

In general, the real records of the option transaction for various stocks are insufficient to determine the historical volatility as the reliable information for option dealing. The option transactions with adequate records for various assets are handled with the analogous ways to the option dealing of a stock index, like the Nikkei 225 stock average. In the following explanation, the flow of FIG. 36 is applied mainly to the option dealing with little records for inactive transactions.

With the conventional technique, the smile and the term structure of the volatility are inferred from the experiences in evaluation of option prices for stock indexes, based on the historical volatility of the associated asset, in step B1. Then, in step B2, a volatility matrix is determined based on the smile and the term structure.

In contrast, the dealing system 100 of the preferred embodiment determines the temperature parameters of the Boltzmann model for this asset in step B3. Then, it is confirmed whether the daily earning rate of the Boltzmann model agrees with that of the underlying assets. If the daily earning rates do not agree with each other, the process returns to step B3 to reselect the parameters. If they agree with each other within the specified accuracy, the process proceeds to step B5, in which the agreement between the market-dependency of the Boltzmann model and the actual record is checked. When the both values agree with each other within the certain range, the process proceeds to step B2 to determine a volatility matrix. When there is disagreement in step B5, the process returns to step B3 to reselect the parameters, and to repeat the above-mentioned procedure. In reality, an apparent market-dependency is rarely observed, and therefore, the step B4 may be the final determination to proceed to step B2 (as indicated by the dashed arrow).

Next, how the dealing system 100 evaluates an option price matching with the historical information, based on the Boltzmann model, will be explained. It has already been mentioned that the Boltzmann model is capable of evaluating the smile and the term structure of the implied volatility, while keeping consistency with the historical information of the underlying assets for reproducing the derivatives. This feature is very advantageous, because the basis of the option price is clearly indicated when conducting transaction. In the current status for option pricing in the real market, rationale for pricing is not necessarily required. Especially when the transaction is carried out within the full scope of self-responsibility, large losses due to mispricing from the dealer's judgement is attributed to a problem of the person concerned. On the other hand, in the consulting business for transaction or option pricing, it is required that pricing options must be determined with the reasonable bases, other than long experiences and intuition basis.

Since the uncertainty is high in the market, arbitrary judgment relying upon experiences and intuitions will never completely disappear. However, if such arbitrary judgment is rationalized by other adequate information, the judgement becomes an action based on the rationale, and is not mere manual judgement any longer. The modern financial engineering stands for foundation that pricing derivatives are uniquely determined by the price of the underlying asset. Therefore, the match between the Boltzmann model and the historical information of the underlying assets can be a strong basis of rationality of price evaluation.

It is recognized that pricing options by the jump model or volatility matrix model, previously described, cannot fully cover wider range of the historical information. In these cases, it is difficult to explain reasonable sources for the deviation from the reality in the option market. Since such models are not perfect, option pricing needs the new model which can reproduce option price from the historical information from the underlying assets. However, the Boltzmann model is advantageous because it keeps consistency with the historical information on the underlying assets in principle with a very little deviation, and in addition, there are a relatively few occasions that require deviation. Even if such deviation is observed, dealers can discuss with the interested parties in advance. Therefore, a situation in which misjudgment by a particular dealer or a consultant may lead to a huge amount of losses can be avoided.

The dealing system 100 must evaluate risk parameters expressed by equations (47) through (51) as a risk hedge when evaluating a option price.

$$\Delta = \frac{\partial C}{\partial S} \tag{47}$$

$$\Gamma = \frac{\partial^2 C}{\partial S^2} \tag{48}$$

$$P = \frac{\partial C}{\partial r} \tag{49}$$

$$\Theta = \frac{\partial C}{\partial \tau} \tag{50}$$

$$V = \frac{\partial C}{\partial \sigma} \tag{51}$$

here C is the option price, S is the underlying price, r is the non-risky interest rate, $\tau$ is the term to the maturity, and $\sigma$ is the volatility. It is known that if the underlying assets are traded in proportion to these risk parameters, the price fluctuation of the underlying assets can be canceled out in principle.

These risk parameters are the differentials of the option price. The Boltzmann model uses the Monte Carlo method for numerical analysis as a prerequisite; however, the Monte Carlo method has a drawback of taking computation time for evaluating the differentials. For instance, when calculating the risk parameter $\Theta$ of a call option price C strictly using the Monte Carlo method, an infinitesimal change $\delta\tau$ in term $\tau$ to the maturity is set, and equation (52) is computed.

$$\Theta = \frac{\partial C}{\partial \tau} = \frac{\text{Call}(K, \tau + \delta\tau) - \text{Call}(K, \tau)}{\delta\tau} \tag{52}$$

The numerator of equation (52) becomes equation (53) from equation (36).

$$\text{Call}(K, \tau + \delta\tau) - \text{Call}(K, \tau) = \tag{53}$$

$$e^{-r\tau}\left(e^{-r\delta\tau}\int dS(S-K)P(S, \tau+\delta\tau) - \int dS(S-K)P(S, \tau)\right)$$

The integral of the right-hand side of equation (53) is computed by the Monte Carlo method. The change in $\tau$ of the input variable is very small, and therefore, the difference between the integral of the first term and the integral of the second term of the right-hand side of equation (53) is also small.

Since the computation result of the Monte Carlo method varies within the range of the statistics error, the amount of computation must be increased in order to reduce the statistic error. In general, the statistic error is inversely proportional to the square of the computation amount. Accordingly, if the change is very small, a significant difference can not be detected unless a vast of time is spent for computation.

This problem applied to not only the financial Monte Carlo, but also the general Monte Carlo, and an ultimate solution has not been found yet. The neutron transport Monte Carlo method uses a perturbation Monte Carlo, which simulates only an infinitesimal change. However, even with this method, some approximation is required, and the advantage of the Monte Carlo method, that is, the exactness may be damaged.

Considering the fact that the Monte Carlo method can not conduct a rigorous simulation of an infinitesimal change at present, it is not practical to stick to the exact solution. Under a circumstance in which the option price can be explained by the implied volatility, separation between the Boltzmann model and the Black-Sholes model is small. Because the first-order or the second-order differentials, such as risk parameters, do not depend on models very much, risk parameters can be evaluated at a practically sufficient accuracy by inputting the implied volatility calculated back from the option price of the Boltzmann model into the Black-Sholes risk parameter evaluation equation.

To be more precise, the volatility $\sigma$ of risk parameter evaluation equations (54) through (58) based on the Black-Sholes equation is replaced by the implied volatility that coincides with the option price of the Boltzmann model. Then, the Black-Sholes risk parameters are used as those of the Boltzmann model.

$$\Delta = \begin{cases} N(d_1); \text{Call} \\ N(d_1) - 1; \text{Put} \end{cases} \tag{54}$$

$$\Theta = \begin{cases} -\dfrac{S\text{Erf}(d_1)\sigma}{2\sqrt{\tau}} - rKe^{-r\tau}N(d_2); \text{Call} \\ -\dfrac{S\text{Erf}(d_1)\sigma}{2\sqrt{\tau}} + rKe^{-r\tau}N(-d_2); \text{Put} \end{cases} \tag{55}$$

$$\Gamma = \begin{cases} \dfrac{\text{Erf}(d_1)}{S\sigma\sqrt{\tau}}; \text{Call} \\ \dfrac{\text{Erf}(d_1)}{S\sigma\sqrt{\tau}}; \text{Put} \end{cases} \tag{56}$$

$$V = \begin{cases} S\sqrt{\tau}\,\text{Erf}(d_1); \text{Call} \\ S\sqrt{\tau}\,\text{Erf}(d_1); \text{Put} \end{cases} \tag{57}$$

$$P = \begin{cases} K\tau e^{-r\tau}N(d_2); \text{Call} \\ -K\tau e^{-r\tau}N(-d_2); \text{Put} \end{cases} \tag{58}$$

here, Erf (x) is an equation defined by $$\text{Erf}(x) = \frac{1}{\sqrt{2\pi}}\exp\left(-\frac{1}{2}x^2\right). \tag{59}$$

The dealing system 100 may have an alternative function, that is, a function for generating a table from the probability density functions evaluated by the Boltzmann model, and for computing the option price based on the Riemann sum of vectors, instead of on the recalculation of the Monte Carlo method.

Implied volatility is a volatility of the Black-Sholes equation computed backward so that the option price evaluated by the Boltzmann model agrees with the option price evaluated by the Black-Sholes (BS) equation. In the Boltzmann model, the option price is expressed by equations (36) and (37), and the integrals of these equations are obtained using the Monte Carlo method.

If the probability density function P (S, τ) does not change largely with respect to S, that is, if a general price distribution can be applied, then it is effective and useful to make a table of probability density functions with respect to S, and to make approximation by the series of equations 60 and 61. In this case, the approximated result becomes quite close to the rigorous evaluation result of the Monte Carlo method.

$$\text{Call}(K) \approx e^{-r\tau} \sum_{Si=K}^{Si \to \infty} \Delta SiP(Si, \tau)(Si - K) \qquad (60)$$

$$\text{Put}(K) \approx e^{-r\tau} \sum_{Si=0}^{Si=K} \Delta SiP(Si, \tau)(K - Si) \qquad (61)$$

here the probability density function P (Si, τ) is expressed by equation (62), and is evaluated by the Monte Carlo method.

$$P(Si, \tau) = \frac{\int_{Si-\frac{1}{2\Delta Si}}^{Si+\frac{1}{2\Delta Si}} dsP(S, \tau)}{\Delta Si} \qquad (62)$$

By storing the probability density functions of equation (62) as a table with a practically sufficient small Δsi, equations (60) and (61) can be computed at a high speed because these two equations are merely the sum of product (or the Riemann sum) of vectors.

Figures 37, 38:
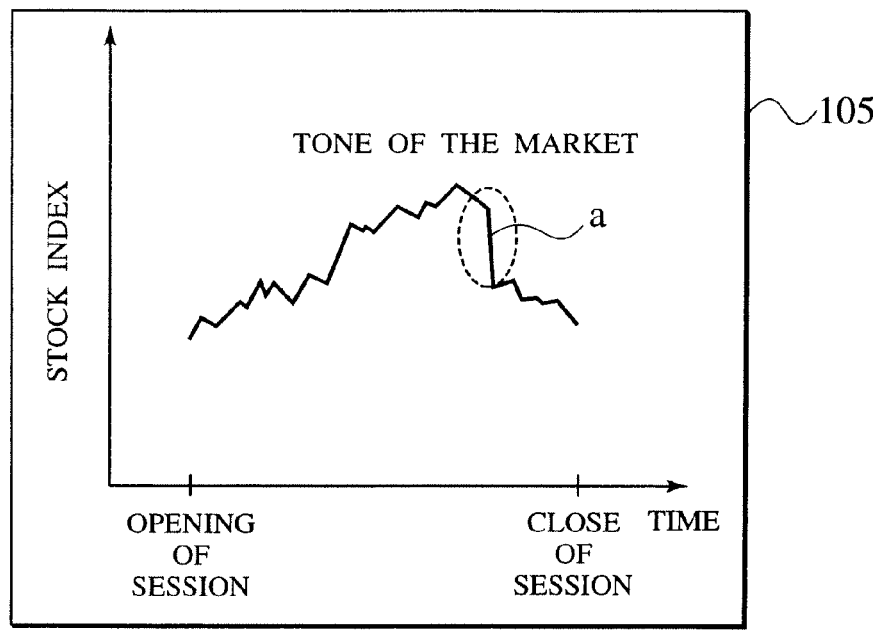
FIG. 37 illustrates a sub-screen displayed on a terminal of the dealing terminal of system, which displays the detailed track of stock index in the continuous session.
FIG. 38 illustrates a sub-screen displayed on a terminal of the dealing system, which displays a table of the implied volatility, the market prices for each delivery month, and each exercise price of stock index option, together with the underlying assets.

Next, the operation process by the dealing system 100 will be explained. FIG. 37 illustrates a sub-screen (or a window) of the dealing terminal 105, which displays the detailed track of stock index in a continuous session. FIG. 38 illustrates a sub-screen of the dealing terminal 105, which displays a table of implied volatility and market prices of each delivery month and each exercise price of stock index option together with the stock index as the underlying asset prices.

FIGS. 39 (*a*) and (*b*) also illustrate sub-screens of the dealing terminal 105, which display the information contained in the table as graphs. FIG. 39(*a*) is a graph of implied volatility as a function of exercise price, which exhibits a so-called smile curve. FIG. 39(*b*) is a graph of option price of each delivery month as a function of exercise price.

Figure 40:
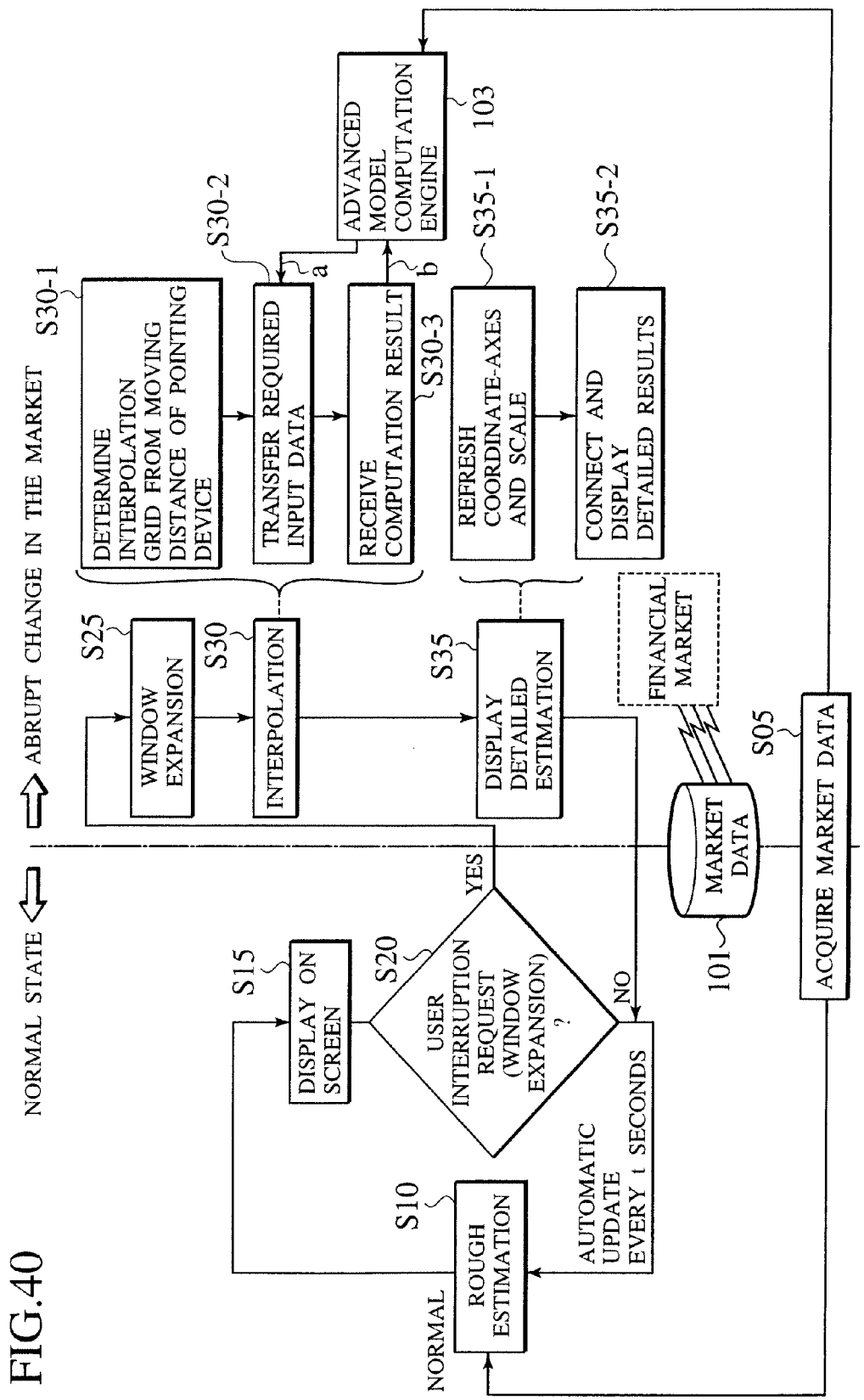
FIG. 40 illustrates an operation flow of the detailed price evaluation carried out by the dealing system.

This dealing system 100 carries out the operation flow shown in FIG. 40. In the normal market state, the system takes the market data 101 in (step S05), and conducts rough calculation (step S10). The rough calculation result is displayed on the sub-screen shown in FIG. 37 (step S15), thereby improving the display speed.

Figure 42:
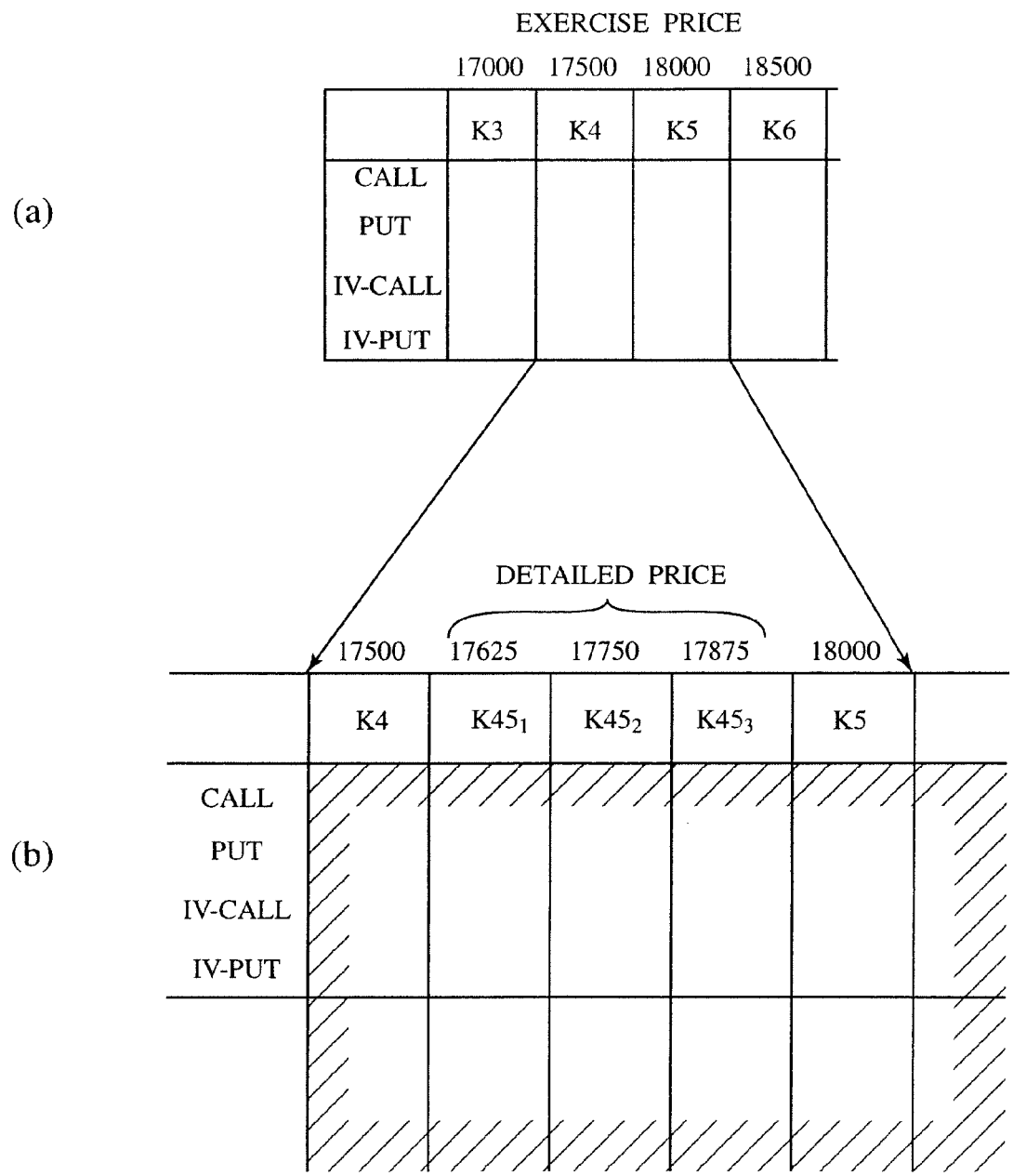
FIG. 42 illustrates switching of tables displayed on a terminal of the dealing system during the process of detailed price evaluation.

If an abrupt change occurs to the underlying assets as indicated by the dashed circle "a" in FIG. 37, the user can switch the sub-screen (or the window) shown in FIG. 41(*a*) to a sub-screen of detailed information shown in FIG. 41 (*b*). To be more precise, the user enlarges the window by dragging a desired area 111 (corresponding to K4-K5) shown in FIG. 41(*a*) in a diagonal direction using a mouse or other pointing device in a diagonal direction (steps S 20 and S25). Then, additional columns are produced corresponding to the dragging amount, as shown in FIG. 42(*b*). The additional input data, that is, virtual exercise prices K451, k452, and K453 are automatically transferred to the BMM 103 for interpolation (steps S30-1 and S30-2).

The interpolation result, that is, the implied volatility and the option exercise prices corresponding to the abrupt change "a" are returned from the BMM 113 to the dealing terminal 105 (step S30-3). Then, the scale of the sub-screen of FIGS. 38 and 42(*a*) and the scale of the sub-screen of FIGS. 39 and 41(*a*) are refreshed (step S 35-1) to display the detailed information. The interpolated results (i.e., the detailed information) are connected into a line, and displayed on the sub-screen (step S35-2). FIG. 41(*b*) shows the interpolated detailed implied volatility C65, in comparison with the rough calculation result C64.

Next, the computation carried out by the BMM 103, which is a theoretical computation server, will be explained with reference to FIG. 43.

As has already been mentioned, implied volatility (IV) is a volatility of the Black-Sholes (BS) equation calculated backward in such a manner that the option price evaluated by the Boltzmann model agrees with the option price provided by the BS equation.

In the Boltzmann model, the option prices of call option and put option are described by equations (36) and (37), and the integrals of these equations are obtained using the Monte Carlo method. If the probability density function P (S, τ) in equations (36) and (37) does not exhibit an extremely big change, that is, if the ordinary price distribution is applicable to the evaluation, then, the probability density function when it is not largely varied, i.e., when the normal price distribution can be applied, then the probability density functions P (S, τ) are arranged in a table with respect to S. By making approximation using the series of equations (60) and (61), a considerably accurate result close to the strict evaluation result by the Monte Carlo method can be obtained.

Here, the probability density function P (Si, τ) contained in equations (60) and (61) is expressed by equation (62), which is evaluated by the Monte Carlo method. By taking ΔSi sufficiently and practically small, and by storing the probability density function of equation (62) as a table, equations (60) and (61) become merely Riemann sums of vectors, and can be computed at a high speed.

Figure 43:
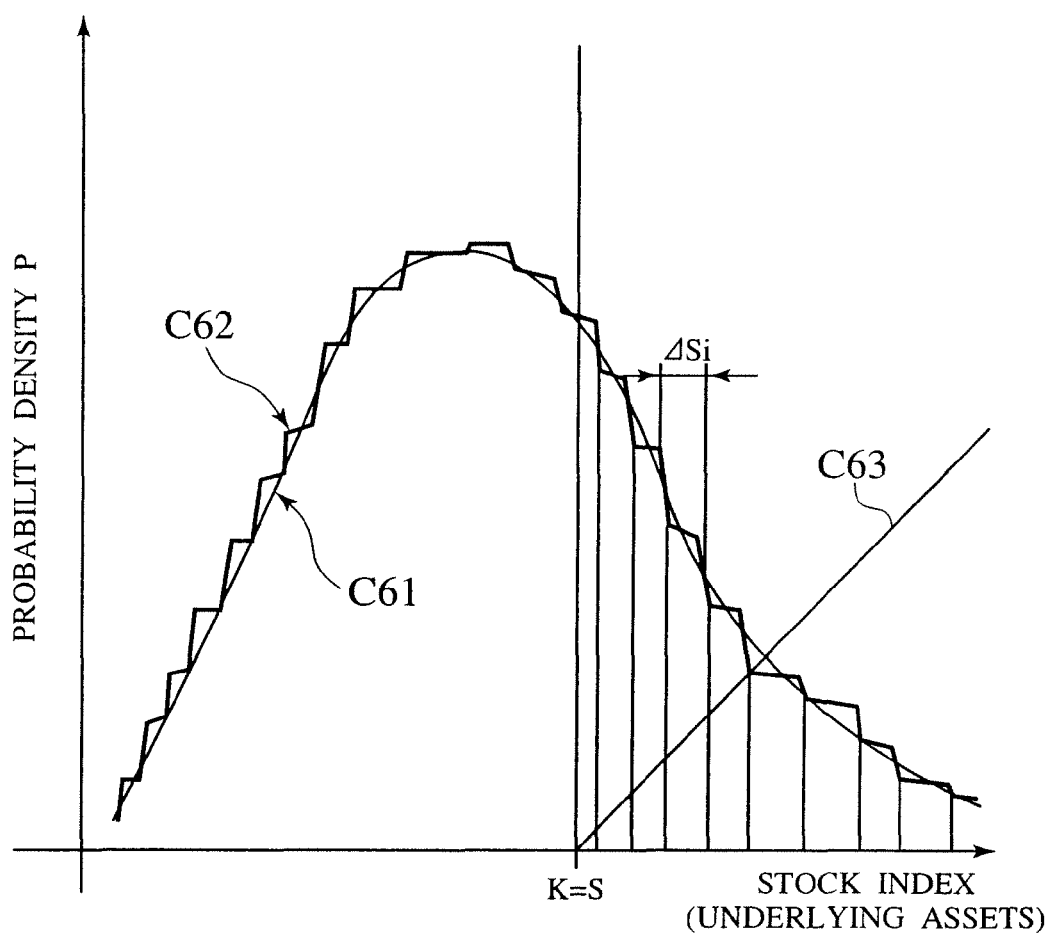
FIG. 43 is a graph representing the theoretical computation carried out by the Boltzmann model computation engine of the dealing system.

FIG. 43 schematically illustrates the series of equation (60). A smooth curve C61 in FIG. 43 is the genuine probability density P (S, τ). The histogram C62 is the tabled probability density P (Si, τ). The Monte Carlo integral of the product of the genuine probability density P (S, τ) and the linear line C63 with a slope 1 and starting from the point of S=K is the strict solution of equation (36). If the user requests an interruption for evaluating a detailed result (YES in step S20 of FIG. 40), the rigorous solution of equation (36) is computed. On the other hand, the integral of the product of the linear line C63 and the histogram C62 is an approximation expressed by equation (60). In the normal market state (NO in step S20), approximation is computed as a rough evaluation.

In this manner, if detailed evaluation is desired, stricter result is obtained and displayed. In the graph of FIG. 41 (*b*), a symbol C indicates the separation between the ordinary rough calculation C64 and the detailed evaluation C65.

With this arrangement, the evaluation result is displayed promptly based on the rough calculation in the ordinary state. Under a user request, the window or the sub-screen is enlarged to display the detailed evaluation, thereby allowing the user to visually know the market change quickly.

Figure 44:
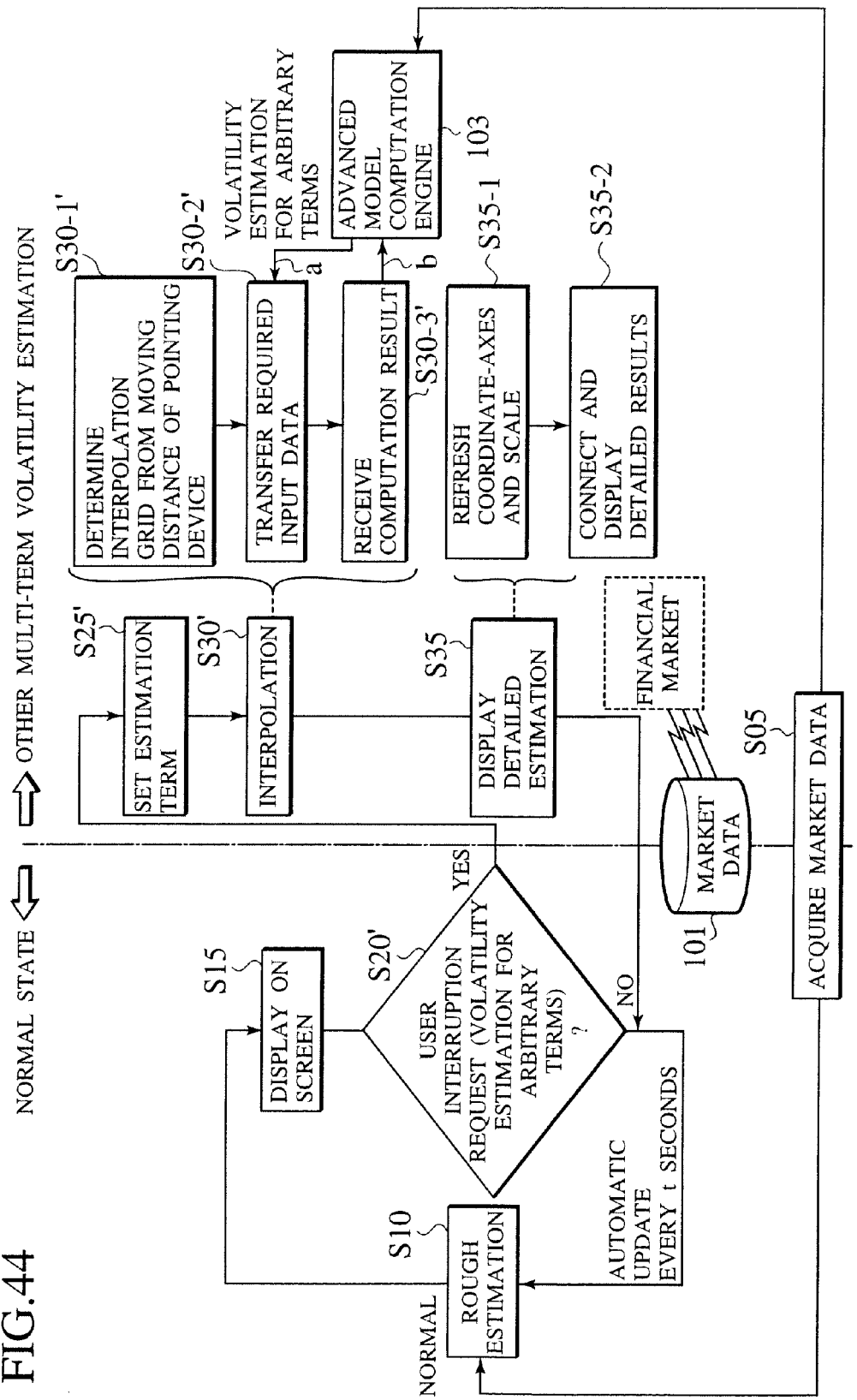
FIG. 44 illustrates an operation flow of the evaluation process of an arbitrary multi-term volatility carried out by the dealing system.

Next, a technique for developing a structured bond or an exotic option by the dealing system 100 shown in FIG. 28 will be explained. Such a development can be realized by obtaining and displaying volatilities of arbitrary multiple terms to evaluate the term structure of the volatility independent of the market. FIG. 44 illustrates the operation flow of evaluation of multi-term volatility. The same steps as those in the flowchart of FIG. 40 are denoted by the same numerical references.

Figure 45:
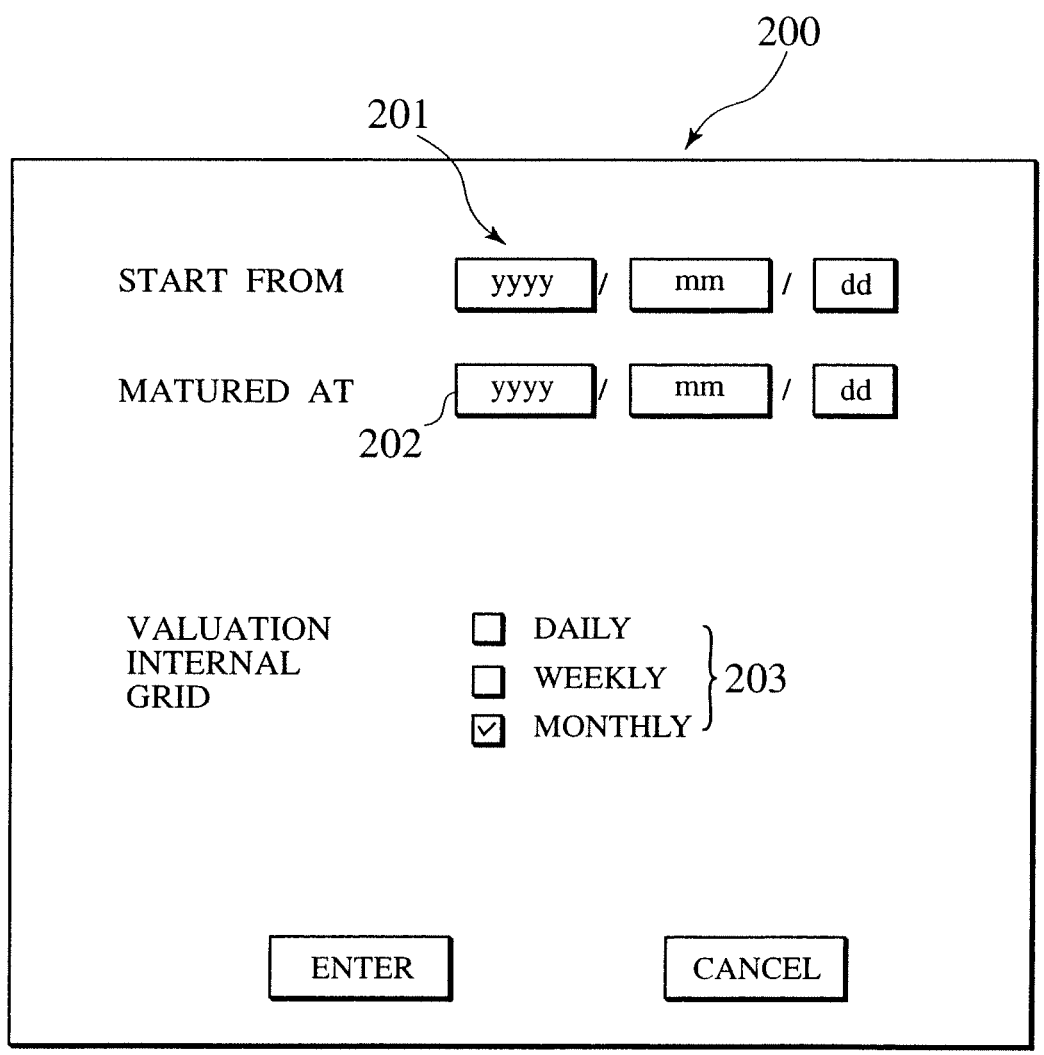
FIG. 45 illustrates a period setting screen displayed on a terminal of the dealing system in the evaluation process of the arbitrary multi-term volatility shown in FIG. 44.

In the ordinary state, the dealing terminal 105 displays the market on the sub-screen based on the rough calculation result, as shown in FIGS. 37 through 39. If the user wishes to evaluate volatilities of multiple terms, a term setting window 200 shown in FIG. 45 is called. In order to select the evaluation period for a selected option, a starting date 201, the maturity 202, and the evaluation interval 203 are input.

The input information does not have to be those values set in the market. For example, the options in the first and second delivery months circled with "a" in FIG. 46, which shows the implied volatility and the market prices, are traded in the market. However, there is no transaction of the option of the $m^{th}$ delivery month, which is circled with "b".

If the user requests an interruption (step S20' in FIG. 44) for evaluation of the $m^{th}$ delivery month, the user inputs the final date of the $m^{th}$ delivery month in the item 202 on the screen 200 with the selection of monthly evaluation (step S25'). Then, the inputted information is automatically transferred to the BMM 103 for interpolation (step S30'; steps S30-1' and S30-2') upon hitting "enter".

The BMM 103 carries out the computation based on Boltzmann model. The dealing terminal 105 receives the computation result, more specifically, the implied volatility and option price "b" of the $m^{th}$ delivery month (Step S30-3'). Then, the scale of the sub-screen shown in FIGS. 38 and 39 are refreshed, and the interpolation results are connected into a line and displayed on the refreshed screen (steps S35-1, S35-2; S35).

Figure 47:
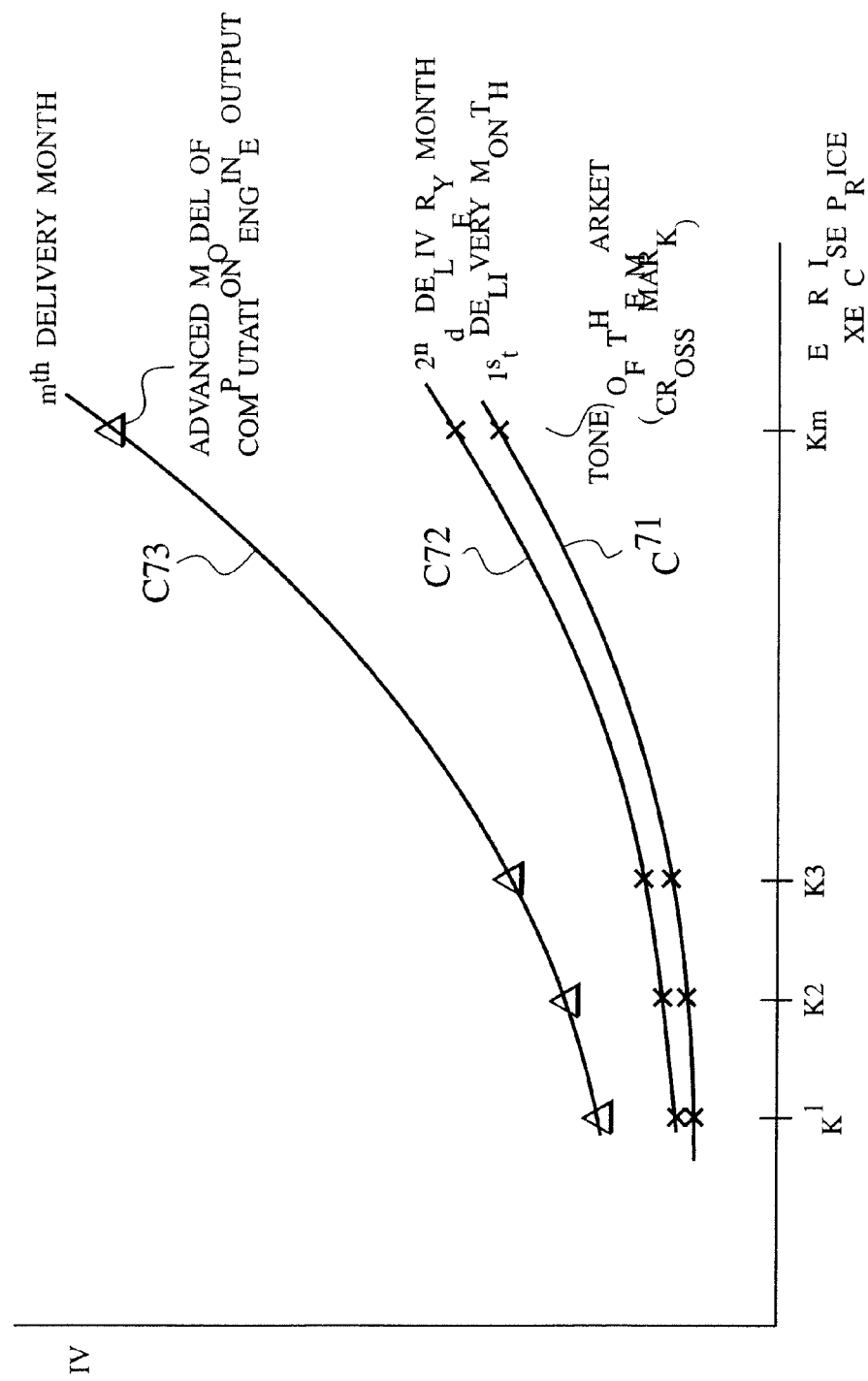
FIG. 47 is a graph showing an example of estimation result for the arbitrary multi-term volatility, which is displayed on the terminal of the dealing system as a result of the evaluation process.

FIG. 47 illustrates an example of the interpolation result, in which the curves C71 and C72 represent the volatility of the option existing in the market, and a curve C73 represents the volatility of the option that does not exist in the market.

In this manner, obtaining and displaying the volatility of arbitrary multiple terms allows the term structure of the option volatility that does not exist in the market to be evaluated. This arrangement can improve the efficiency of developing a structured bond or an exotic option.

Next, a technique for displaying the behavior of the term structure of the implied volatility (IV) at the money (ATM) with fading animations will be explained with reference to FIGS. 48 through 52. The fading animation is also carried out by the dealing system 100.

Figure 48:
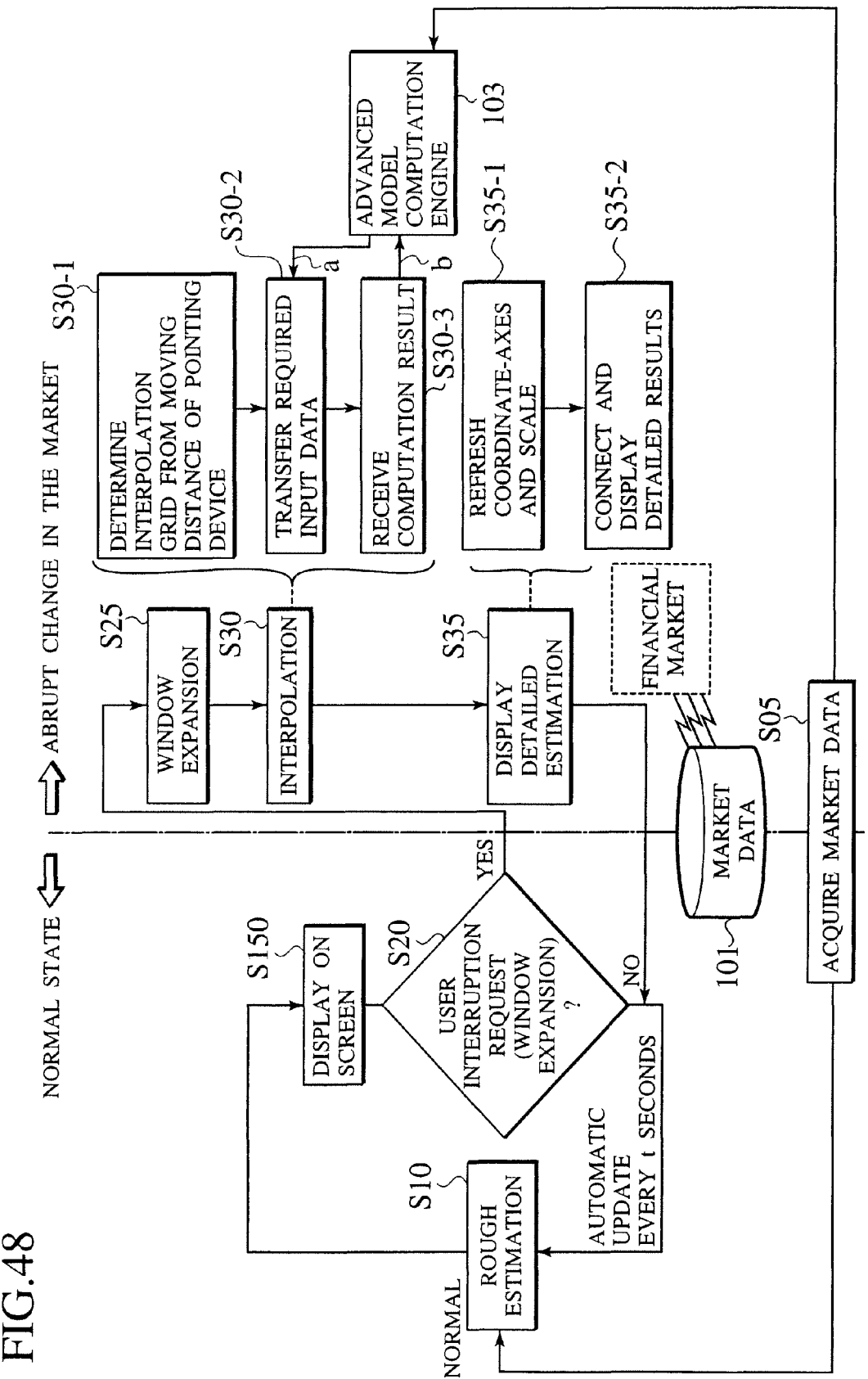
FIG. 48 illustrates an operation flow in a modified process for the detailed price evaluation with a fading operation carried out by the dealing system, which includes a fading operation.

The flowchart in FIG. 48 includes the fading steps, which are basically added to the operation flow shown in FIG. 40. The same steps as those in FIG. 48 are denoted by the same numerical references. The newly added function is the fading display in step S150.

In the ordinary state, the market is displayed on the sub-screen of the dealing terminal 105, as shown in FIGS. 37 through 39 based on the rough calculation (step S10). If an abrupt change occurs in the underlying assets (as indicated by "a" in FIG. 37), the user can select a desired area 110 in the sub-screen of FIG. 39 to look into the state. The user can enlarge the selected area for detailed evaluation, as shown in FIG. 41(*a*), using a mouse (YES in step S20).

Figure 50:
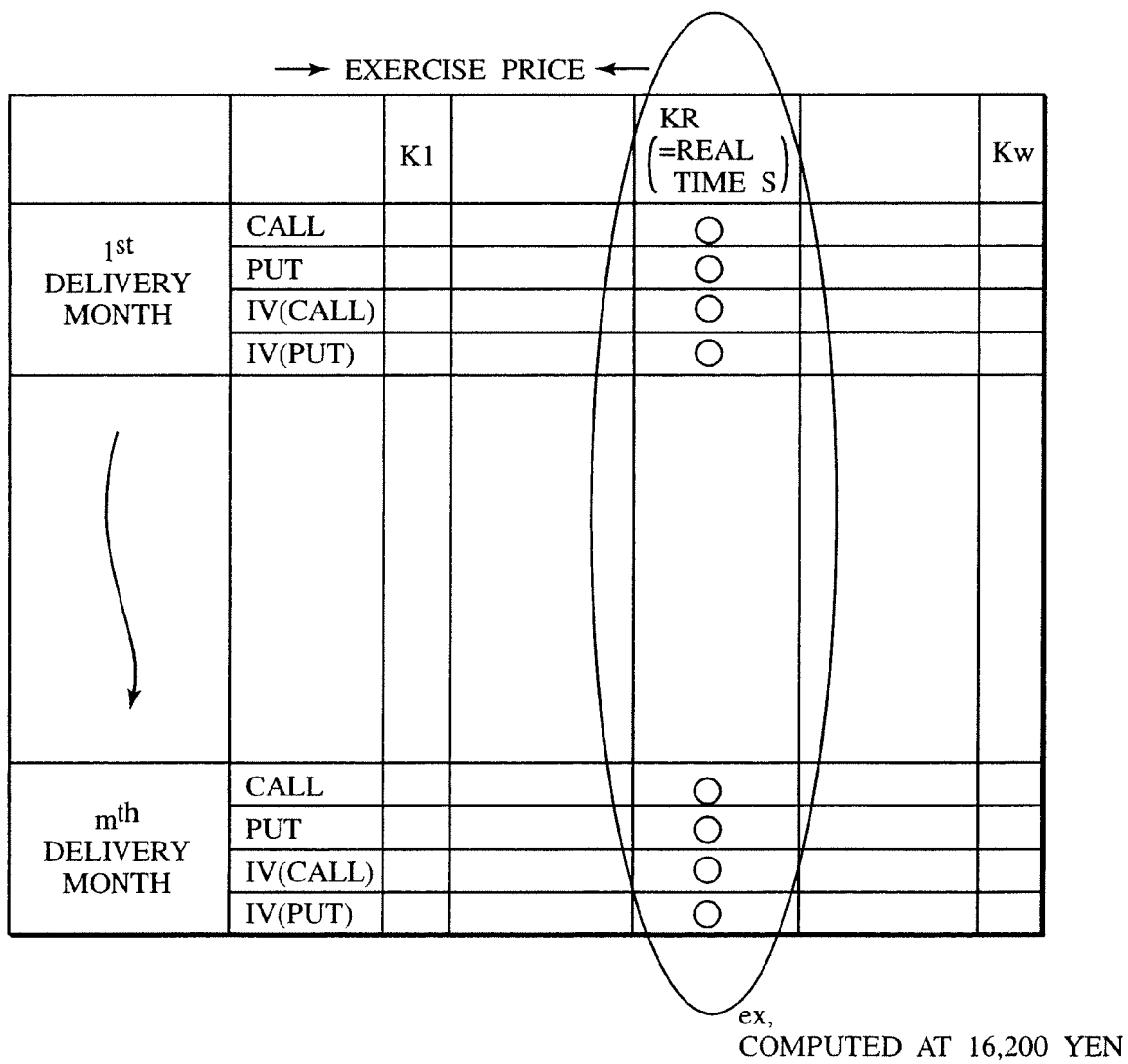
FIG. 50 is a table of the implied volatility and the option prices, in which a virtual implied volatility for a real-time ATM is inserted in the exercise price band set in the marked, used in the detailed price evaluation process carried out by the dealing system.

In response to this user interruption, the necessary data provided by the user in the enlarged screen is automatically transferred to the BMM engine 103. The simulation result by the BMM engine 103 is returned to the dealing terminal 105, and displayed on the sub-screen, as shown in FIG. 50. The column KR shown in FIG. 50 represents virtual real-time ATM interpolated between the discrete values of the exercise price bands set in the market. The virtual ATM is assumed to be equal to the real-time underlying price.

Since the risk index and the option price change most significantly near ATM, it is very important for dealers and traders to observe the market change and the term structure in this area.

With the dealing system 100 of the present invention, even if the underlying price moves between discrete exercise price bands set in the market, virtual ATM is interpolated as indicated by KR in FIG. 50. Dealers can flexibly evaluate the term structure of the implied volatility based on the interpolation.

However, a problem is that the amount of information displayed on the graph of FIG. 39(*b*) inevitably increases. For example, if the user wishes to evaluate up to the sixth delivery month, six option prices must be displayed on the graph. In this case, it is desirable for the user to know these evaluation results correctly and promptly at a glance.

Figure 49:
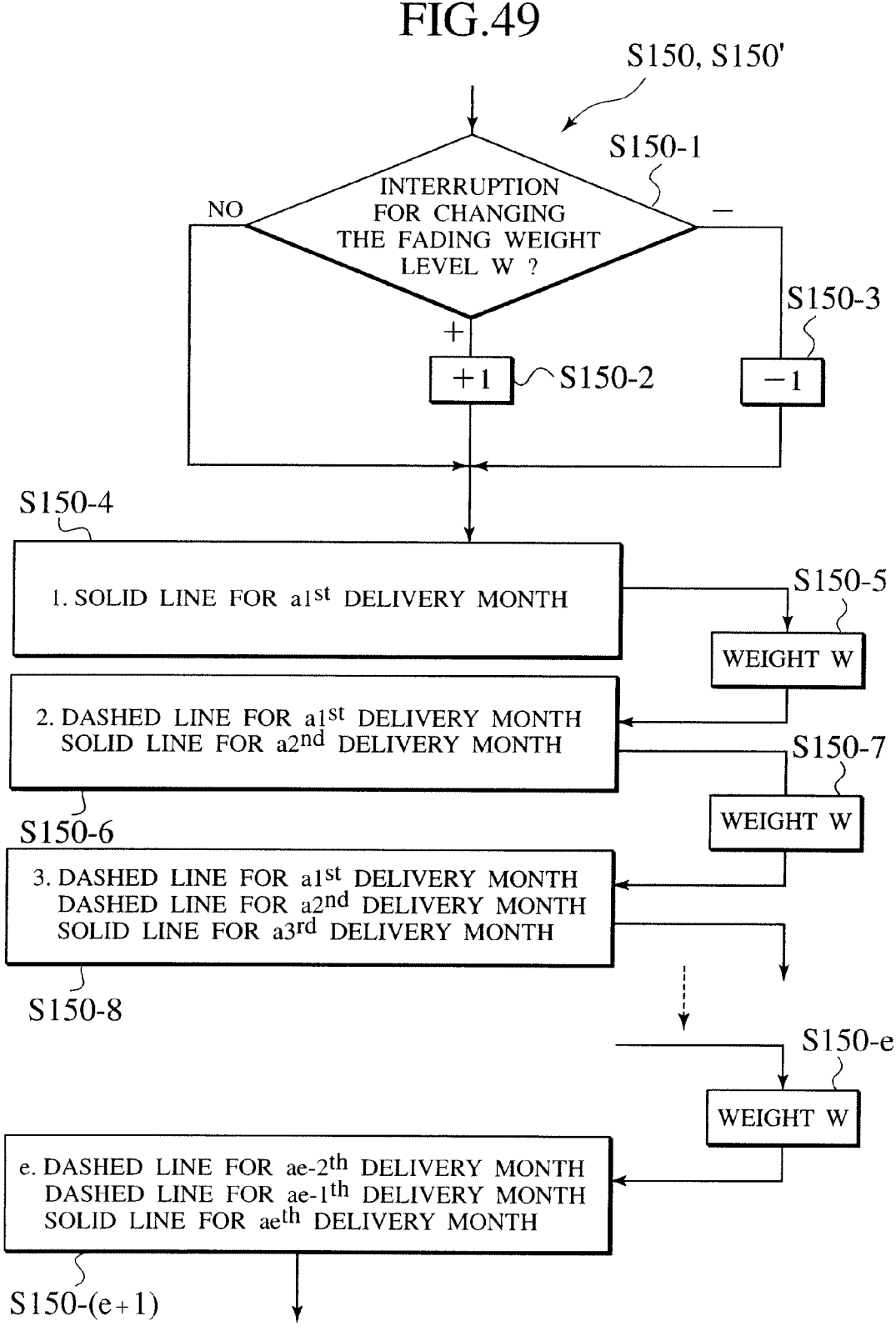
FIG. 49 illustrates an operation flow showing the detailed steps for the fading operation.
Figure 52:
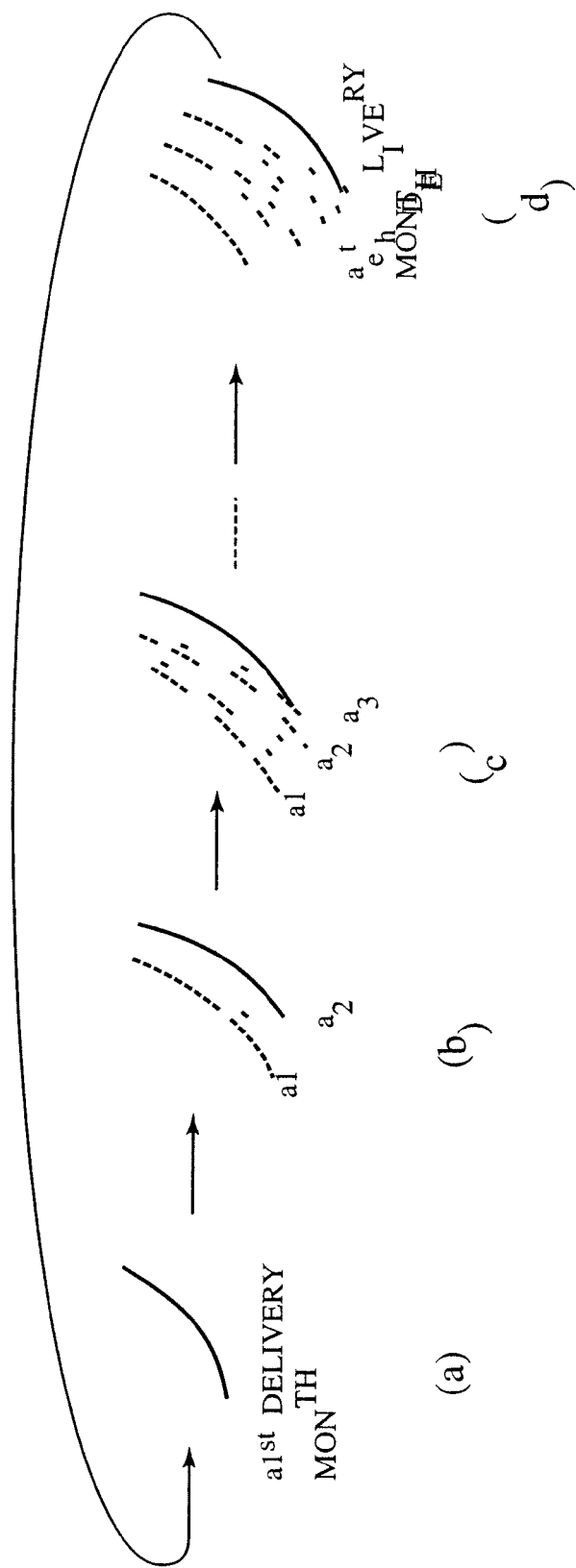
FIG. 52 is a process diagram for explaining the fading operation.

To respond to this demand, the behavior of the term structure of the implied volatility is displayed in fading animations, as shown in FIG. 52, based on the operation flow shown in FIG. 49. In FIG. 52(*a*), the solid line draws only the implied volatility of the a$1^{st}$ delivery month (step S150-4). After a time lapse of a weight level w, the implied volatility of the a$1^{st}$ delivery month is displayed by the dashed line, and the implied volatility of the a$2^{nd}$ delivery month is displayed by the solid line, as shown in FIG. 52(*b*) (steps S150-5, S150-6). This step is repeated until the ae$^{th}$ delivery month, as shown in FIG. 52(*d*) (steps S150-7, S150-8, . . . , S150-e, S150-(e+1)).

Figure 51:
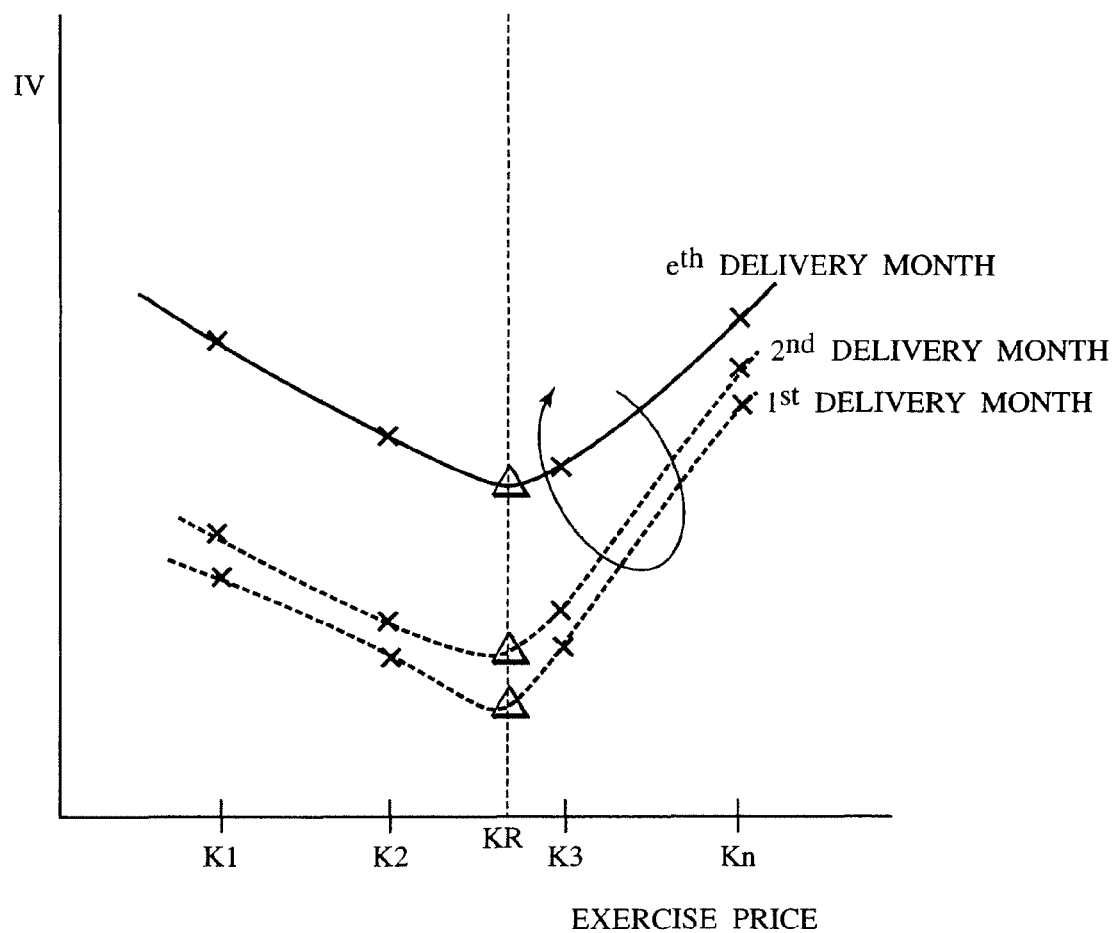
FIG. 51 is a graph of implied volatility for arbitrary multi-terms, which includes the implied volatility for a virtual real-time ATM inserted in the exercise price band set in the market, displayed in the detailed price evaluation process carried out by the dealing system.

The weight level w can be adjusted by typing the plus (+) key or the minus (−) key of the keyboard, as shown in steps S150-1 through S150-3 in FIG. 49. In response to the key manipulation, an interruption routine is activated, and this interruption is reflected to the fading display shown in FIG. 52 at once. The interruption (i.e., adjusting the weight level) may be carried out by using a mouse or a pointing device, instead of keyboarding. The computation result of FIG. 50, which was returned from the BMM engine 103, is display as a graph, as shown in FIG. 51. In FIG. 51, KR denotes the virtual ATM, the white triangles denote the output data from the BMM engine 103, and the cross marks denote the market data.

Displaying the behavior of the term structure of the implied volatility (IV) in ATM by fading animation can protect the user from mispricing due to too sensitive reaction to the market change.

Figure 53:
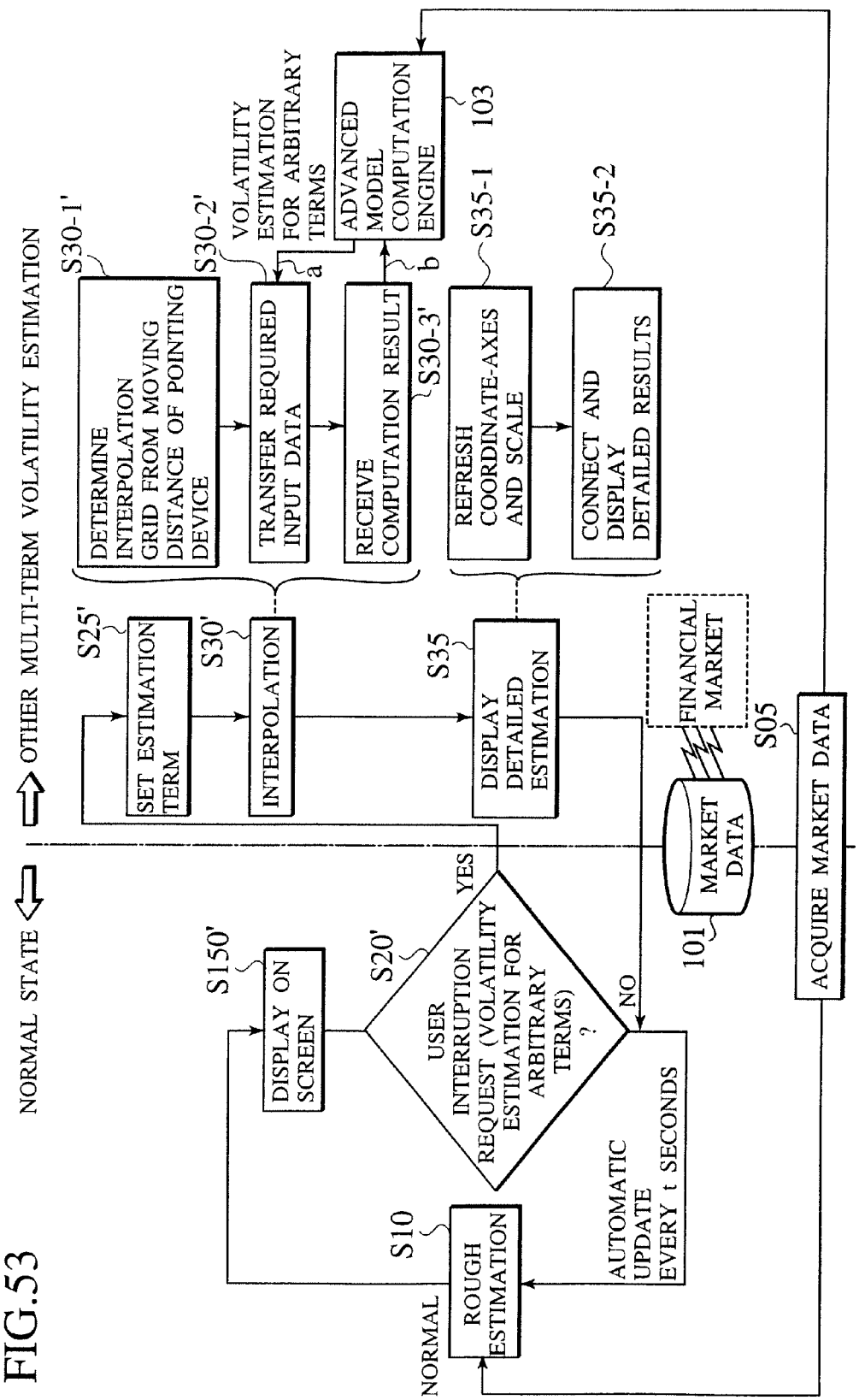
FIG. 53 illustrates an operation flow in the arbitrary multi-term volatility evaluation process using the fading function.

FIG. 53 is a flowchart including a fading function, which is basically added to the operation flow of FIG. 44. The same steps as those in the flowchart of FIG. 44 are denoted by the same numerical references. The newly added step is the display processing of step S150'.

In the flowchart of FIG. 53, the market color associated with market activity is displayed on the sub-screen of the dealing terminal 105 in the ordinary state based on the rough calculation result, as shown in FIGS. 37 through 39 (step S10). If the user wishes to evaluate the volatility of arbitrary multiple terms simultaneously, the user inputs the items of staring date 201, the maturity 202, and the evaluation interval 203 through the term setting page shown in FIG. 45 (step S20') to set the term of a desired option.

Figure 46:
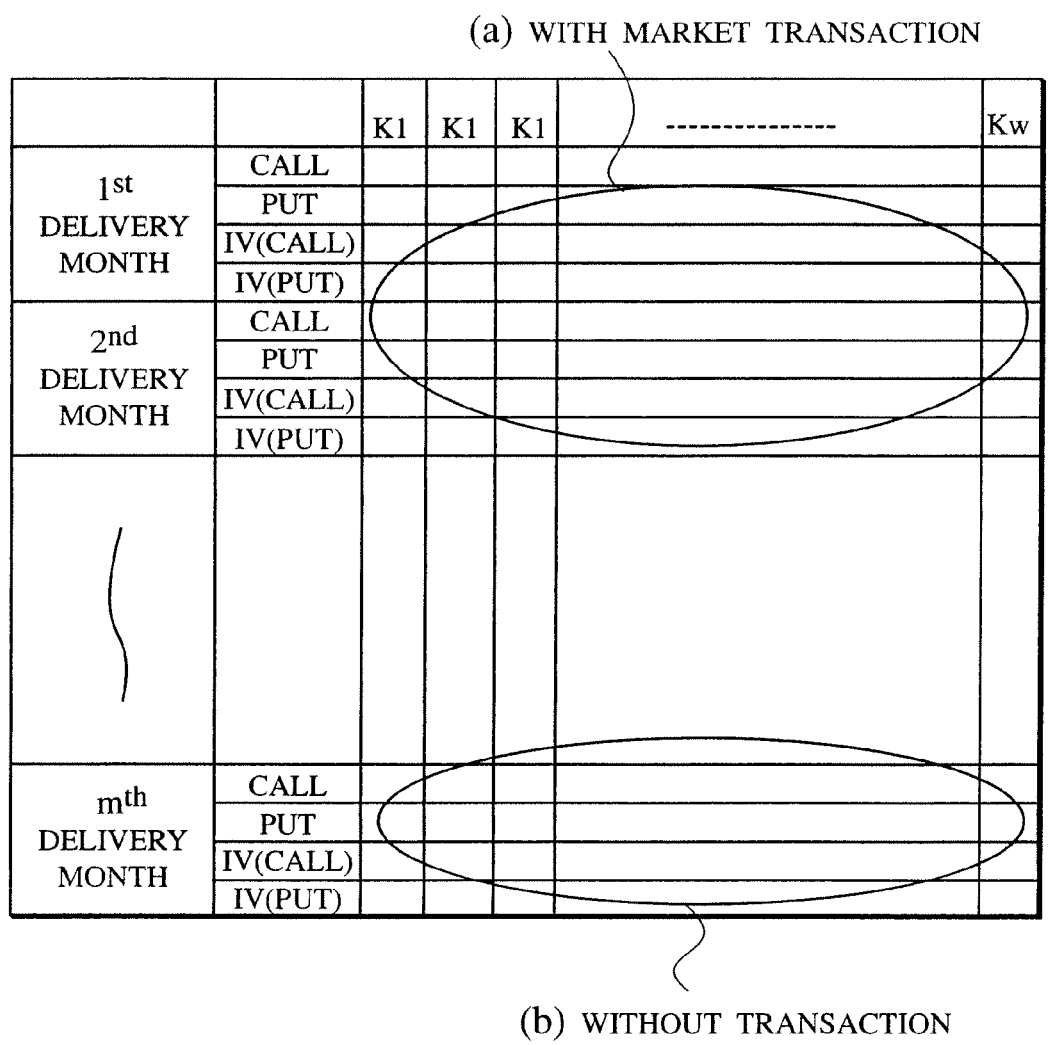
FIG. 46 illustrates a table with market prices and implied volatility values for the arbitrary multi-term delivery in the dealing system.

In response to this user interruption, the data inputted by the user is automatically transferred to the BMM engine 103, and the computation result shown in FIG. 46 is returned (steps S25' and S30'). This computation result is displayed as a graph, as shown in FIG. 47 (step S35).

If the user designates the fading mode, multi-term volatility is displayed on the screen by fading animation based on the operation flow shown in FIG. 49.

By displaying the animated behavior of the term structure of the implied volatility of arbitrary multiple terms in a fading manner, undesirable mispricing due to excessive reaction to the market change can be prevented.

Figure 54:
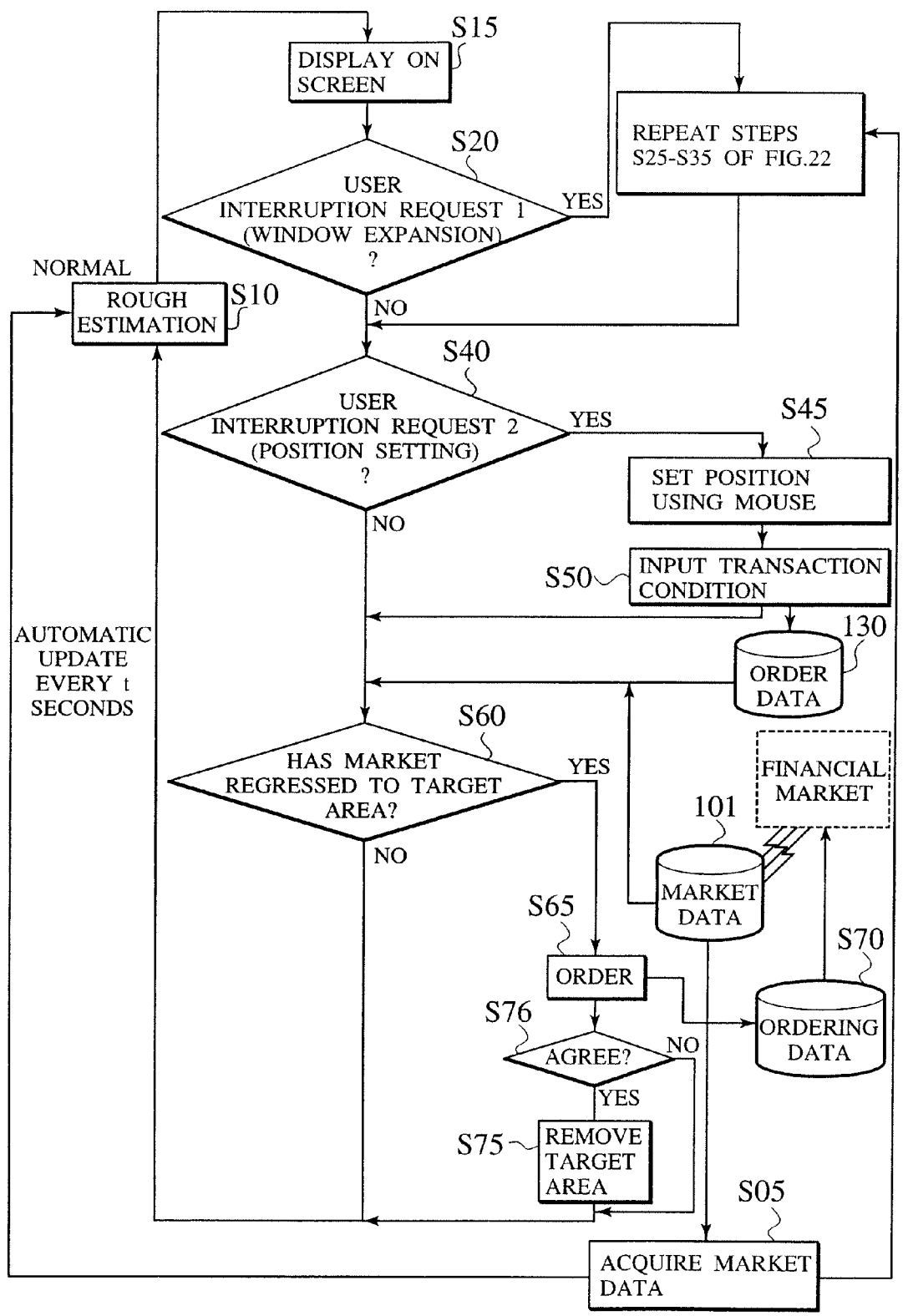
FIG. 54 illustrates an operation flow for an automatic ordering process carried by the dealing system, in which a deal sets a desired position and orders timely.

Another significant function of the dealing system 100 shown in FIG. 28 is to allow dealers to set positions and to automatically order desired financial products. This function will be explained with reference to FIGS. 54 through 56. In FIG. 54, the same steps as those in the flow of FIG. 40 are denoted by the same numerical references.

In the ordinary state, the sub-screen of the dealing terminal displays the market color associated with market activity based on the rough-computation as shown in FIGS. 37 through 39 (steps S05 through S15), and the user can visually refer to the appropriate standard of the advanced model.

Figure 55:
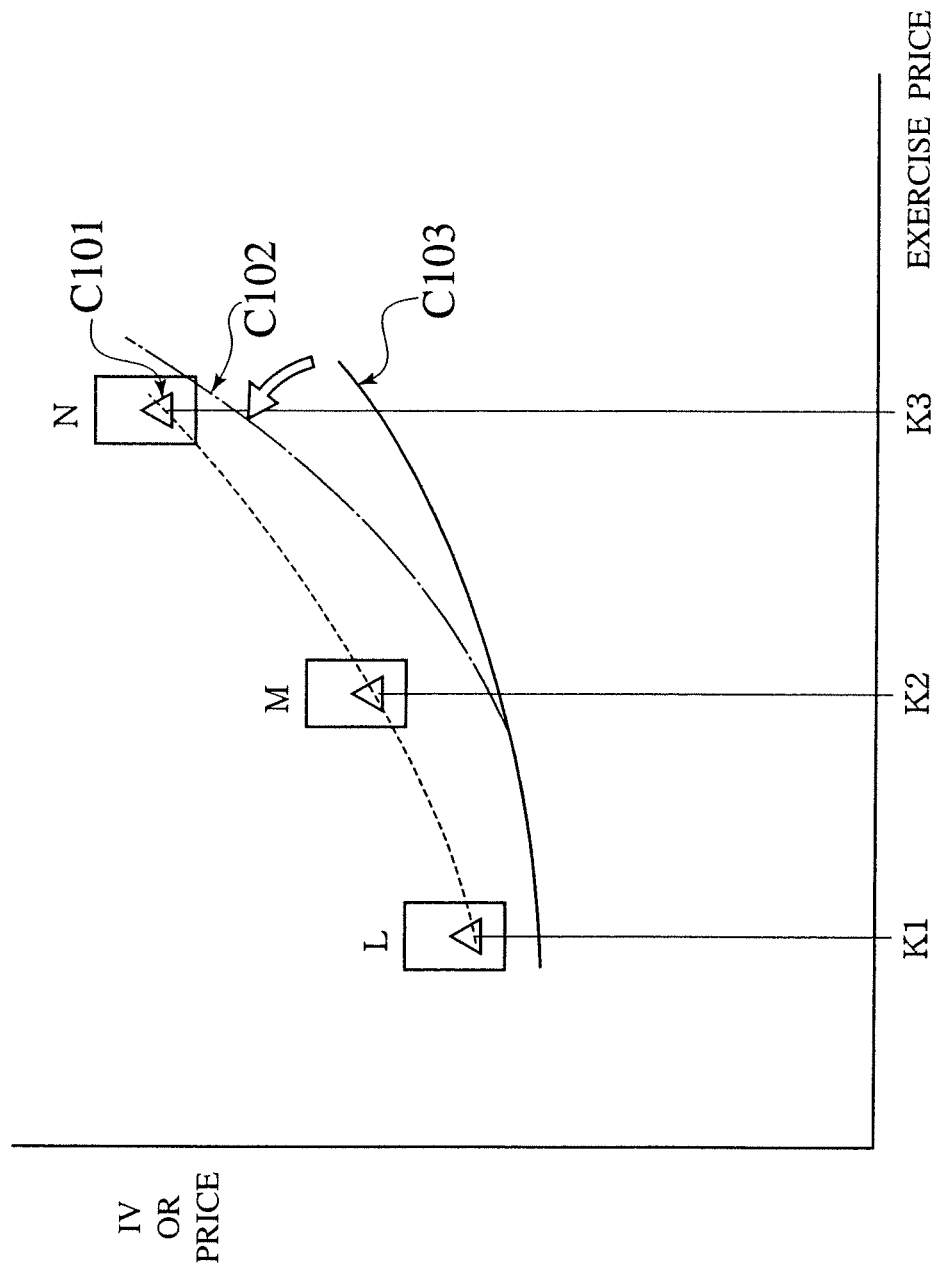
FIG. 55 is a graph showing the relationship between the output from the computation engine and the implied volatility, which is used for setting a position.
Figure 57:
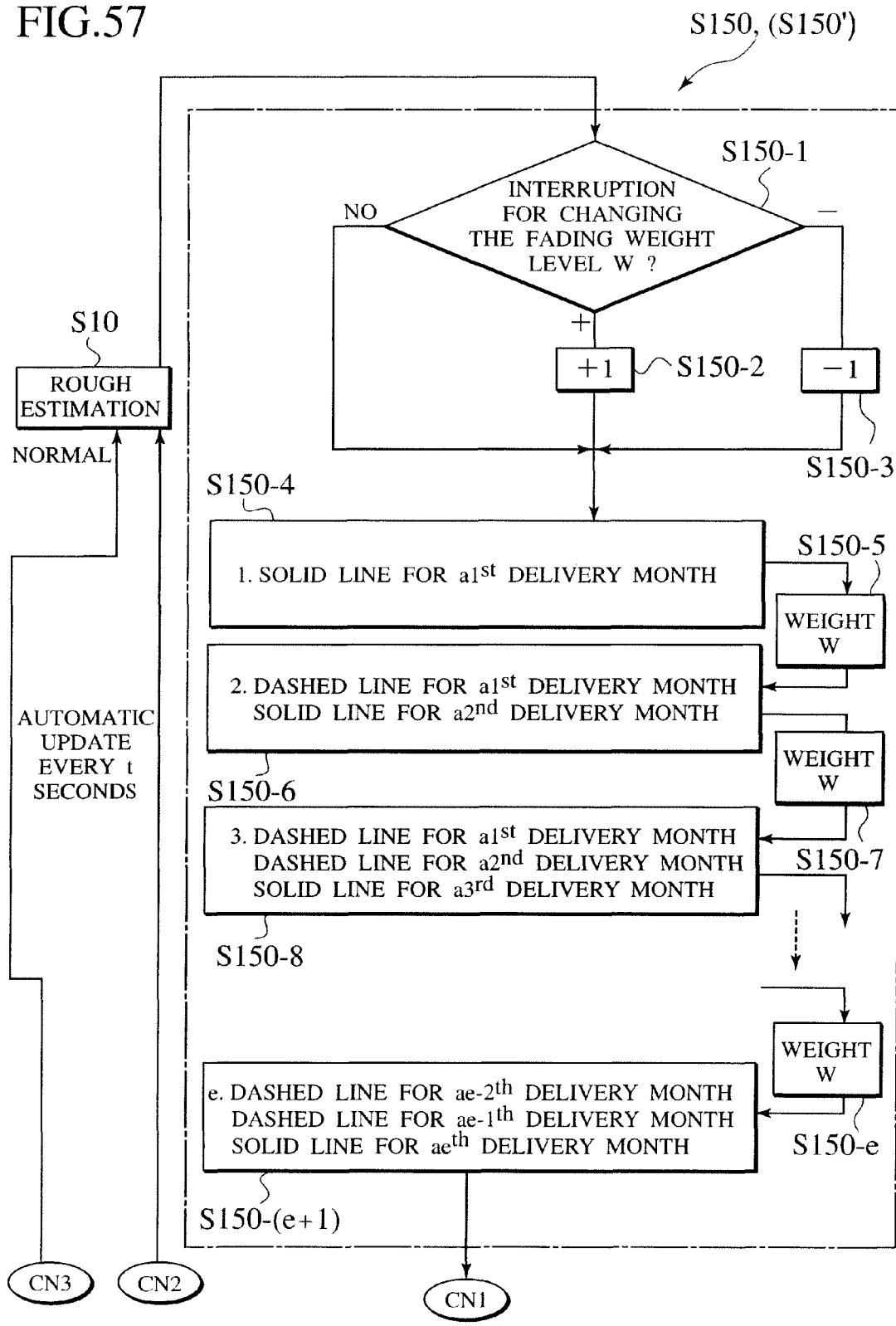
FIG. 57 illustrates an operation flow in the first part of the process for displaying the simulating animation for the term structure analysis of the ATM implied volatility in a fading manner in the dealing system.
Figure 58:
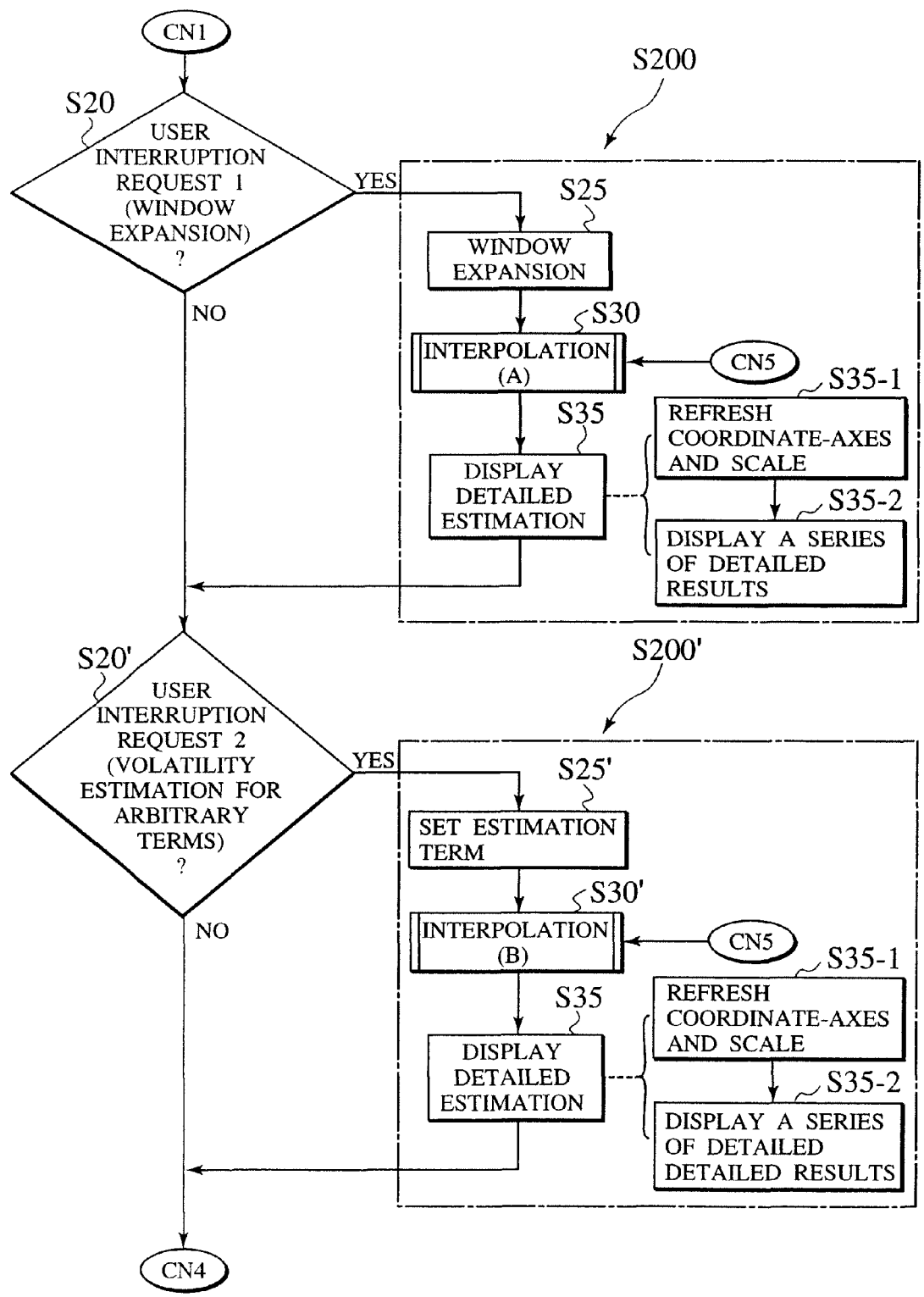
FIG. 58 illustrates an operation flow in the second part of the process for displaying the simulating animation for the term structure analysis of the ATM implied volatility in a fading manner.
Figure 59:
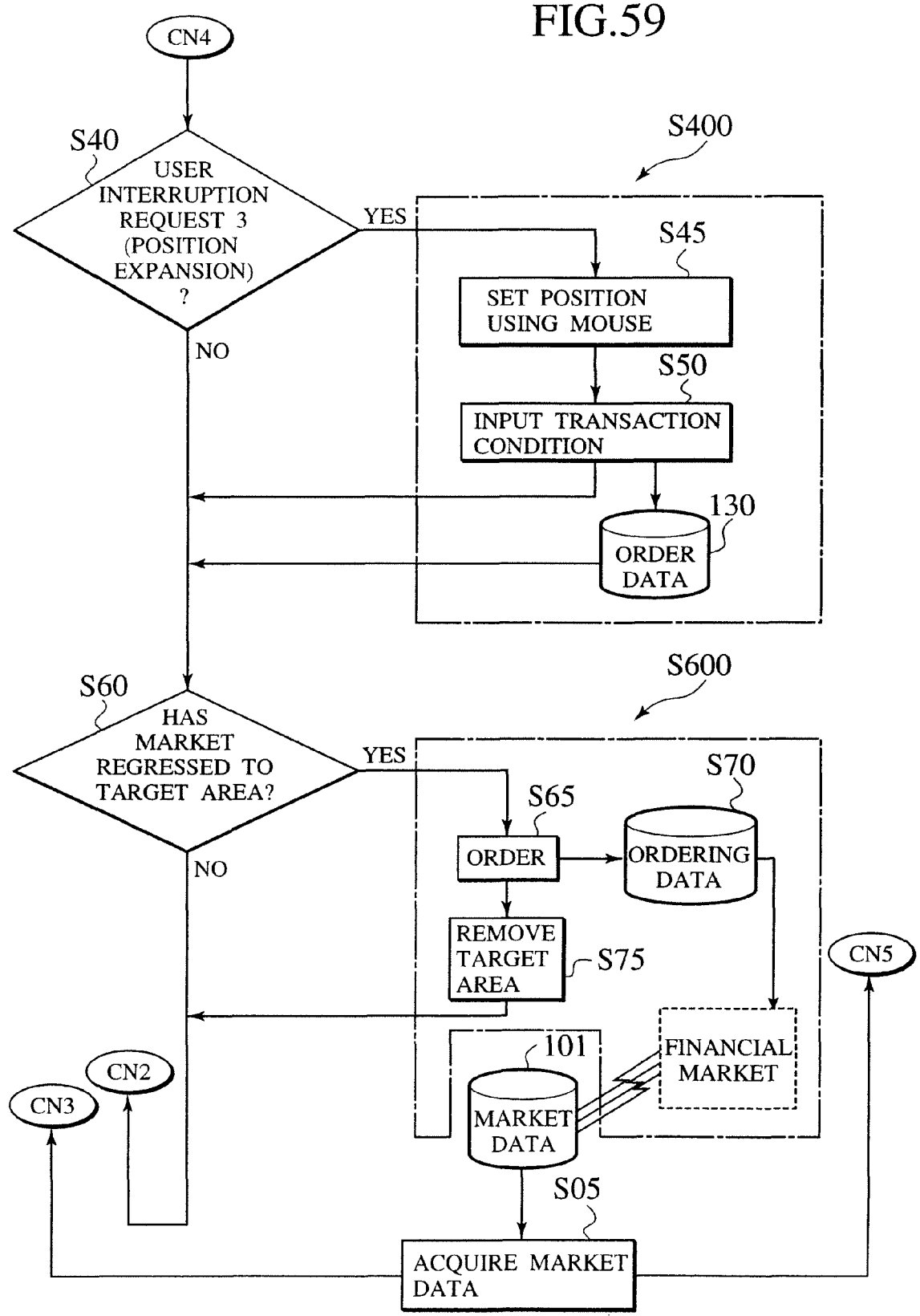
FIG. 59 illustrates an operation flow in the third part of the process for displaying the simulating animation for the term structure analysis of the ATM implied volatility in a fading manner.
Figure 60:
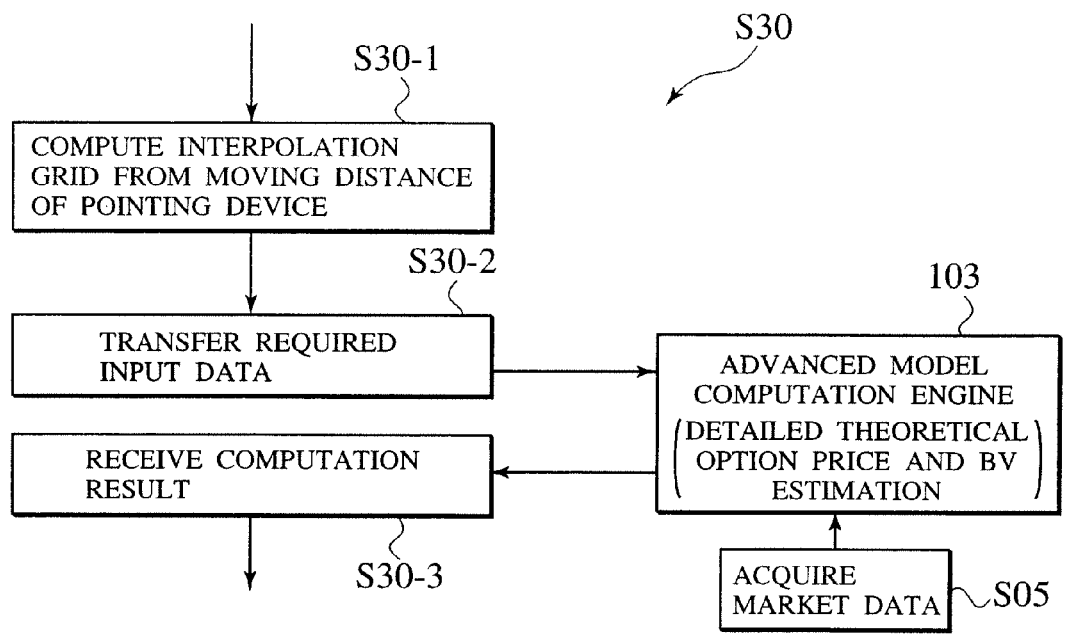
FIG. 60 illustrates an operation flow for the detailed steps of the interpolation A shown in step S30 of FIG. 58.
Figure 61:
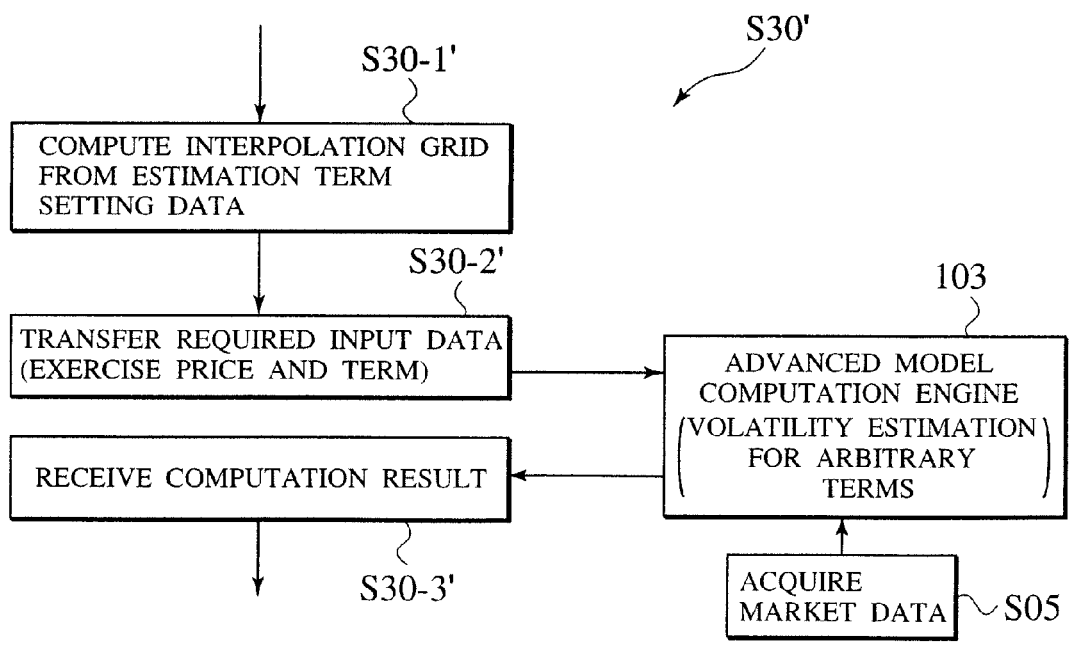
FIG. 61 illustrates an operation flow for the detailed steps of the interpolation B show in step S30' of FIG. 58.

When the user desires to order transactions, the user requests an interruption at step S40, and drags the areas L, M and N shown in FIG. 55 in turn using a mouse (steps S40 and S45). If the user first designates the area L, the transaction input page 210 shown in FIG. 56 is started. The page 210 exhibits the attributes of the designated position, such as exercise prices, call/put option, implied volatility, and limit price. The user can select in this page purchase or sell, together with the desired number of bills. Upon hitting the "enter" key, the designated order is stored in the order database 130 (step S50). The other areas M and N are handled in the same manner.

After the order was made, it is checked every t seconds in real time whether the market has regressed to the target area (steps S60, S10, S15, S20 and S40).

If the market has regressed to the target area (YES in step S60 of FIG. 54), the user's order is transferred to the market immediately and automatically (steps S65 and S70). If the position in the target area (e.g., area N) has been contracted as a trade date (step S76), then area N is eliminated from the page (step S75).

This operation flow allows the user (or the dealer) to visually check the appropriate standard of the advanced model, and to make orders timely in an automatic manner.

This automatic ordering function based on a selected position may be combined with a fading function. In this case, the behavior of the term structure of the implied volatility ATM is displayed as a fading animation on the dealing terminal 105. FIGS. 57 through 61 illustrate the operation flow of the fading function combined with the automatic ordering function. The same steps as those in other flowcharts are denoted by the same numerical references.

In the ordinary time, the market color is displayed on the sub-screen of the dealing terminal 105 based on the rough computation result, as shown in FIGS. 37 through 39 (steps S05, and S10).

Since the risk index and the option price change significantly near ATM, it is very important for dealers and traders to observe the market change and the term structure. With the dealing system of the present invention, even if the underlying price changes between discrete exercise price bands set in the market on the sub-screen shown in FIG. 37, ATM is interpolated as indicated as symbol KR in FIG. 62. The term structure of the implied volatility is then displayed by fading animation (steps S150-1 through S150-(e+1)).

Figure 62:
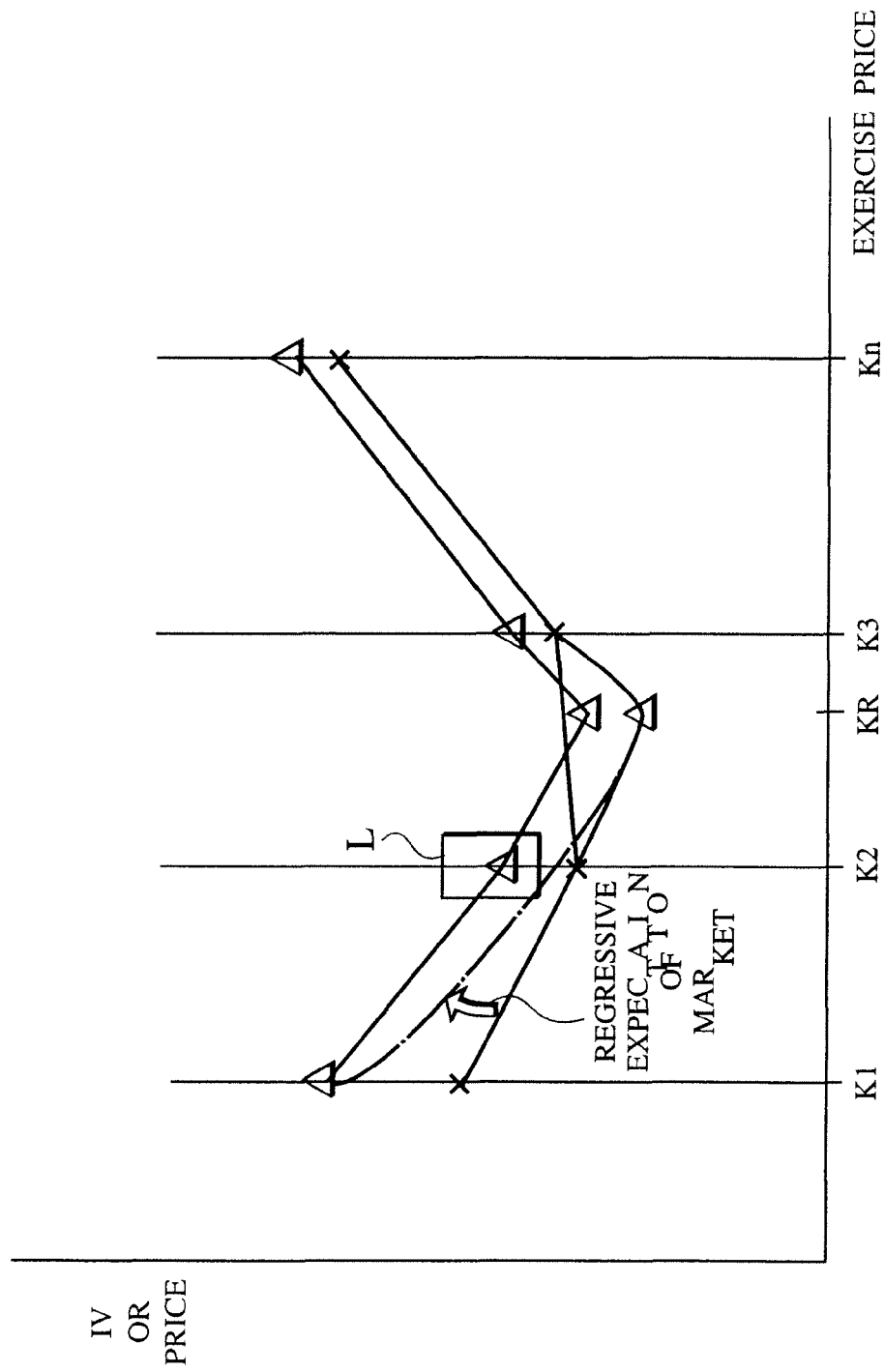
FIG. 62 is a graph showing the approach for setting the automatic ordering process.

Based on the information displayed on the dealing terminal, the user clicks a desired position (for example, area L) in the displayed page of FIG. 62 (steps S40, S45, S50). It is automatically checked every t seconds whether the market has regressed to the target area in step S60. If the market has regressed to the target area, transaction order is immediately transferred the market in an automatic manner (steps S65, S70).

In this manner, the dealing system 100 of the preferred embodiment allows the dealer to visually check the appropriate standard of the advanced model with a fading animation, and to select a desired position to make a transaction order timely and automatically. Because the behavior of the term structure of the implied volatility (IV) in ATM is displayed by animation in a fading manner, the dealer can avoid mispricing due to an excessive reaction to the market change.

Figure 63:
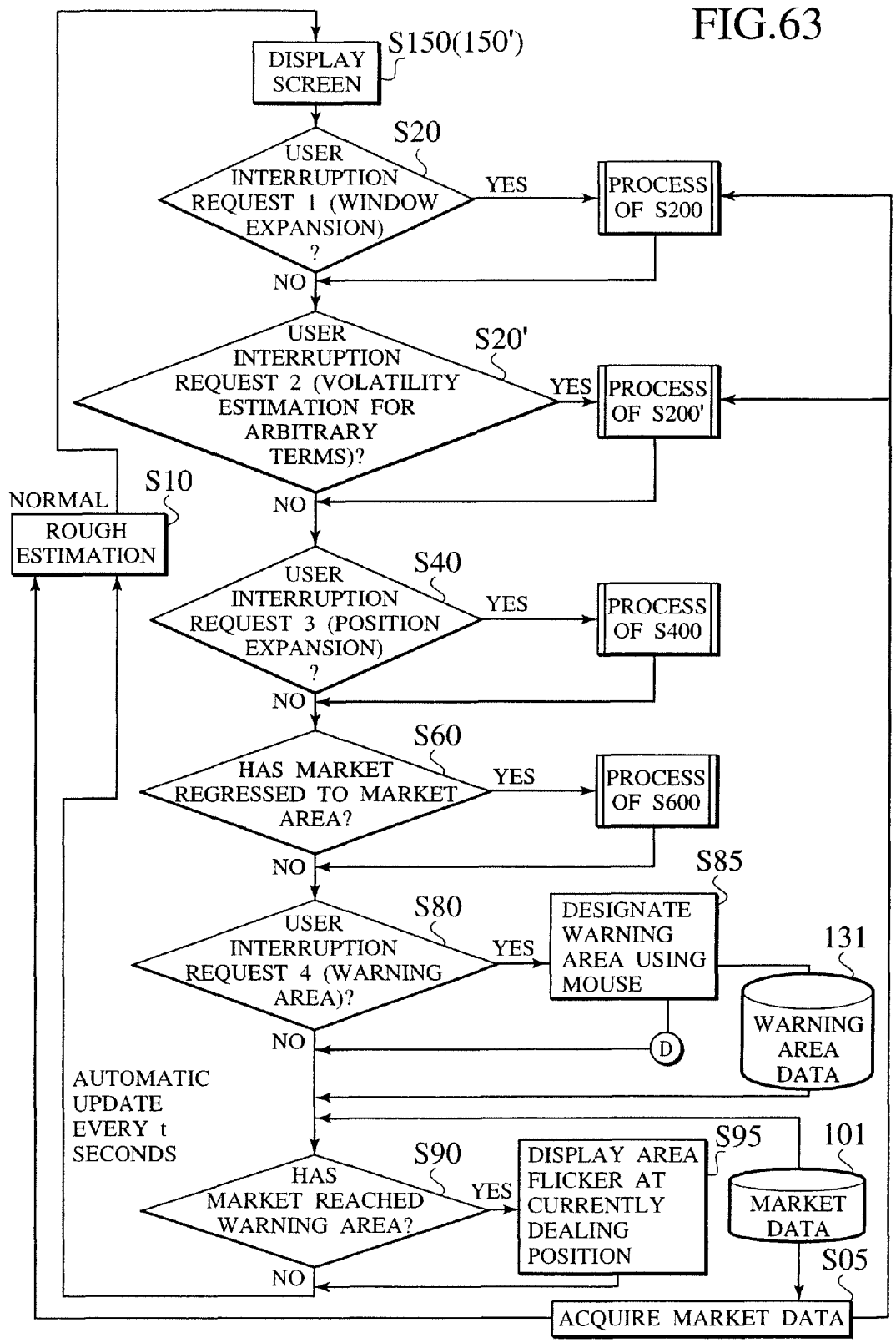
FIG. 63 illustrates an operation flow for setting an automatic warning function with market data in the dealing system.

Next, an automatic warning function of the dealing system 100 will be explained with reference to FIGS. 63 and 64. In FIG. 63, the same steps as those in the flowcharts of FIGS. 57 through 61 are denoted by the same numerical references.

In the ordinary state, the market is displayed on the sub-screen of the dealing terminal 105 based on rough computation, as shown in FIGS. 37 through 39 (steps S05, S10, S150), and the user can visually refer the appropriate standard of the advanced model.

Figure 64:
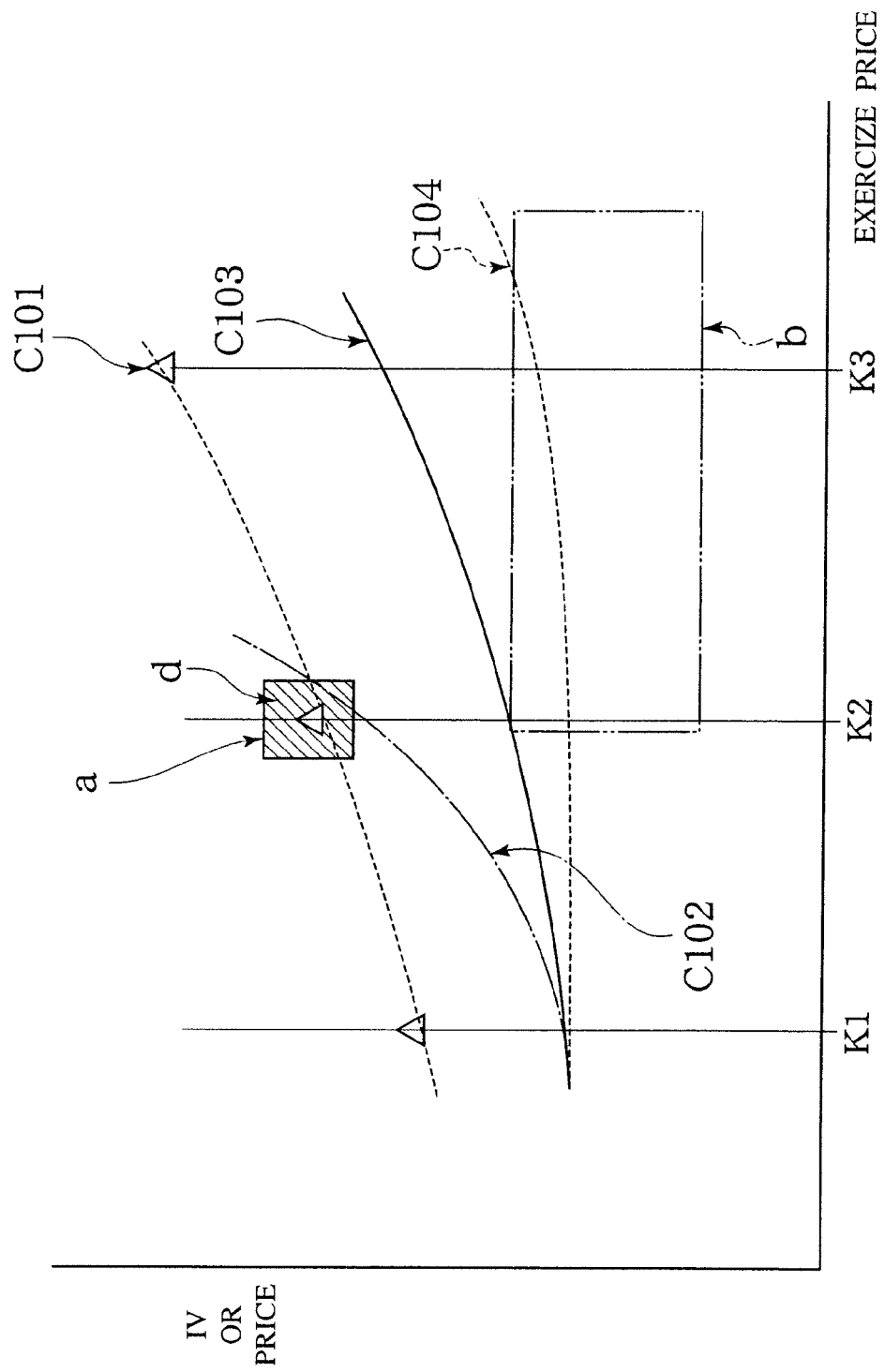
FIG. 64 is a graph showing the approach for setting the automatic warning process.

In the sub-screen shown in FIG. 64, curve C101 represents the output of the Boltzmann model engine 103, curve C102 represents the predicted regression of the market, and curve C 103 represents the implied volatility of the market. If the user wishes to make a transaction order at position "a" in FIG. 64, the user clicks the position to designate this area for a transaction order in step S80.

At this point of time, the user can select the automatic warning function for automatically giving a caution for the selected position "a" in response to the market change. To be more precise, the user requests an interruption in step S80, and selects a warning area "b" on the sub-screen shown in FIG. 64 in step S85. The selected warning area corresponds to the market area for which the user needs warning. The designated warning information is stored in the warning area database 131.

If the user selects multiple positions, and wishes to set a warning area for each position individually, the user repeats the interruption as many time as the user wishes.

As shown in FIG. 64, the selected ordering position "a" corresponds to the option of the exercise price K2, and the warning area for this position covers both the exercise prices K2 and K3. This is one of the significant features of this warning function. The user can flexibly take exercise prices (i.e., option issues) of other than the designated position as a warning condition.

After the warning area has been selected, it is automatically checked in step S90 whether the market has entered the warning area "b". This determination is conducted by checking both the warning area database 131 and the market database 101 in real time every t seconds. If the prediction of the market fails and the real market represented by curve C104 enters the warning area "b", then the position "a" at which a transaction order is requested is immediately flickered, as indicated by the hatched area "d" in FIG. 64 to caution the user (step S95).

Figure 65:
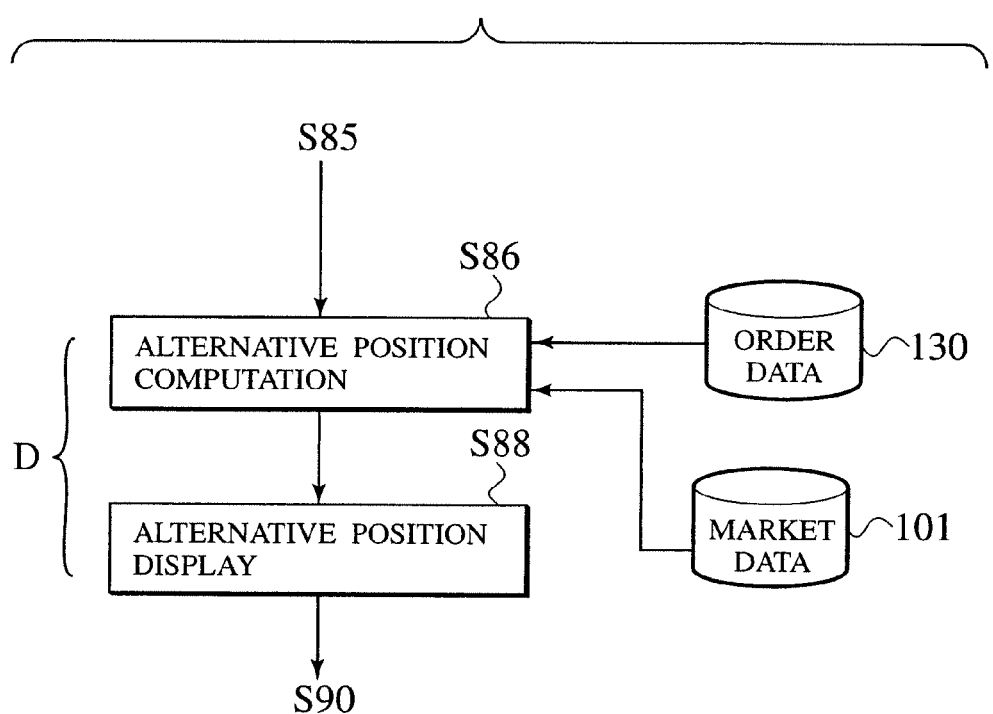
FIG. 65 illustrates an operation flow for automatically computing and selecting an alternative position, which is carried out together with the automatic warning process in the dealing system.

This warning function enables a risk manager to carry out appropriate risk management because a caution is automatically issued when the market has entered the warning area designated by the dealer. An extra function for suggesting an alternative position may be added to the above-described warning function. In this case, the operation flow shown in FIG. 65 is inserted after step S85 of FIG. 63, as indicated by symbol "D". If the prediction of the existing ordering position fails, and if the real market enters the warning area "b" as indicated by curve C104, then an alternative position area "e" is suggested, as shown in FIG. 66, in addition to giving a caution.

Figure 66:
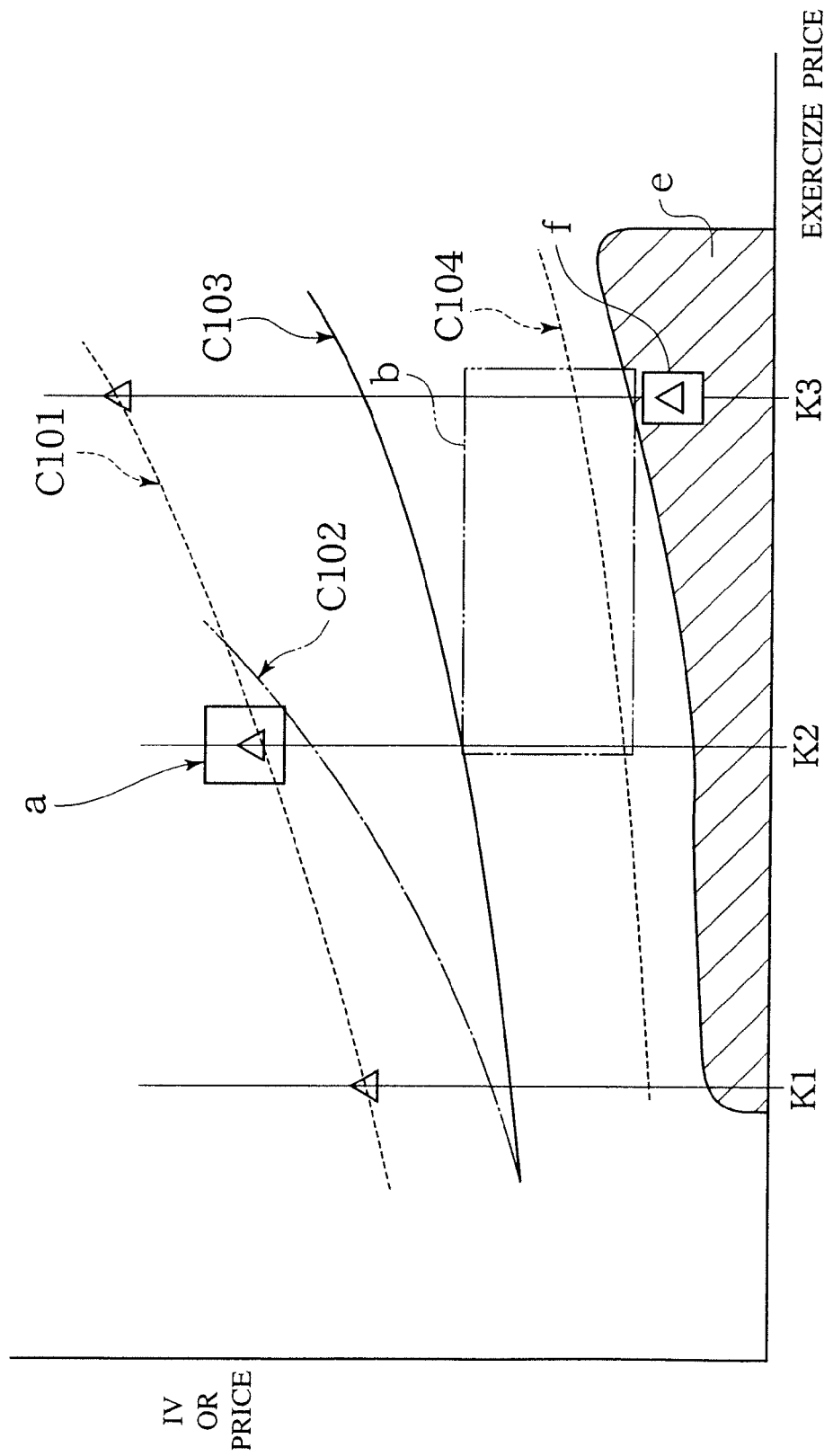
FIG. 66 is a graph showing the approach for setting the automatic warning process, together with selection of an alternative position in the dealing system.

Prior to suggesting the alternative position area, the sub-screen of the dealing system has been displaying a rough computation result, as shown in FIGS. 37 through 39, and an ordering position "a" and the corresponding warning area "b" are designated on the sub-screen, as shown in FIG. 66.

Now, if a change occurs to the real market, and if the market index C104 of the real market enters the warning area "b", the position "a" is immediately flickered to give a caution to the user. Then, in step S86 shown in FIG. 65, an alternative position area "e" is calculated based on the ordering data 131 and the market data 101. The alternative position area falls into an opposite position for compensating the gap between the predicted position and the real market represented by C104.

The alternative position "e" is immediately displayed on the dealing terminal 105 in step S88, as shown in FIG. 66.

The user can again make a transaction order at a desired position "f" inside the alternative position area "e".

By adding the function for suggesting an alternative position to the warning function, a vast amount of loss due to an excessive reaction to the market change can be effectively avoided in advance, because an alternative position is automatically extracted together with a caution.

As has been described above, the dealing system of the present invention has many significant advantages over the conventional technique based on a general theory of financial engineering, the application of which is very limited in a non-active option market. The dealing system of the present invention has a Boltzmann model computation engine for applying a theory of nuclear reactor to the financial field, which is capable of providing a theoretical price or a risk index meaningful to dealers and traders through an interactive graphical interface in a flexible manner. Accordingly, the dealing system of the invention can deal with a big price change in the underlying assets in a flexible manner.

Although the present invention has been described based on examples of stock index option as the preferred embodiments, the invention is not limited to these examples. The present invention is applicable to any option products, for example, individual stock options and currency options, the underlying assets of which exhibit a behavior of the geometric Brownian motions.

What is claimed is:

1. A dealing system comprising:
   an implied volatility computation engine configured to evaluate an implied volatility based on market data;
   a Boltzmann model computation engine configured to evaluate an option price for a selected option product based on a Boltzmann model using the market data;
   a filter configured to convert an option price obtained from the Boltzmann model computation engine into a volatility of a Black-Sholes equation; and
   a dealing terminal configured to display volatility of the Black-Sholes equation in comparison with implied volatility calculated from the market data, or to display the option price calculated by the Boltzmann model computation engine in comparison with an option price in market.

2. The dealing system according to claim 1, wherein the selected option product is a stock price index option.

3. The dealing system according to claim 1, wherein the selected option product is an individual stock option.

4. The dealing system according to claim 1, wherein the Boltzmann model computation engine has a unit configured to calculate an option price consistent to historical information from the market data.

5. The dealing system according to claim 1, wherein the Boltzmann model computation engine has a converter configured to convert an option price, which was obtained in a discrete manner with respect to an exercise price based on the Boltzmann model, into a volatility obtained from the Black-Sholes equation in order to obtain the option price and risk parameter through interpolation with the Black-Sholes equation.

6. The dealing system according to claim 1, wherein the Boltzmann model computation engine has a table generator that generates a table of a probability density function evaluated by the Boltzmann model, and calculate an option price using a sum of inner products of vectors.

7. A computer-readable recording medium storing a dealing program for use in a dealing system, which when executed by a processor results in performance of steps comprising:
   causing the dealing system to compute an implied volatility using market data supplied to the dealing system;
   causing the dealing system to compute an option price based on a Boltzmann model using market data for selected derivatives;
   causing the dealing system to convert the option price obtained from the Boltzmann model into a volatility of a Black-Sholes equation; and
   causing the dealing system to display the volatility of the Black-Sholes equation in comparison with implied volatility calculated from the market data, or to display the option price based on the Boltzmann model in comparison with an option price in a market.

* * * * *